March 3, 1953 G. M. TRACY ET AL 2,630,260
AUTOMATIC BAND APPLYING MACHINE
Filed March 19, 1947 42 Sheets-Sheet 1

Inventors
Glen M. Tracy and
James C. Petrea
By Bacon + Thomas
Attorneys.

March 3, 1953  G. M. TRACY ET AL  2,630,260
AUTOMATIC BAND APPLYING MACHINE
Filed March 19, 1947  42 Sheets-Sheet 2

Inventors
Glen M. Tracy and
James C. Petrea
Bacon + Thomas
Attorneys

March 3, 1953 G. M. TRACY ET AL 2,630,260
AUTOMATIC BAND APPLYING MACHINE
Filed March 19, 1947 42 Sheets-Sheet 4

Inventors
Glen M. Tracy and
James C. Petrea
By Bacon + Thomas
Attorneys

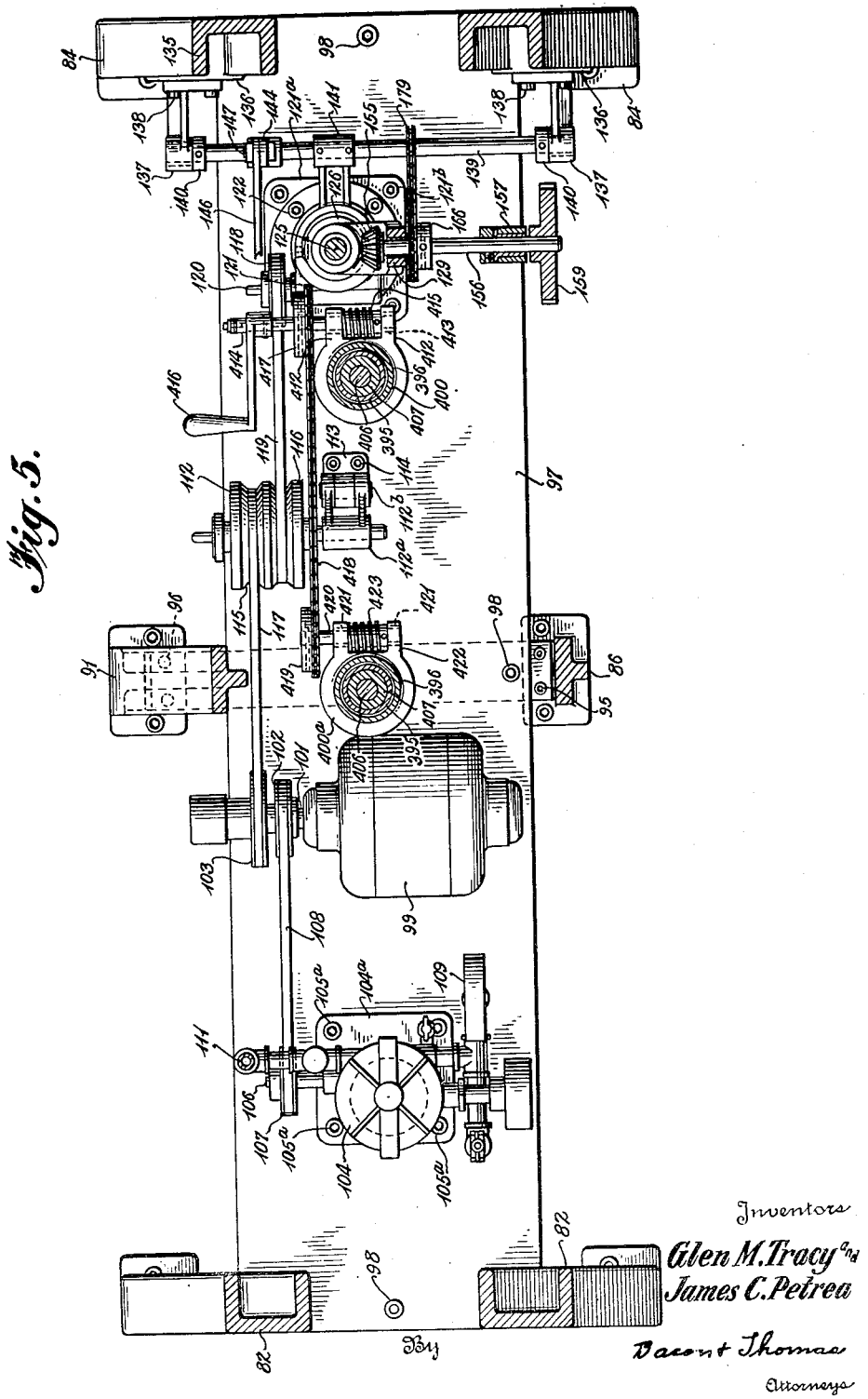

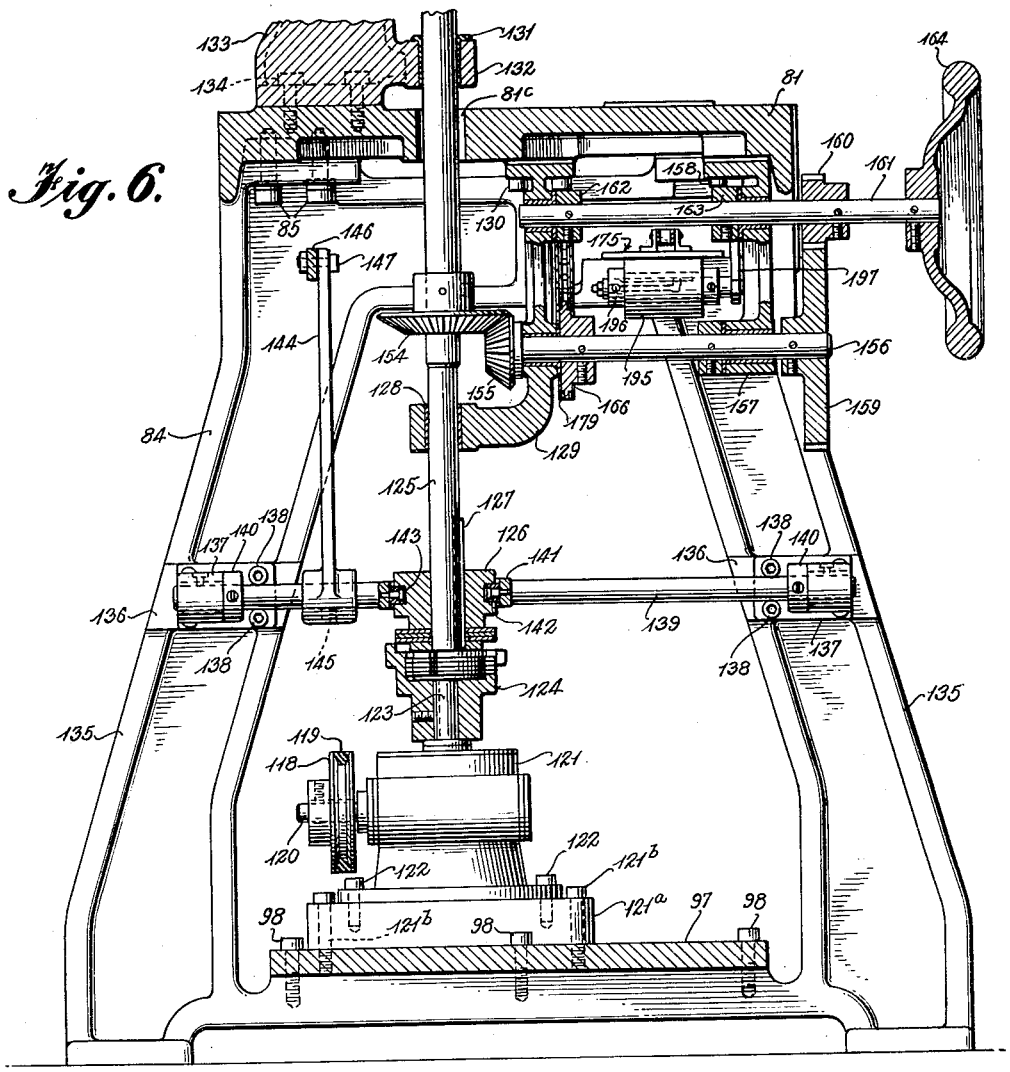

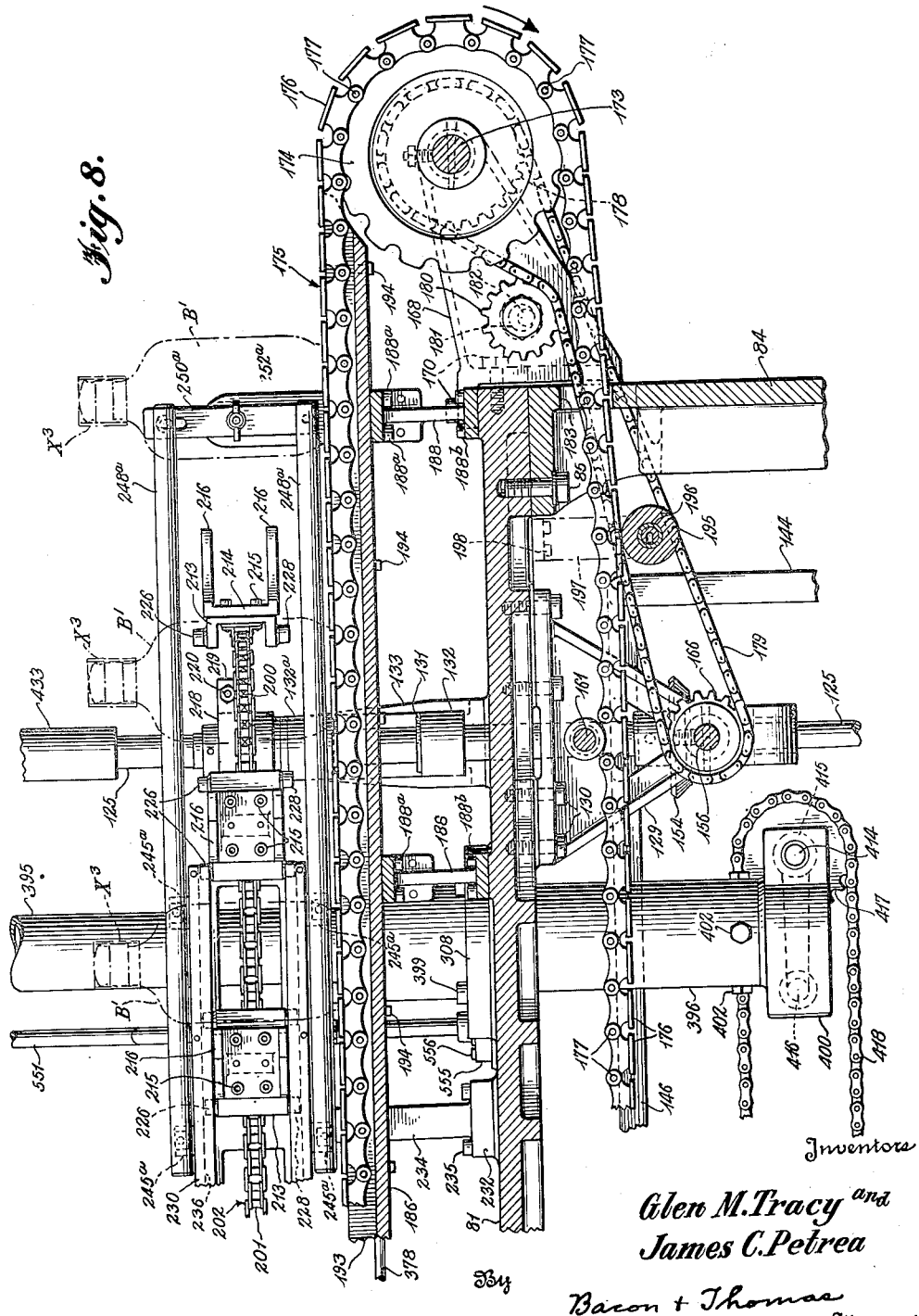

March 3, 1953 G. M. TRACY ET AL 2,630,260
AUTOMATIC BAND APPLYING MACHINE
Filed March 19, 1947 42 Sheets-Sheet 8
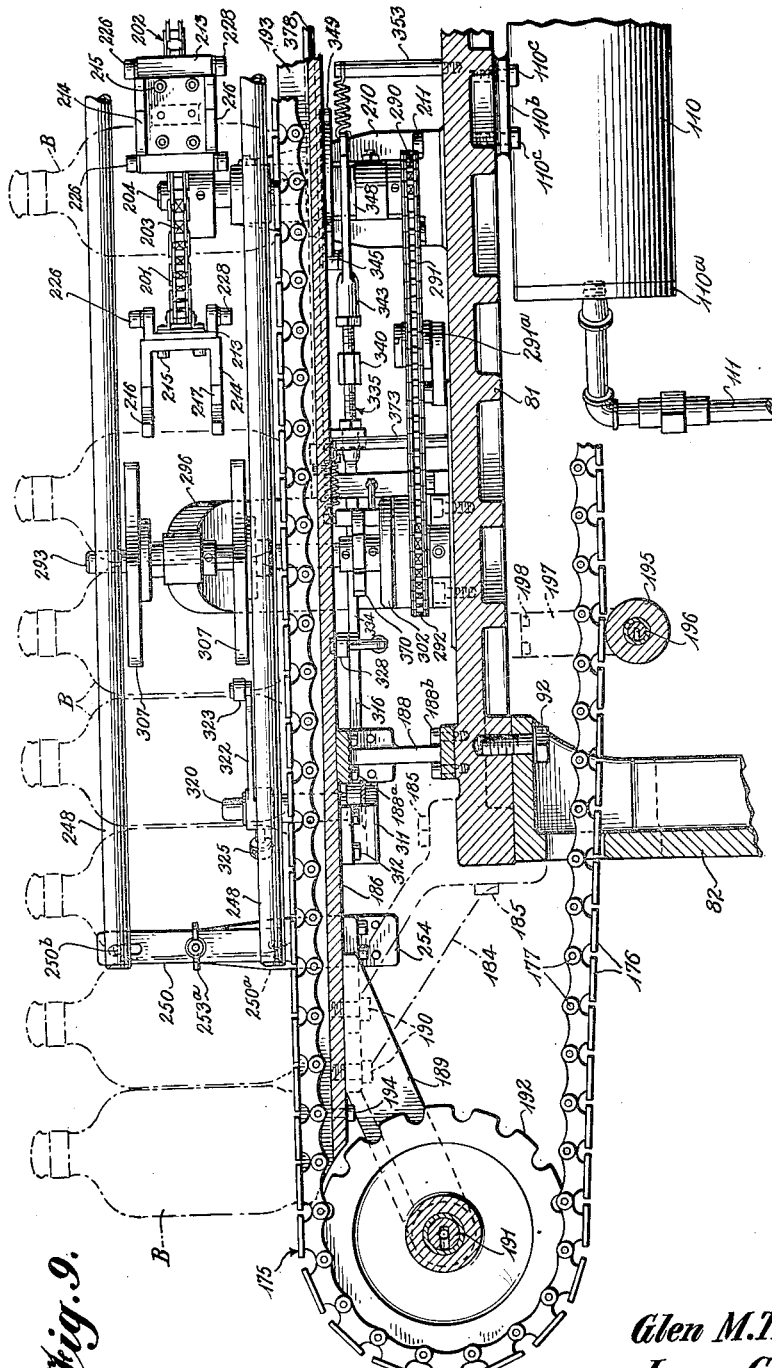
Inventors
Glen M. Tracy and
James C. Petrea
By Bacon + Thomas
Attorneys

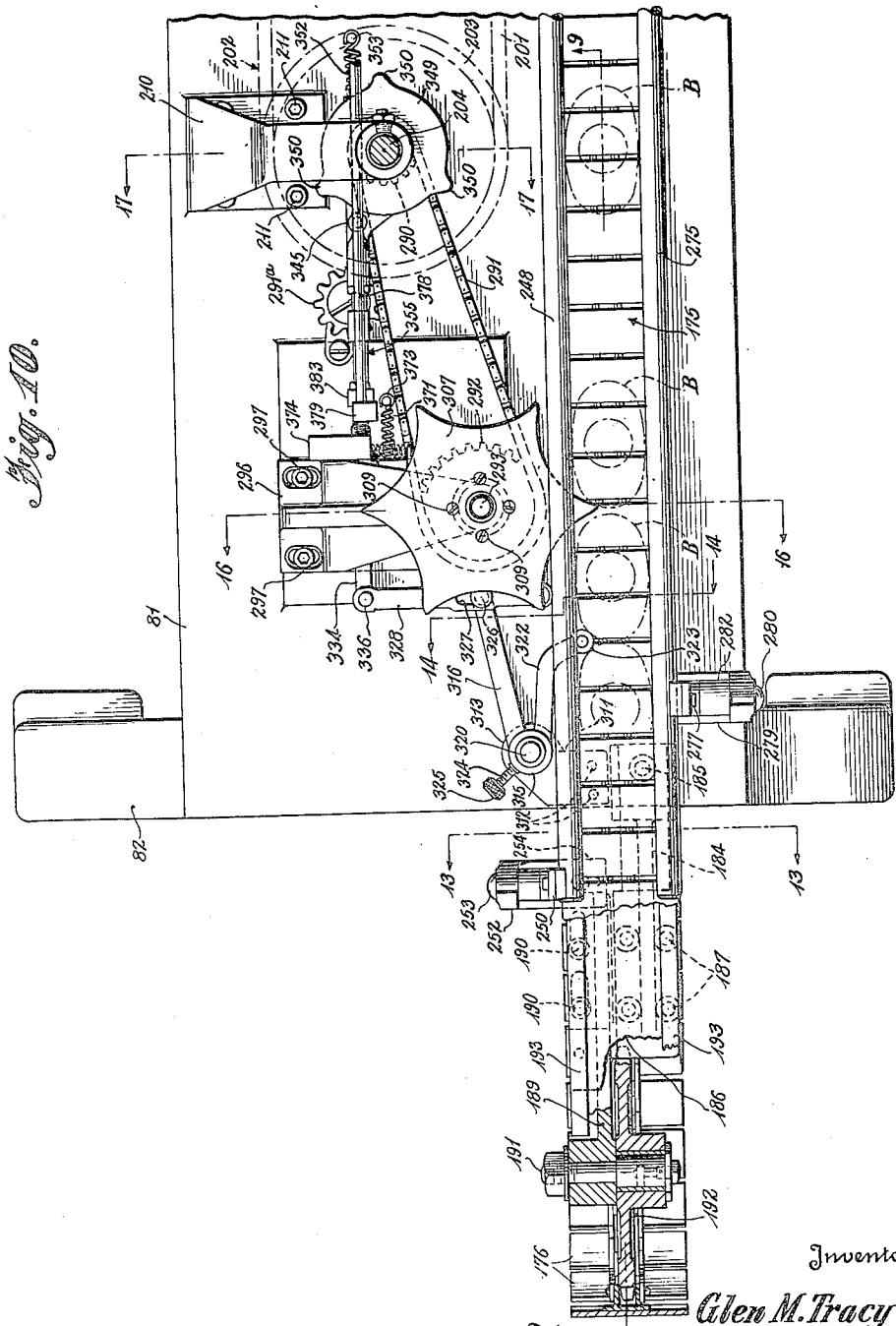

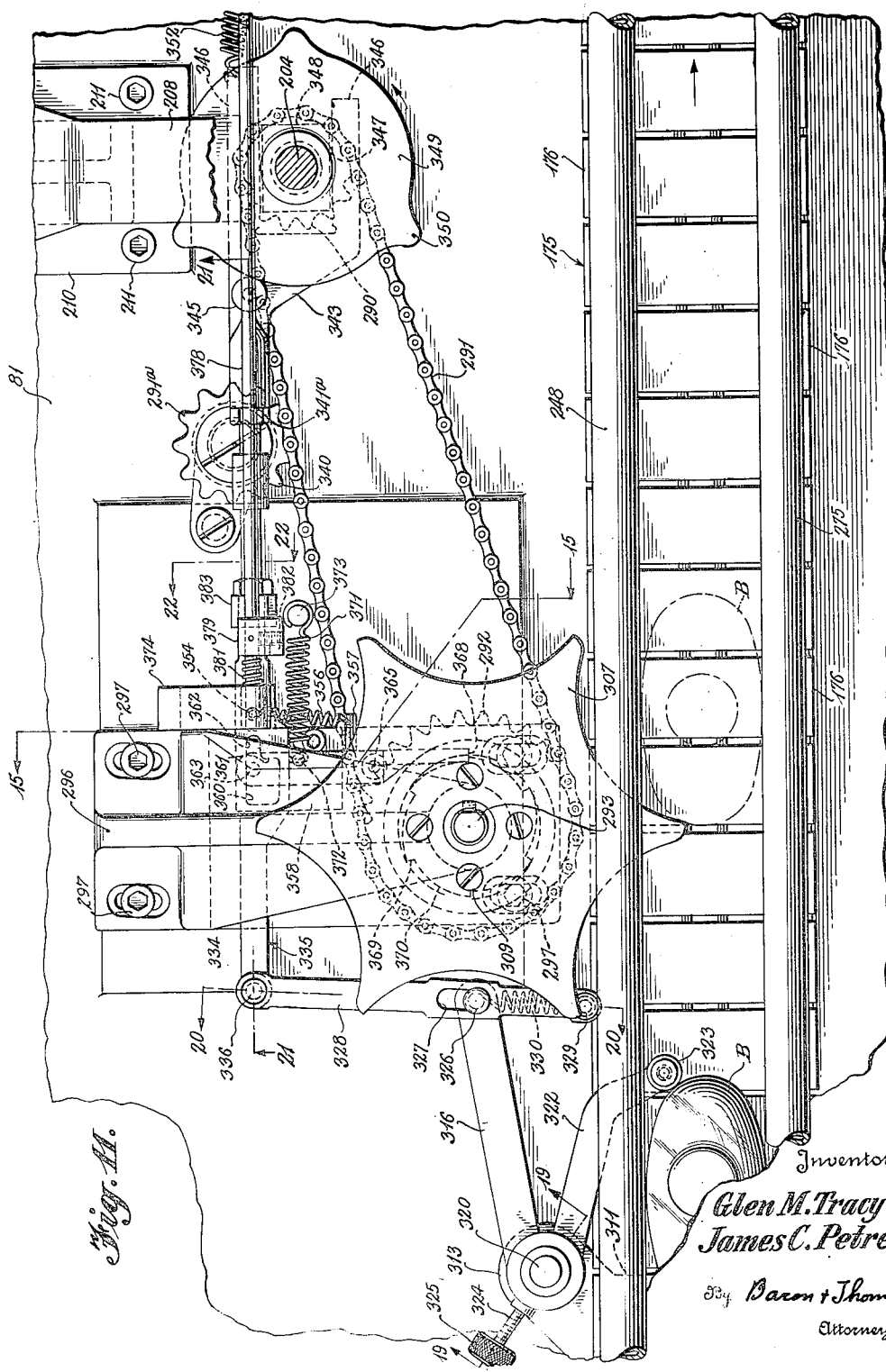

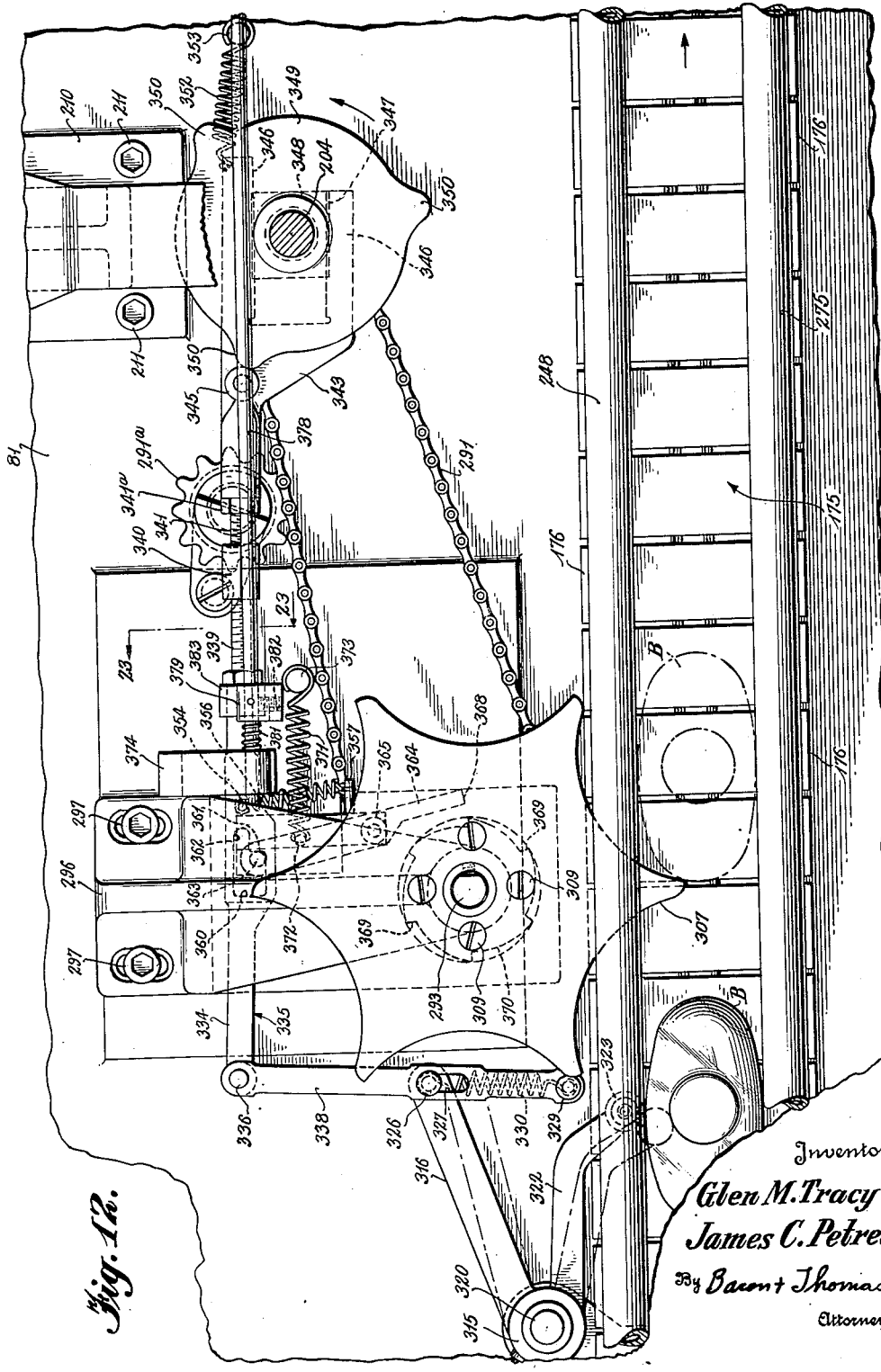

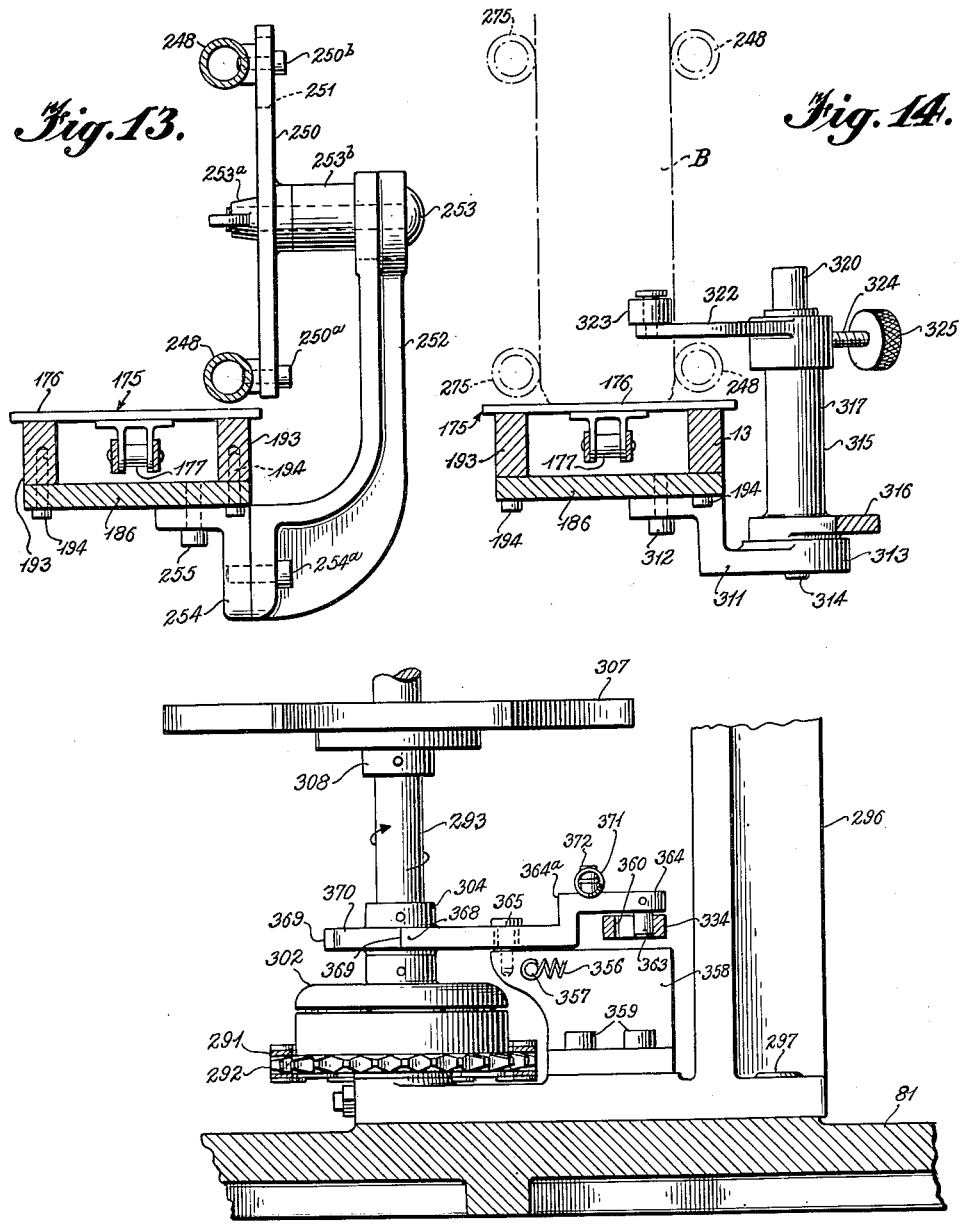

March 3, 1953 — G. M. TRACY ET AL — 2,630,260
AUTOMATIC BAND APPLYING MACHINE
Filed March 19, 1947 — 42 Sheets-Sheet 13
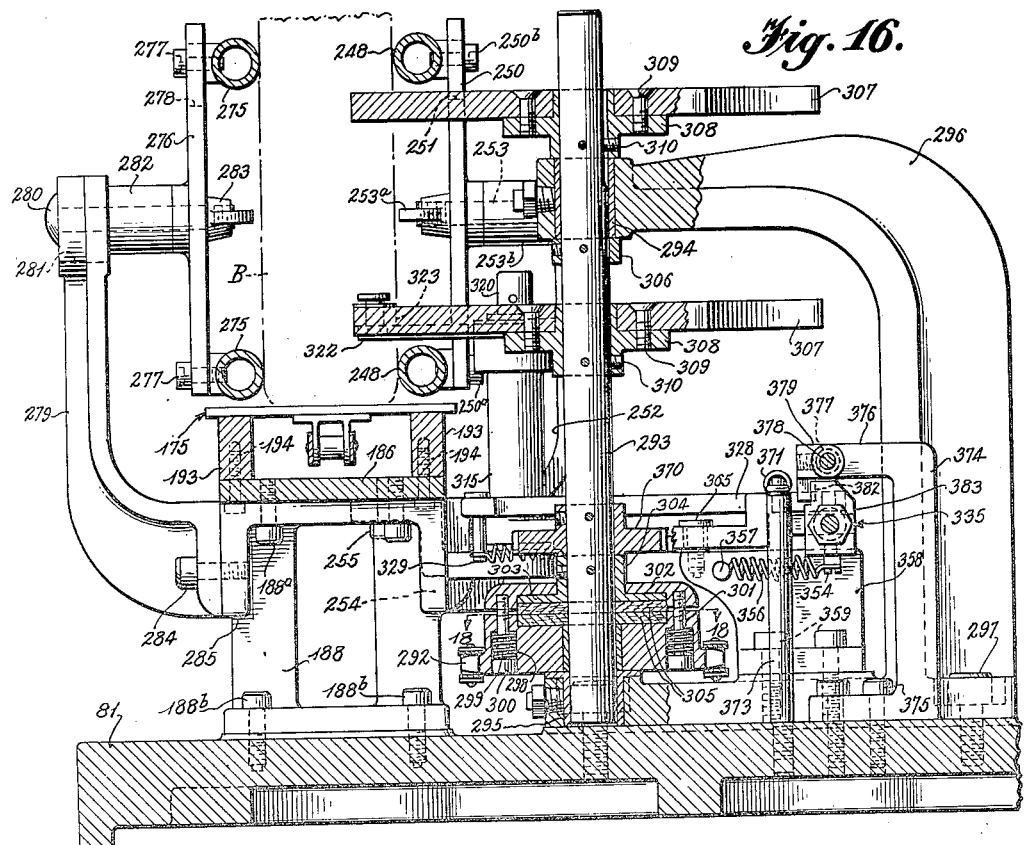
*Fig. 16.*
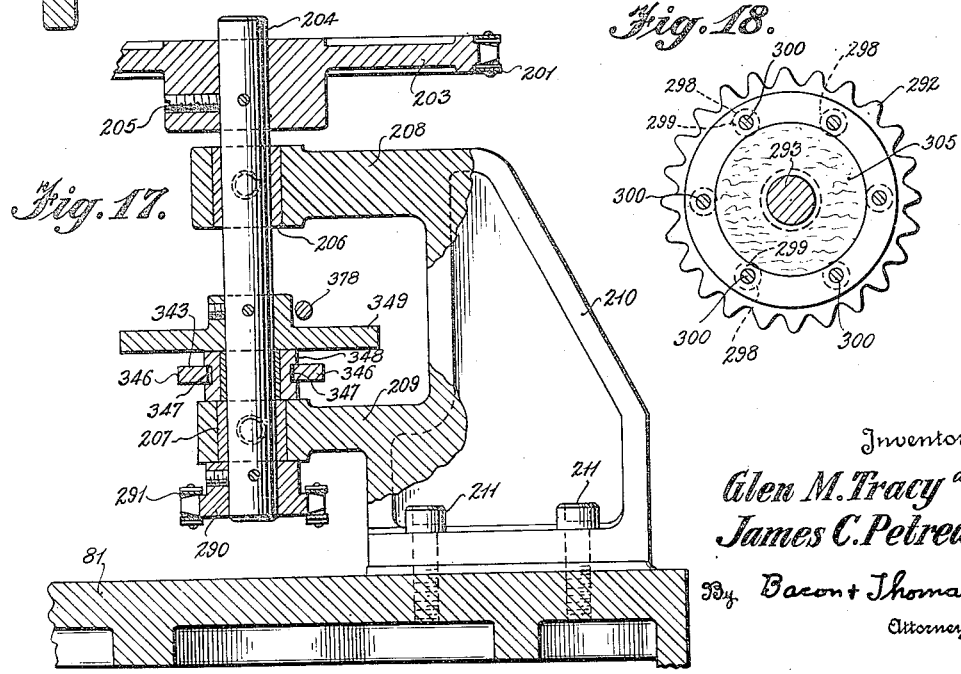
*Fig. 17.*
*Fig. 18.*
Inventors
Glen M. Tracy and
James C. Petrea
By Bacon + Thomas
Attorneys

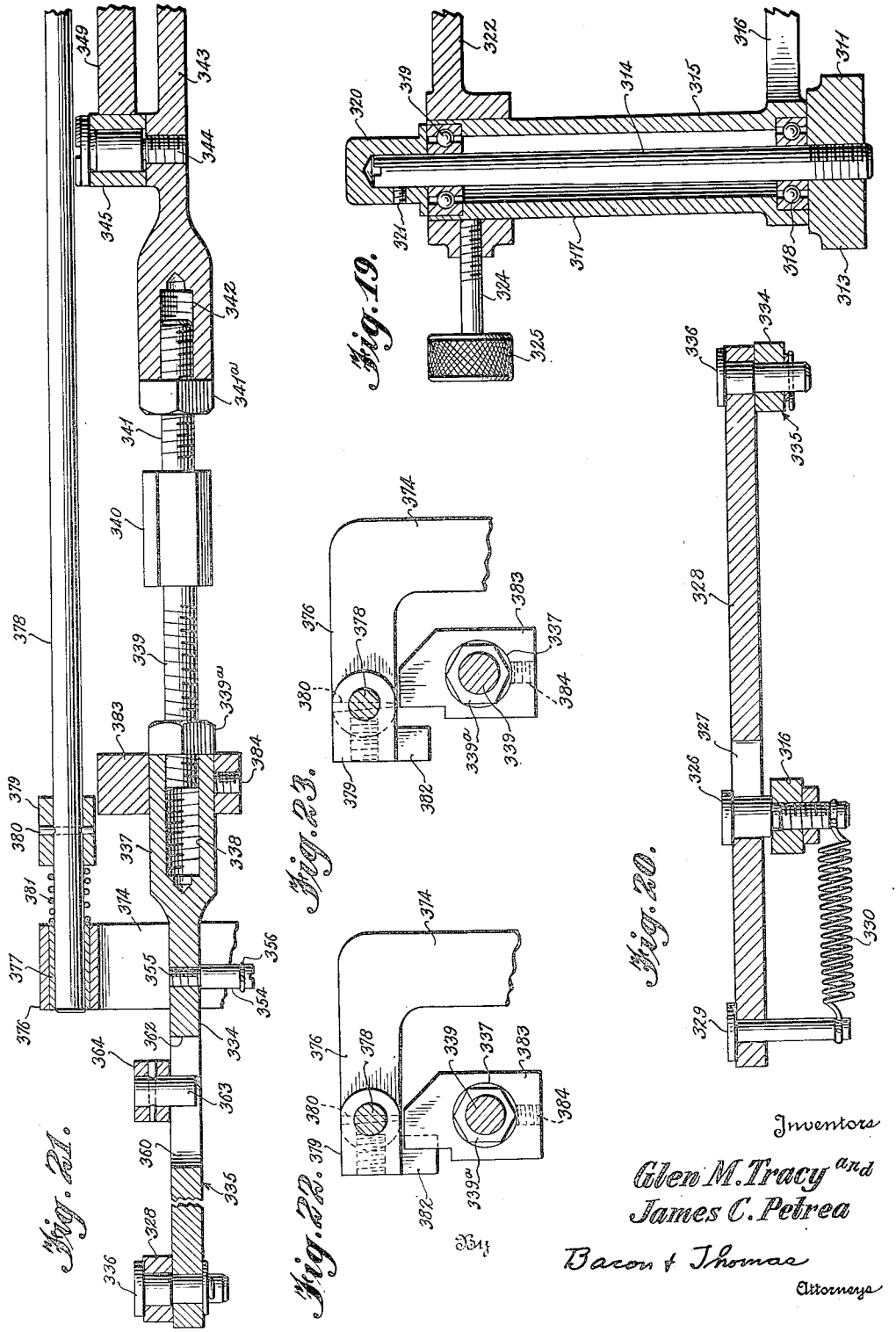

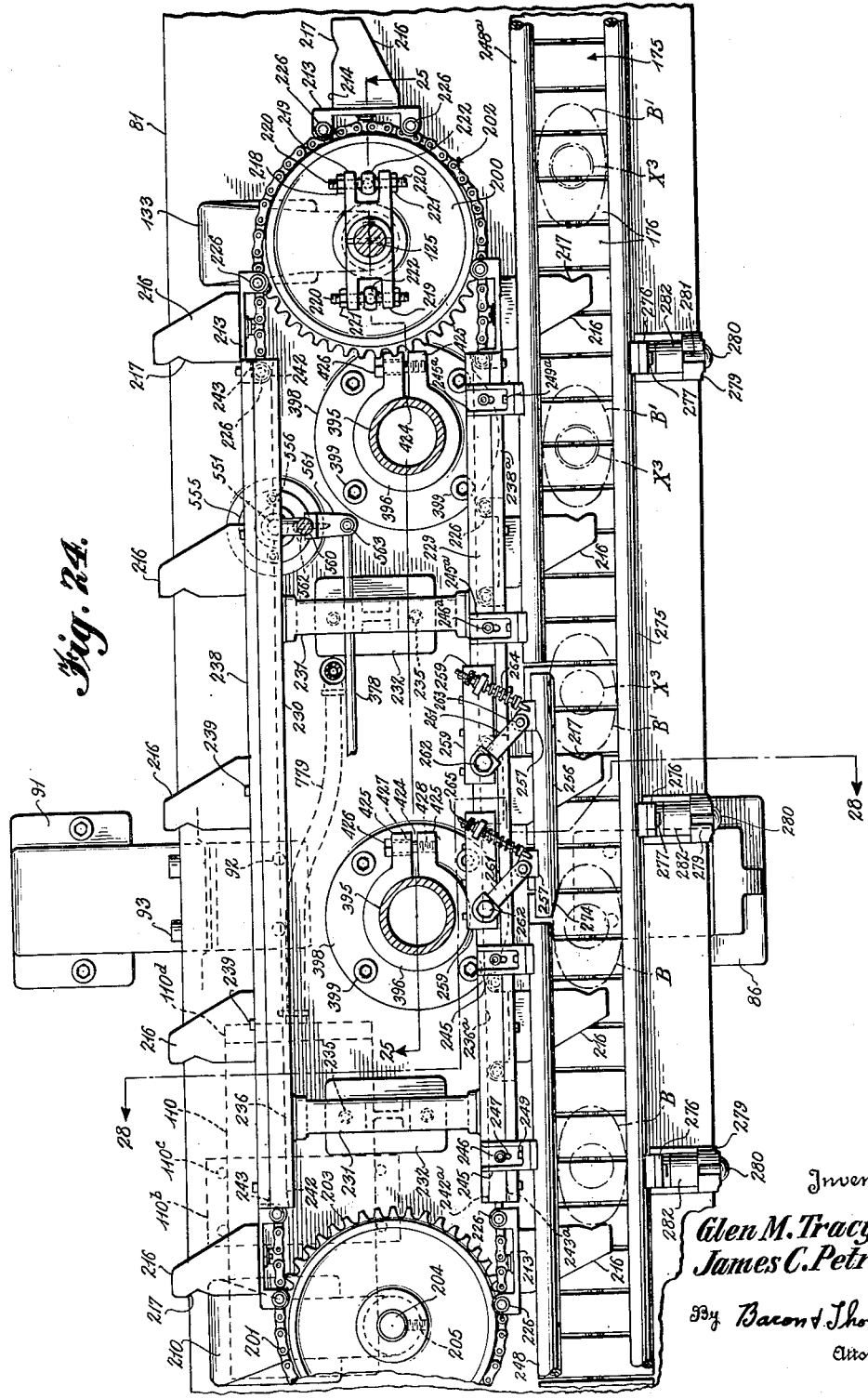

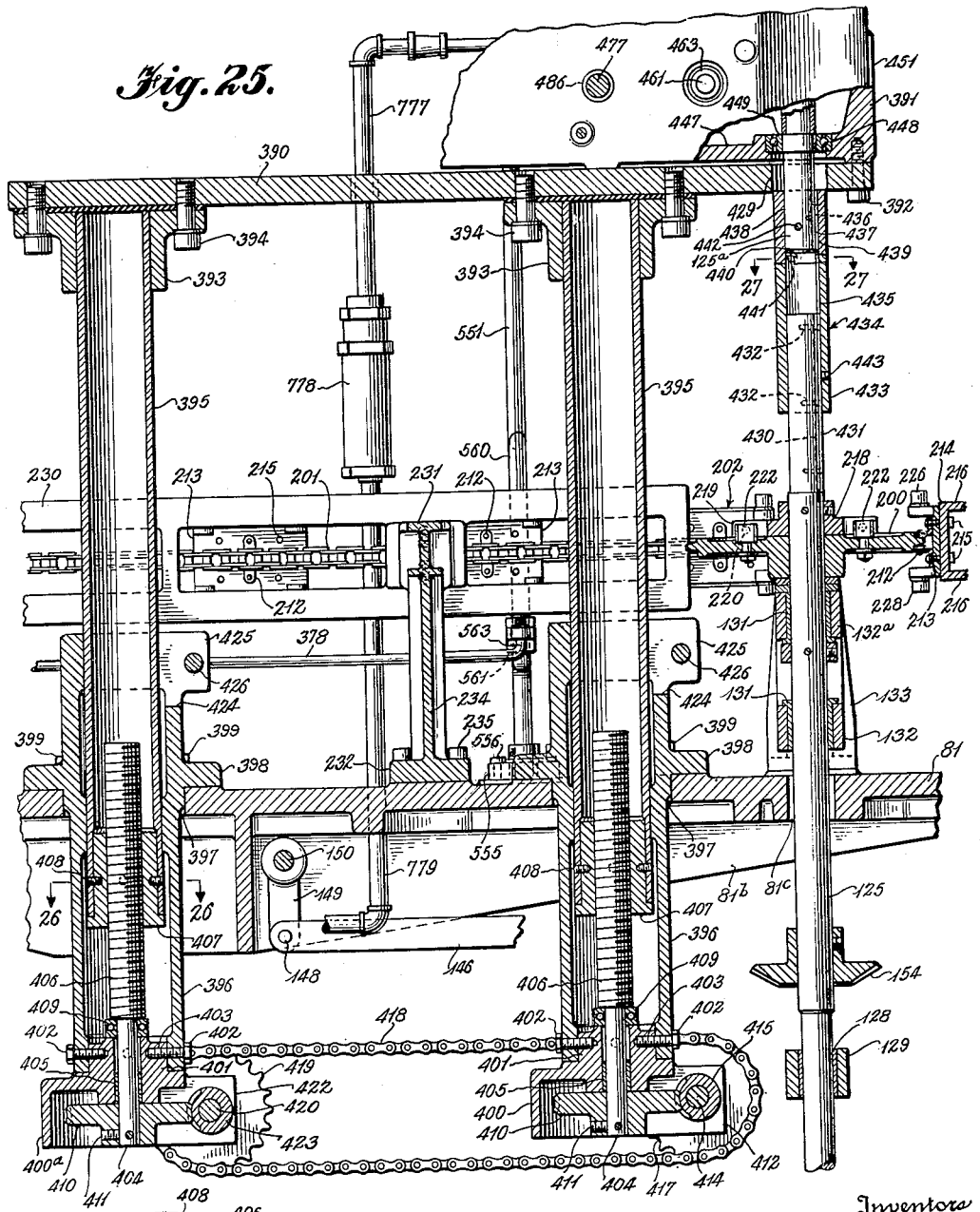

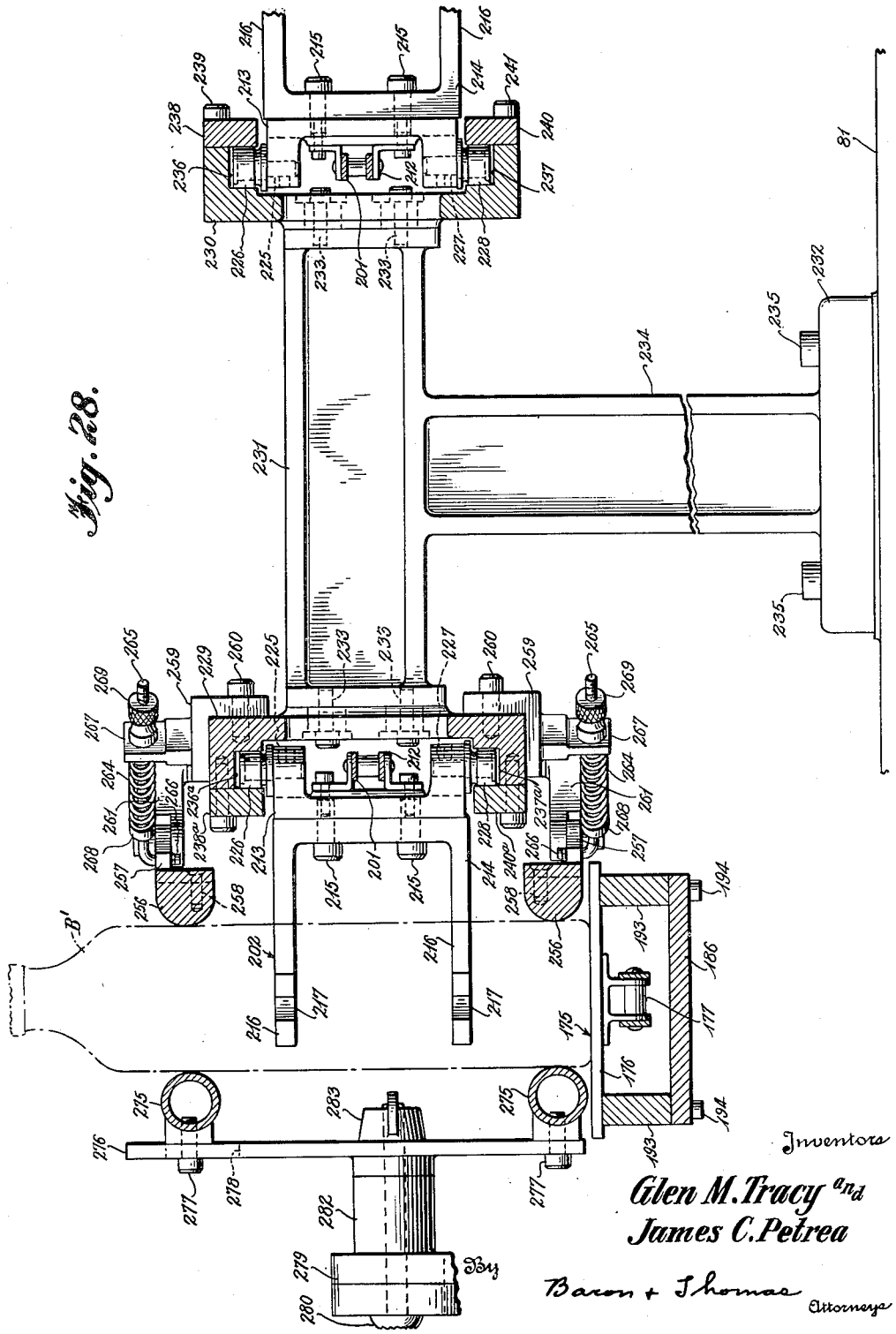

March 3, 1953  G. M. TRACY ET AL  2,630,260
AUTOMATIC BAND APPLYING MACHINE
Filed March 19, 1947  42 Sheets-Sheet 18
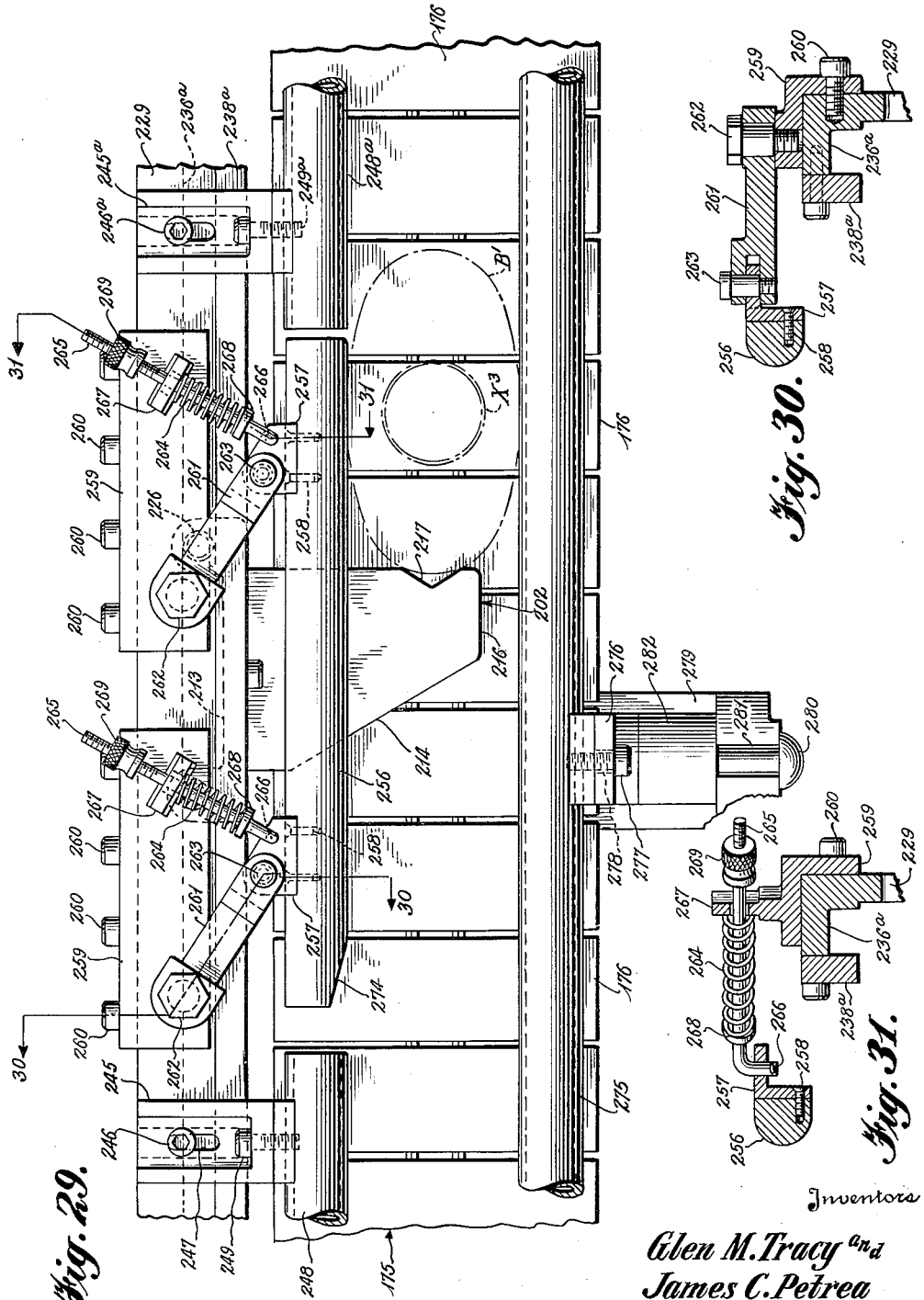
Inventors
Glen M. Tracy and
James C. Petrea
By Bacon + Thomas
Attorneys

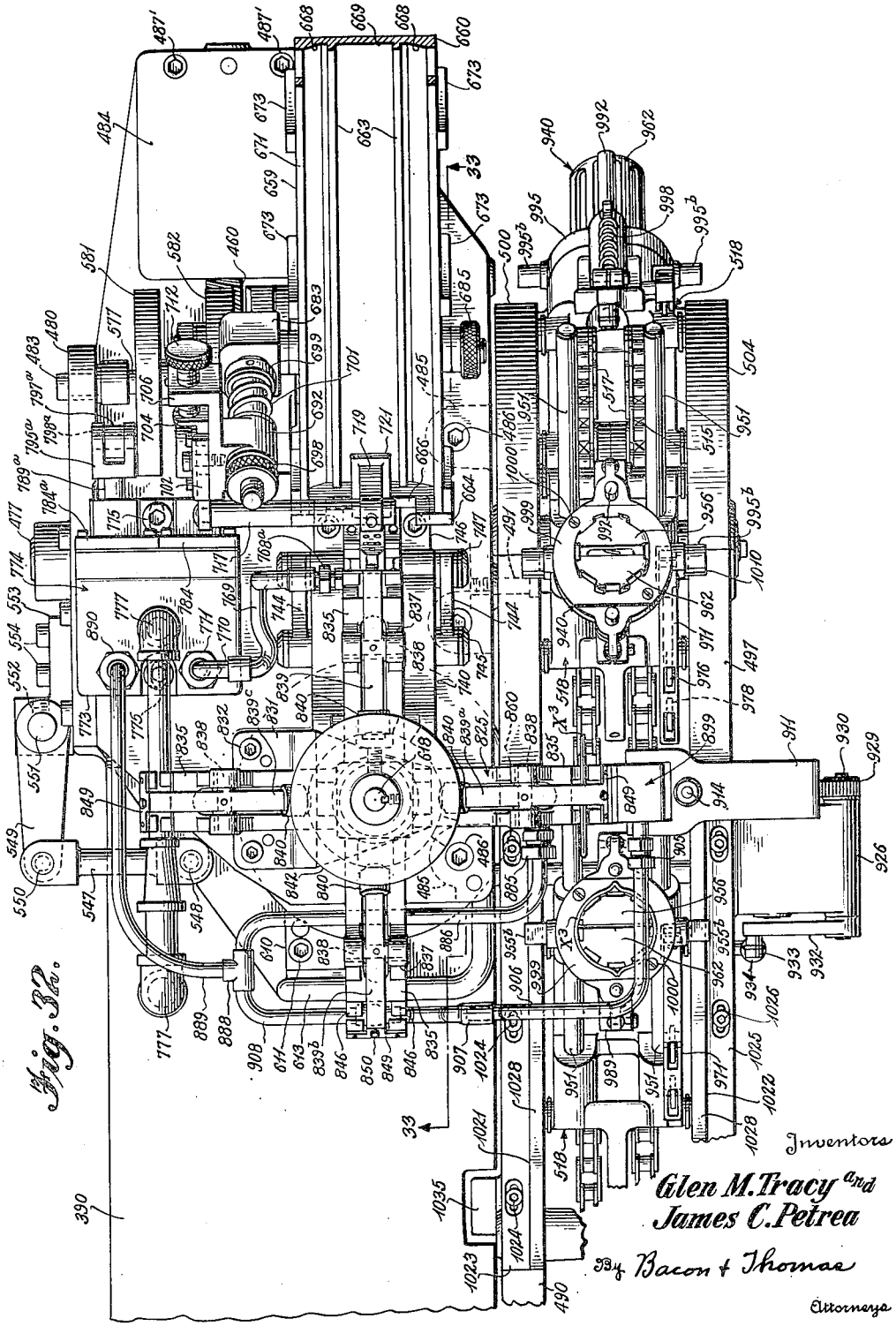

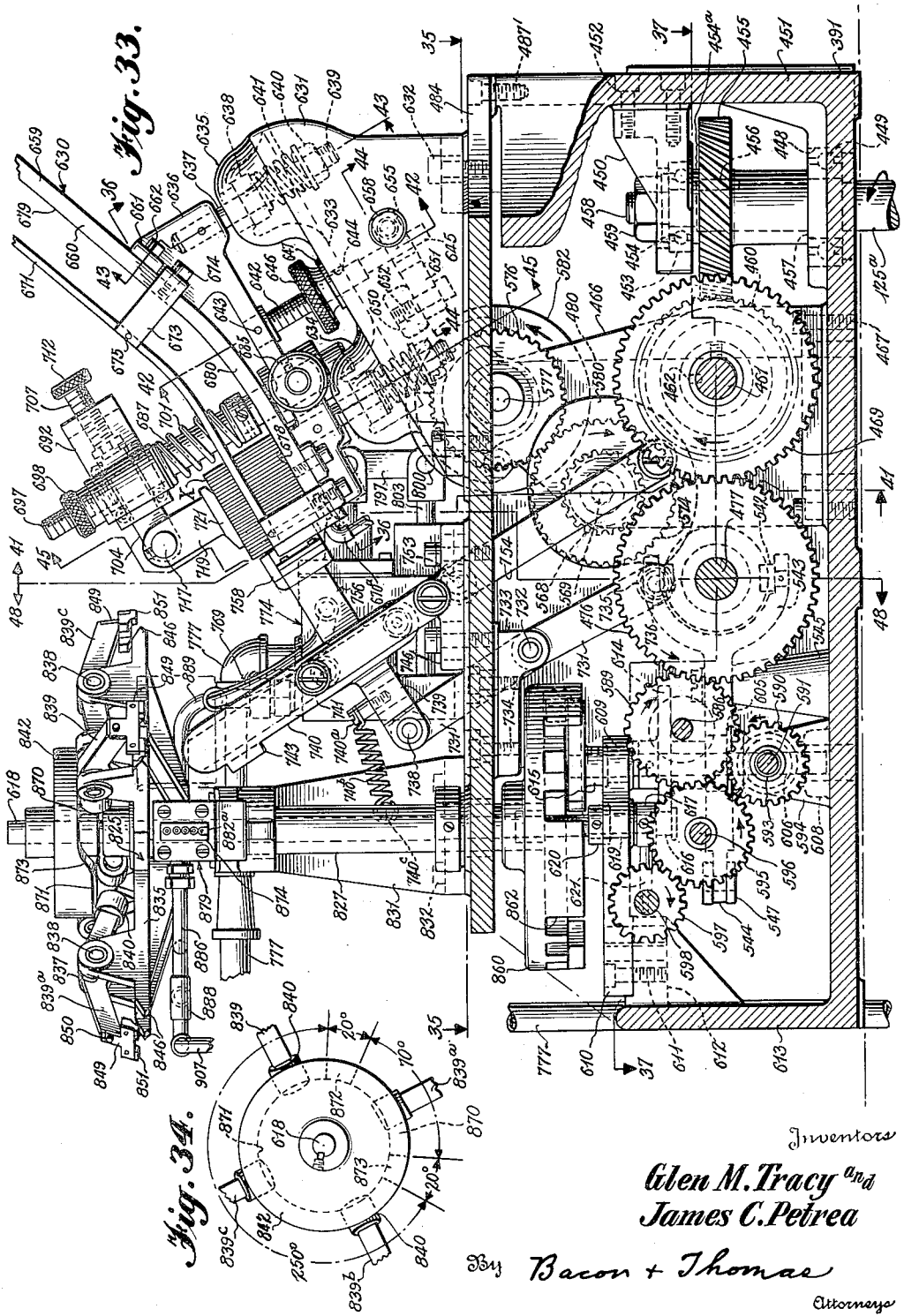

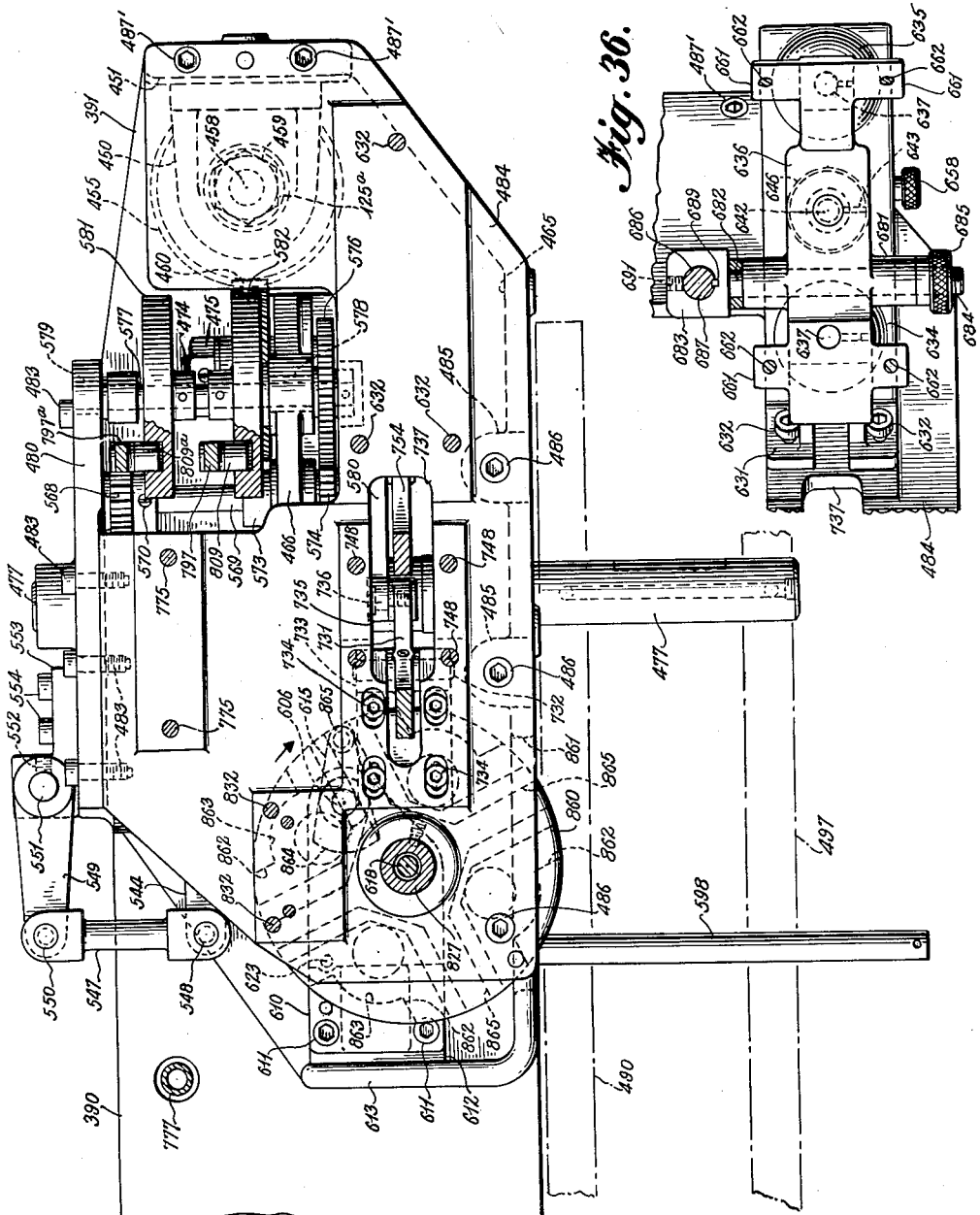

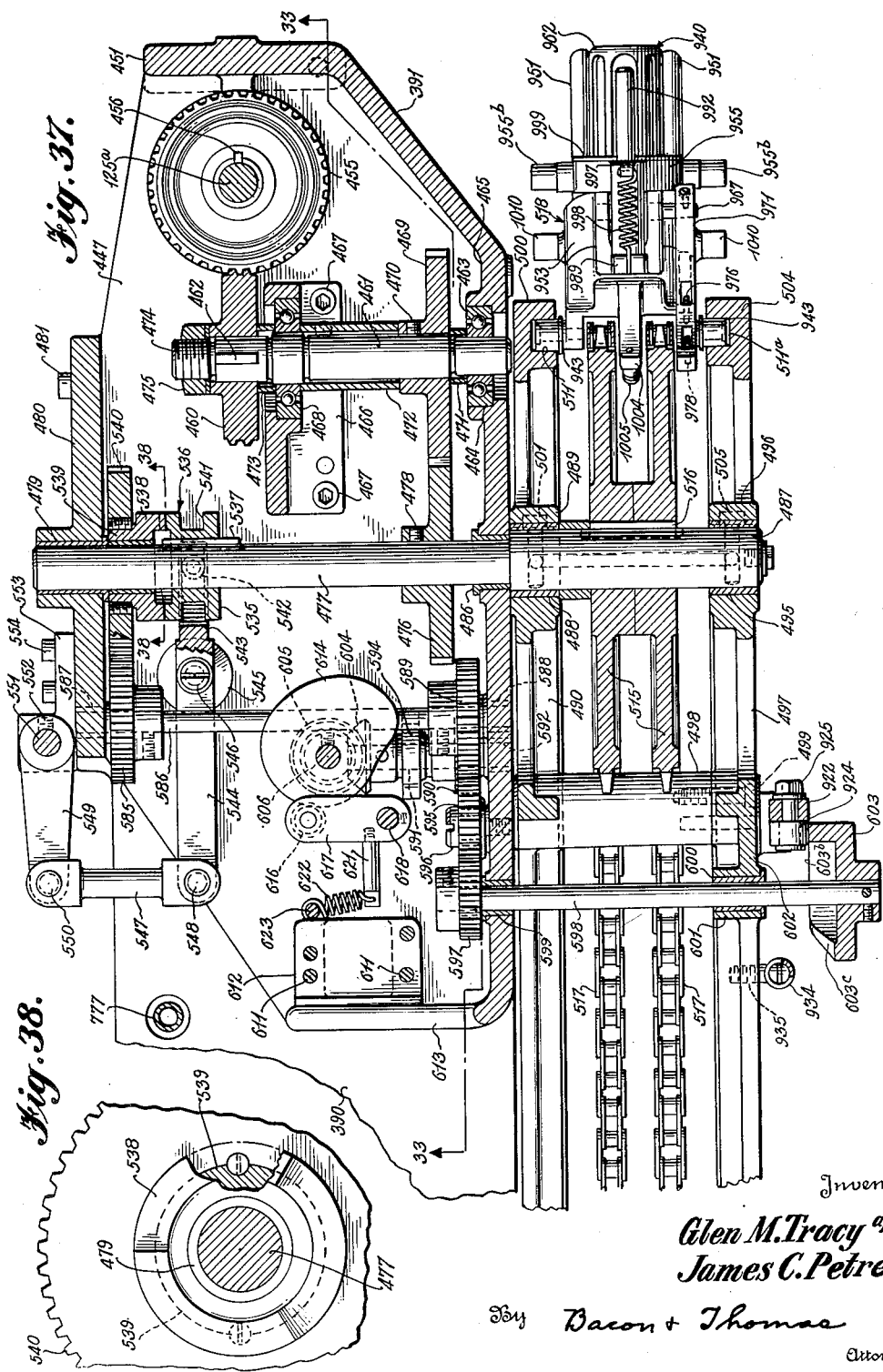

March 3, 1953 — G. M. TRACY ET AL — 2,630,260
AUTOMATIC BAND APPLYING MACHINE
Filed March 19, 1947 — 42 Sheets-Sheet 23

Inventors
Glen M. Tracy and
James C. Petrea
Bacon + Thomas
Attorneys

March 3, 1953 G. M. TRACY ET AL 2,630,260
AUTOMATIC BAND APPLYING MACHINE
Filed March 19, 1947 42 Sheets-Sheet 24
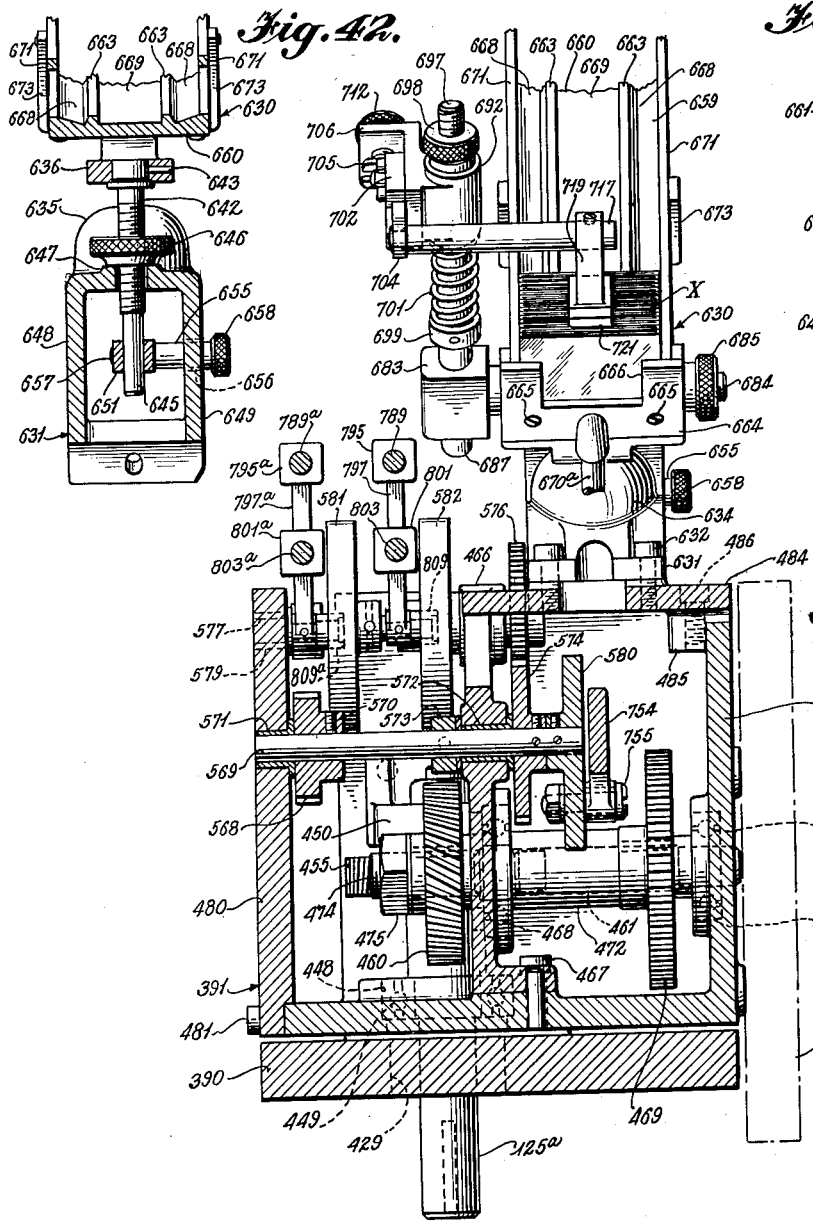
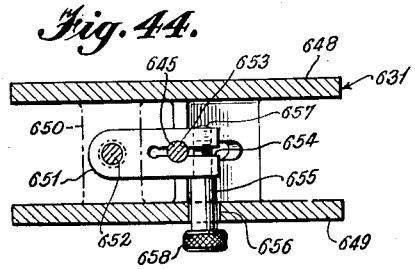
Inventors
Glen M. Tracy and
James C. Petrea
By Bacon + Thomas
Attorneys

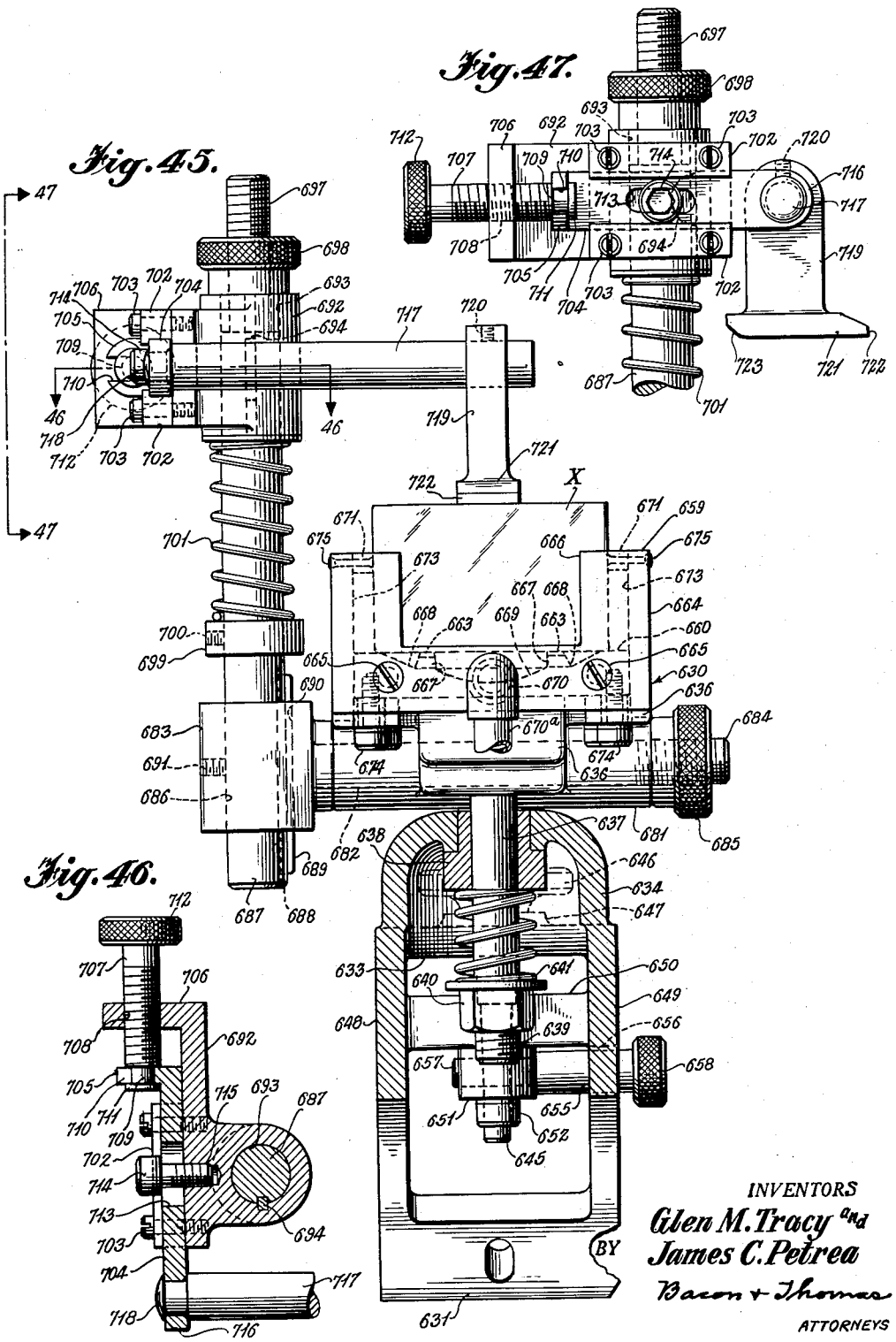

March 3, 1953  G. M. TRACY ET AL  2,630,260
AUTOMATIC BAND APPLYING MACHINE
Filed March 19, 1947  42 Sheets-Sheet 27

Inventors
Glen M. Tracy and
James C. Petrea
By Bacon + Thomas
Attorneys

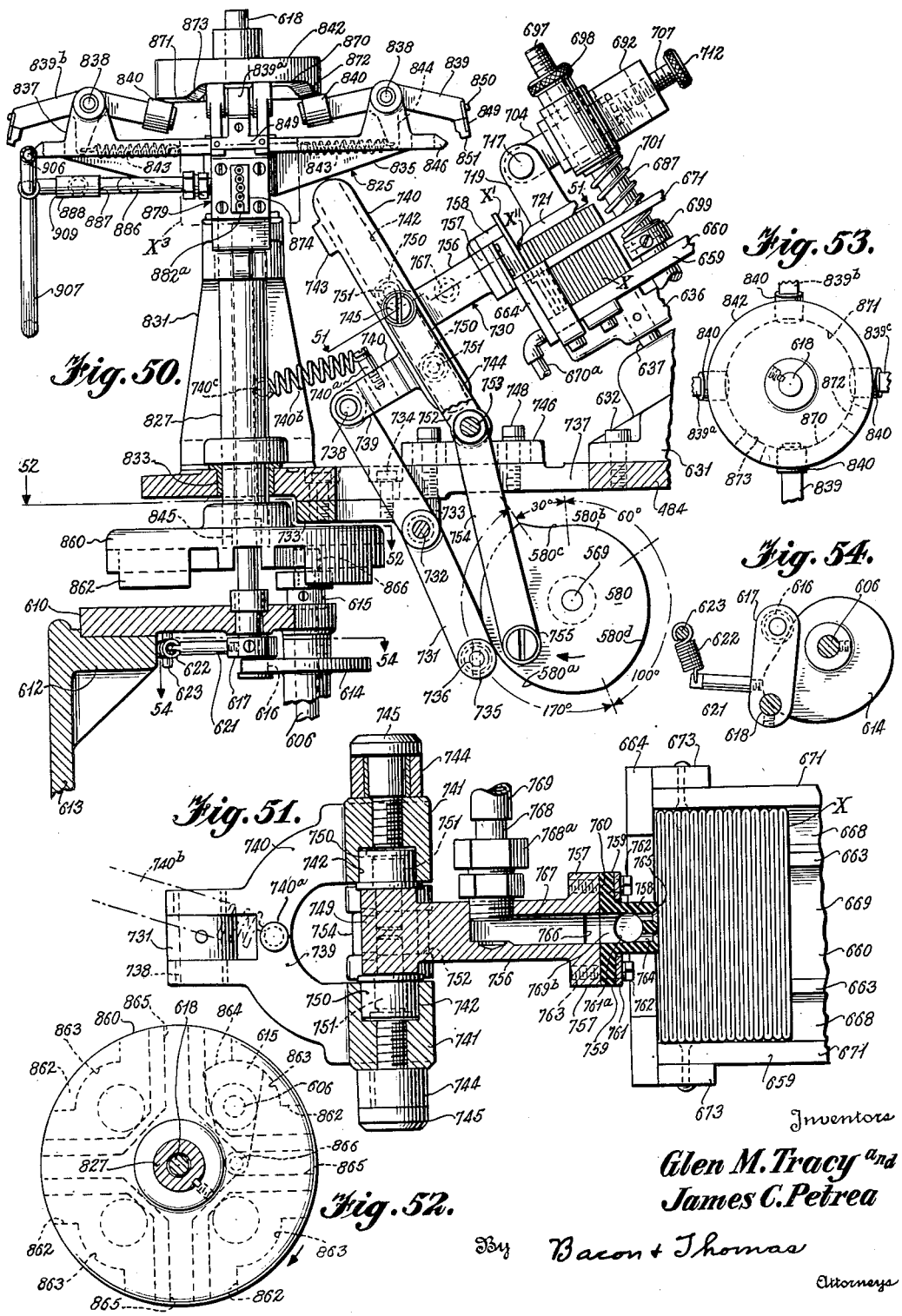

March 3, 1953 G. M. TRACY ET AL 2,630,260
AUTOMATIC BAND APPLYING MACHINE
Filed March 19, 1947 42 Sheets-Sheet 29

Inventors
Glen M. Tracy and
James C. Petrea
By Bacon + Thomas
Attorneys

March 3, 1953 G. M. TRACY ET AL 2,630,260
AUTOMATIC BAND APPLYING MACHINE
Filed March 19, 1947 42 Sheets-Sheet 30
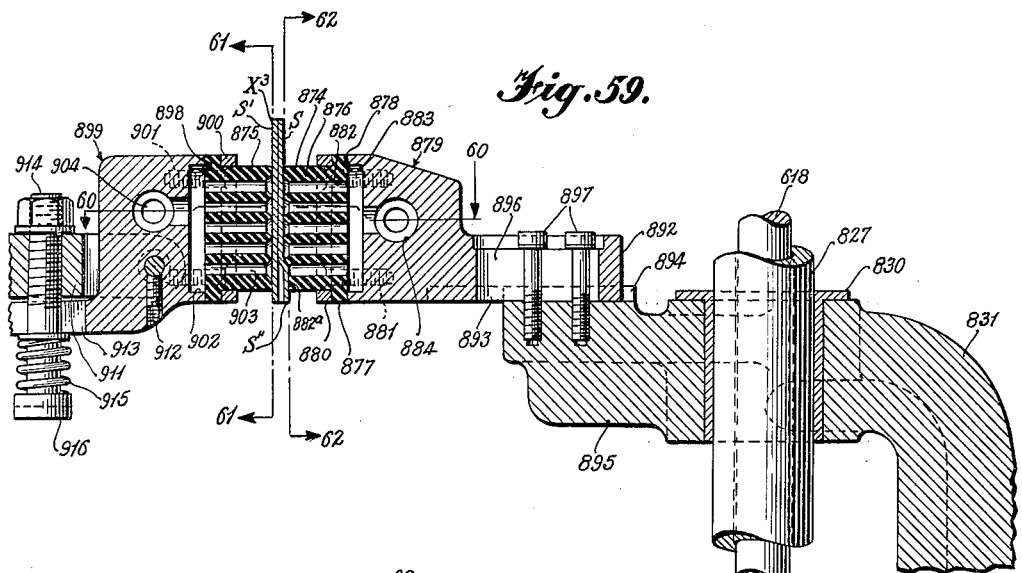
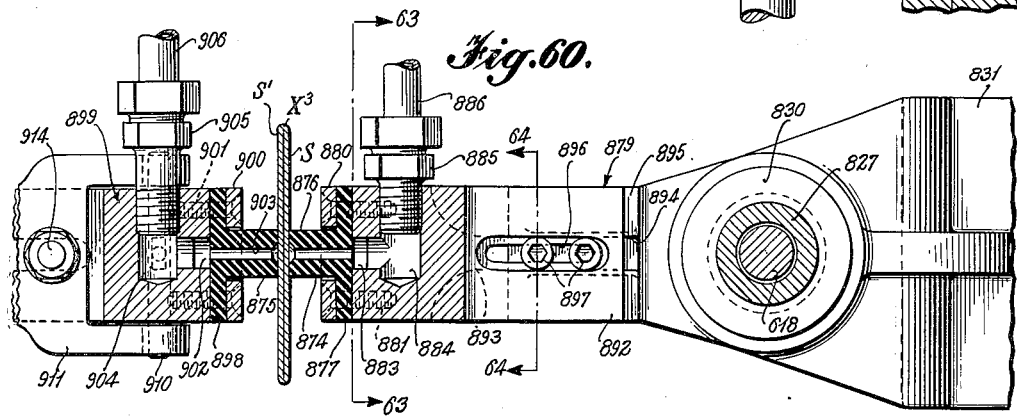
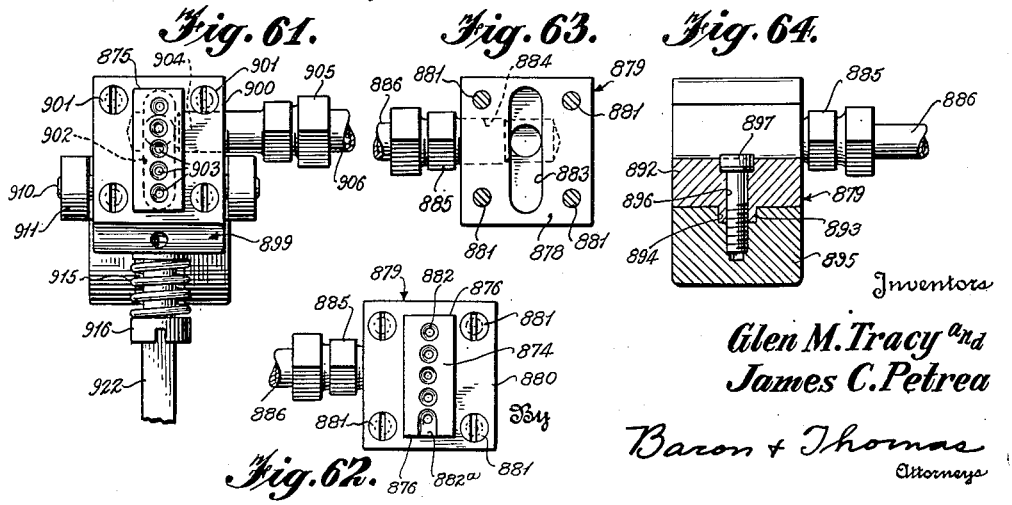
Inventors
Glen M. Tracy and
James C. Petrea
Baron + Thomas
Attorneys

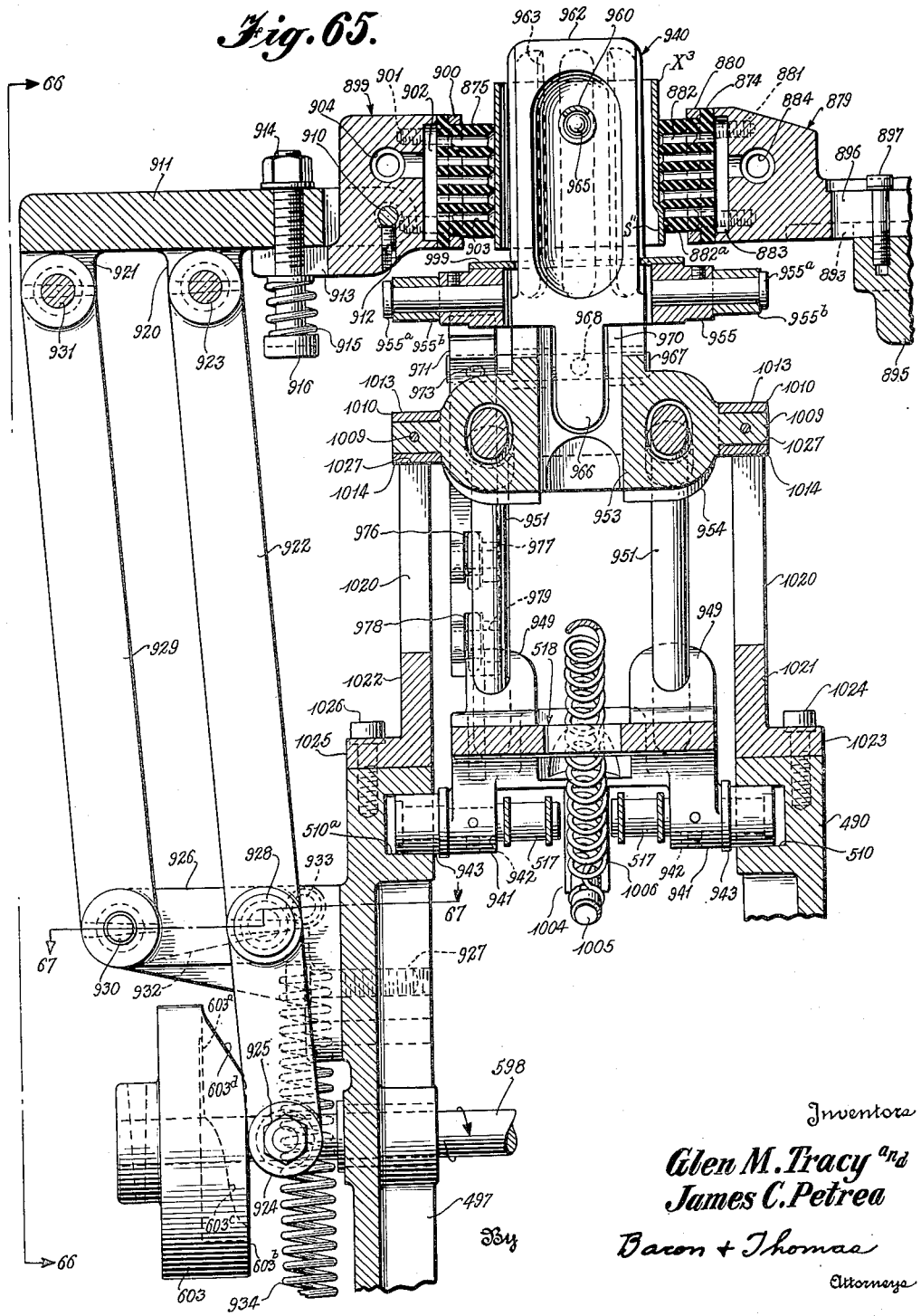

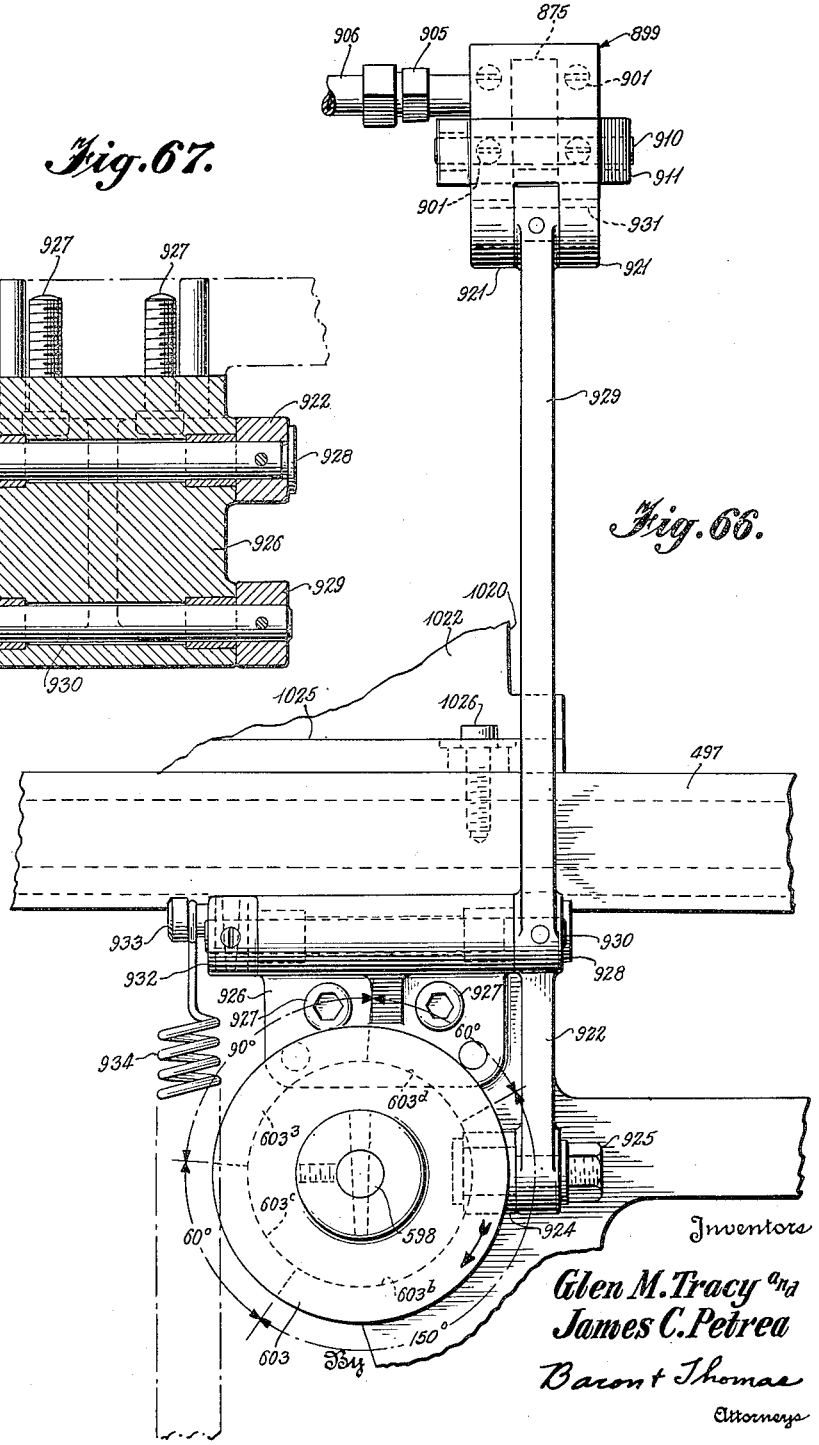

Inventors
Glen M. Tracy and
James C. Petrea
By Baron + Thomas
Attorneys

March 3, 1953   G. M. TRACY ET AL   2,630,260
AUTOMATIC BAND APPLYING MACHINE
Filed March 19, 1947   42 Sheets-Sheet 34

Inventors
Glen M. Tracy and
James C. Petrea
By Bacon + Thomas
Attorneys

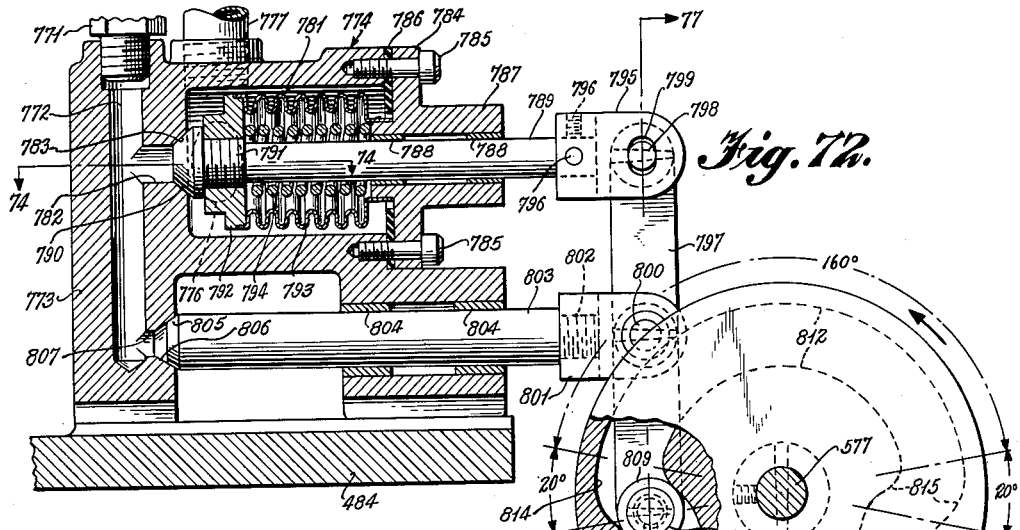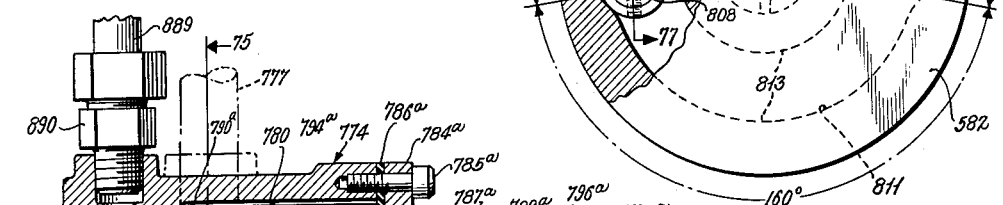

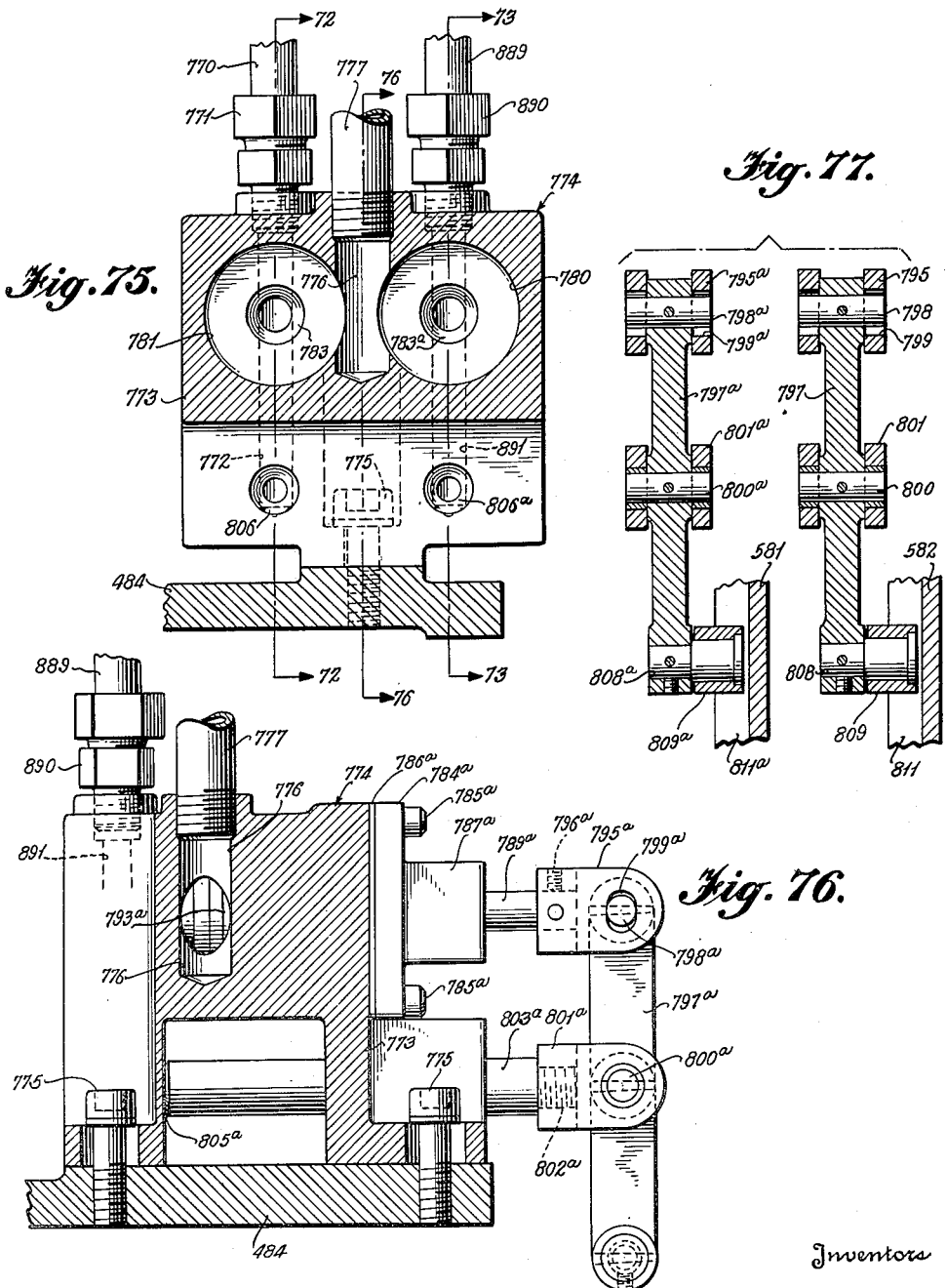

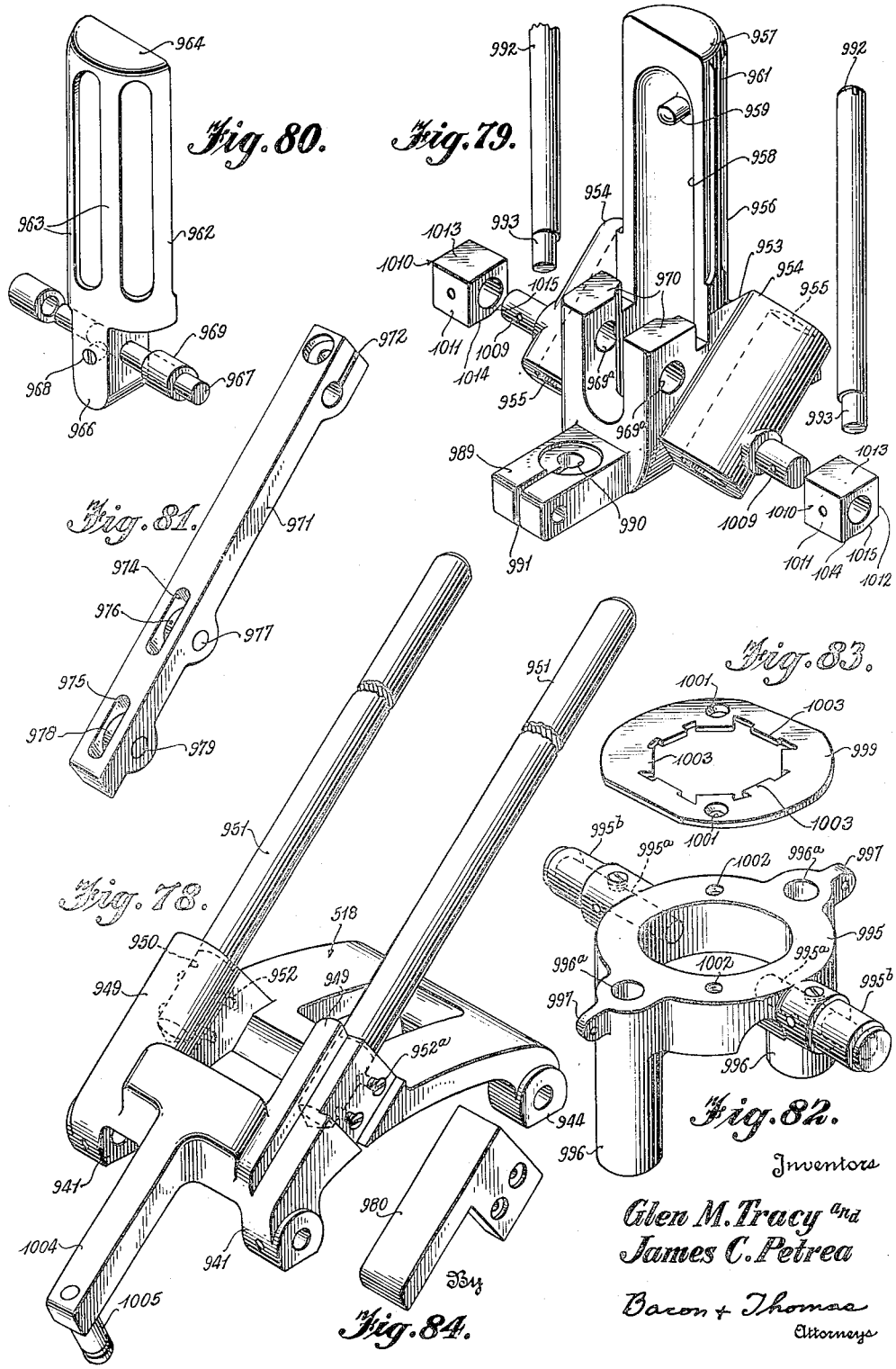

March 3, 1953 G. M. TRACY ET AL 2,630,260
AUTOMATIC BAND APPLYING MACHINE
Filed March 19, 1947 42 Sheets-Sheet 39
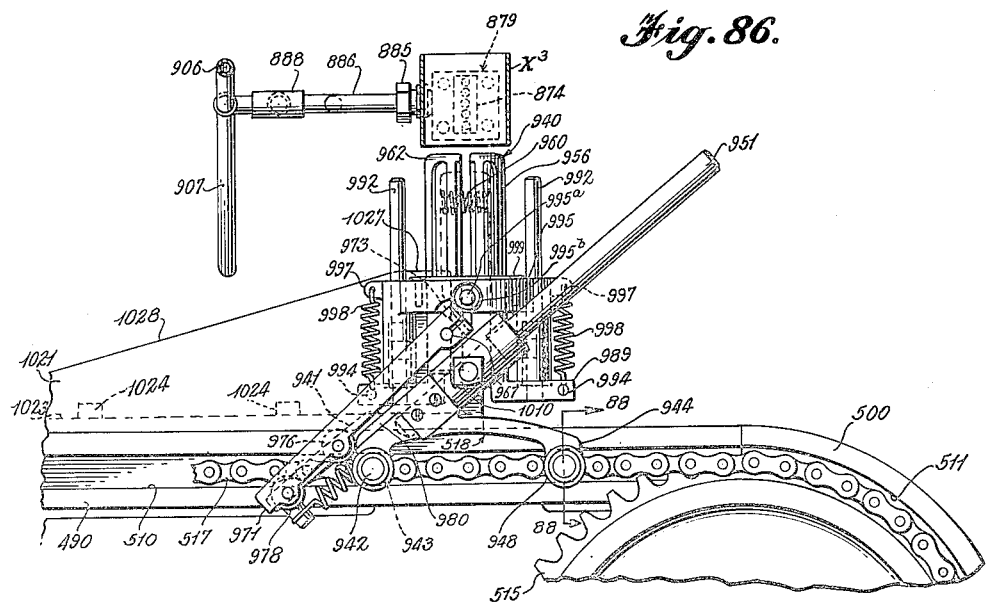
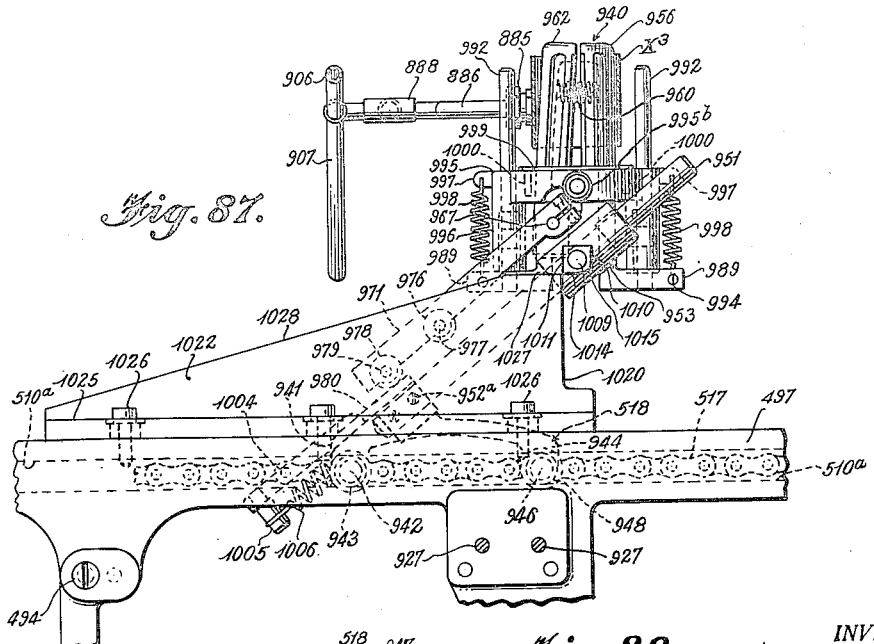
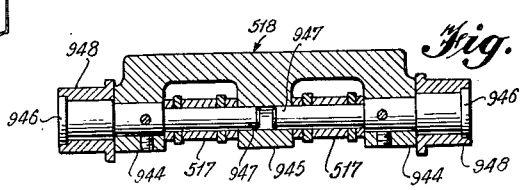
INVENTORS
Glen M. Tracy and
James C. Petrea
BY Bacon + Thomas
ATTORNEYS

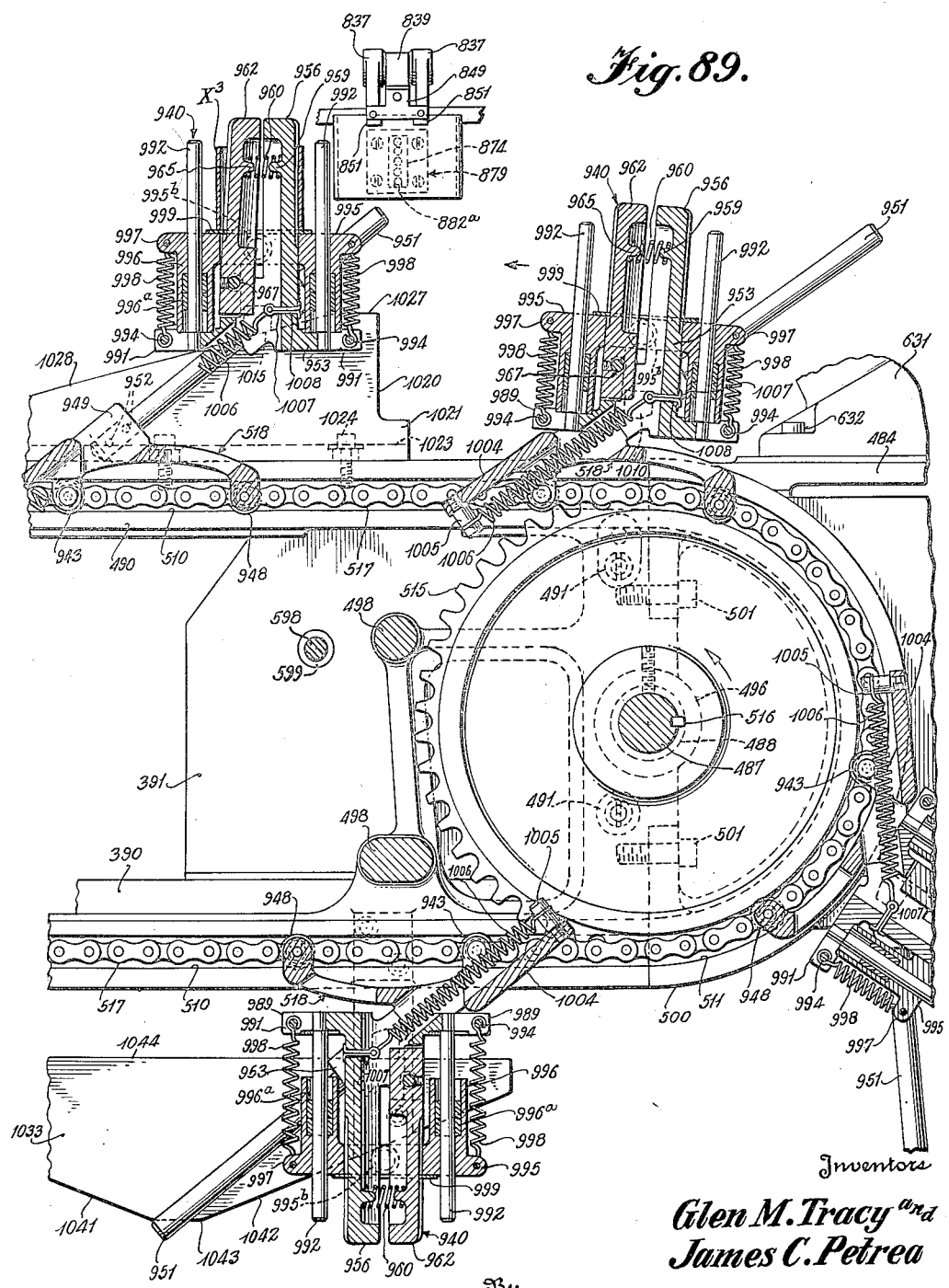

March 3, 1953 G. M. TRACY ET AL 2,630,260
AUTOMATIC BAND APPLYING MACHINE
Filed March 19, 1947 42 Sheets-Sheet 41
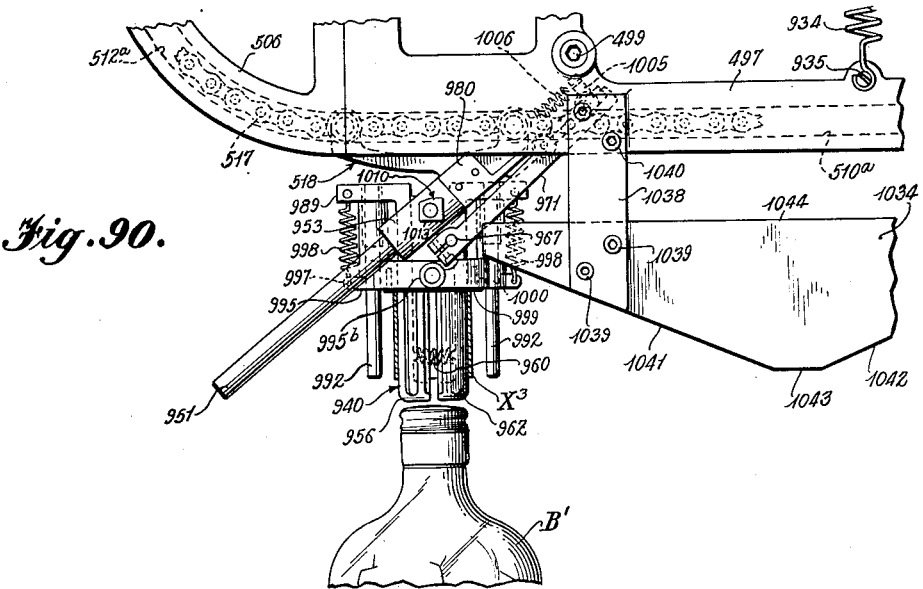
*Fig. 90.*
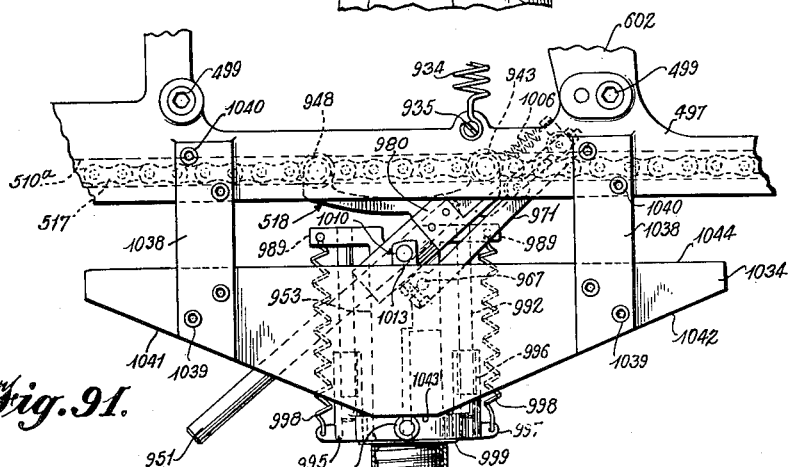
*Fig. 91.*
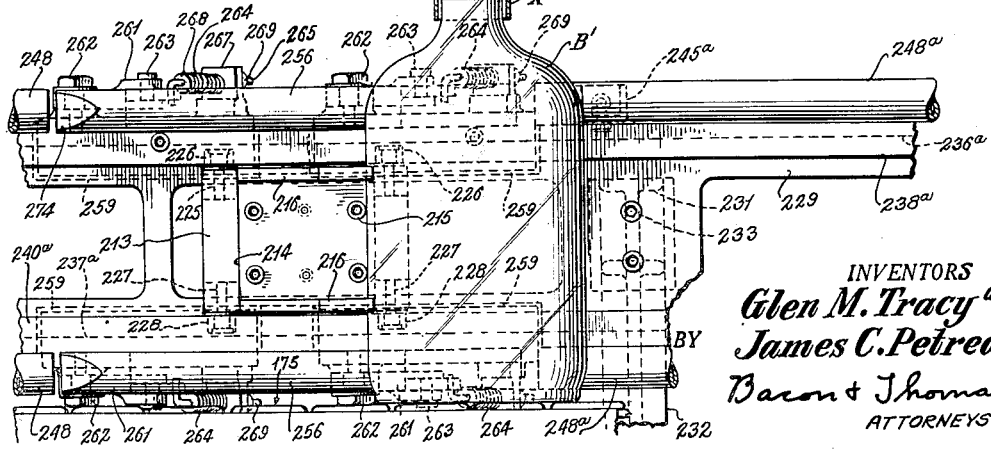
INVENTORS
Glen M. Tracy and
James C. Petrea
BY Bacon & Thomas
ATTORNEYS

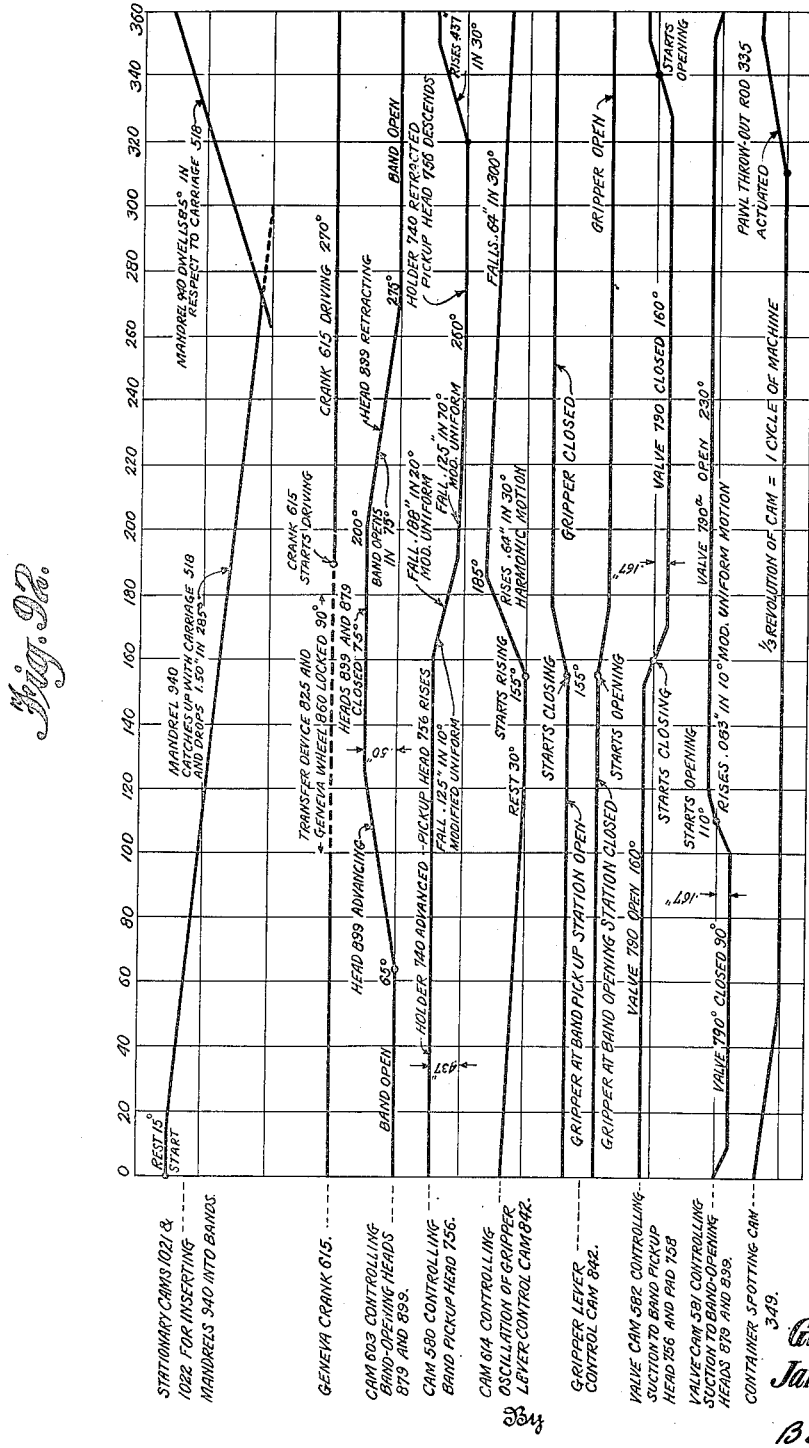

UNITED STATES PATENT OFFICE 2,630,260

AUTOMATIC BAND APPLYING MACHINE

Glen M. Tracy and James C. Petrea, Durham, N. C., assignors to Wright Machinery Company, Durham, N. C., a corporation of North Carolina Application March 19, 1947, Serial No. 735,696

11 Claims. (Cl. 226—80)

This invention relates to an automatic band applying machine, and more particularly to an automatic machine for applying continuous bands or sleeves of wet regenerated cellulose material, or any other suitable material which contracts or shrinks upon dehydration, to the neck of a bottle or other container in such manner that the closure member of the bottle, that is, the cap or cork, cannot be removed without breaking the seal formed by the band.

The invention further relates to an automatic machine for applying contractible bands or sleeves to bottles over a tax strip stamp, such as a revenue stamp applied to bottles containing alcoholic beverages. In such instances, the tax stamp cannot be removed, or the bottle emptied or refilled, without destroying the seal provided by the band.

The invention still further relates to a novel apparatus and method for removing wet bands in a flattened condition from a magazine, and for effecting the opening of such wet bands from a flattened condition into a condition to receive a band supporting element of a band applying mechanism.

Briefly, the machine embodying the principles of the present invention comprises a supply magazine in which bands of wet regenerated cellulose, or other suitable shrinkable material, in flattened condition, are adapted to be stacked with their flat sides in contact. A band pickup head, connected with a source of sub-atmospheric pressure or vacuum, is arranged so that a suction pad carried thereby travels through a substantially triangular path, the base portion of said path requiring the suction pad to move forward to engage the foremost band in the stack and, preferably, to push back the entire stack in the magazine to a predetermined point, so that when the pickup head is raised it will always begin its upward movement from a predetermined position. The foremost band is gripped by the suction pad upon the application of vacuum thereto prior to its being raised and a foot, or stop, associated with the supply magazine is arranged adjacent the point of maximum forward travel of the pickup head so that it prevents all but the foremost band from being removed from the magazine. The upward movement of the pickup head removes the foremost band from the magazine, causing it to slide across the second band, which is constrained against removal by the aforementioned foot. The band thus removed is delivered by the pickup head to one arm of a transfer device where it is clamped by a gripper lever carrying a pair of yieldably mounted blocks. The band transfer device is rotated intermittently in one direction by a Geneva mechanism, but is stationary at the time that the band pickup head delivers a band thereto. After a band has been delivered to the band transfer device and gripped by a gripper lever, the suction is released on the band pickup head and it returns to its initial starting position. The band transfer device is then rotated to a "stand-by" position where it remains until a container or bottle is fed into the machine by a main container-supporting conveyor.

Containers can be fed to the container-supporting conveyor by any suitable means, so long as the supply is in excess of the capacity of the machine. Containers or bottles received on the main conveyor are moved forward until they individually engage a trip arm or trip finger associated with a container "spotting" mechanism arranged to permit the bottles to pass a pair of star wheels one at a time to be distributed by the star wheels in predetermined spaced relation on the container-supporting conveyor. The trip arm associated with the star wheels also controls a jaw clutch associated with a gear that drives the band pickup head, the band-opening mechanism, as well as the Geneva mechanism, supra, associated with the band transfer device. Accordingly, when the trip arm is actuated by the first bottle to enter the machine, the gear is allowed to drive the Geneva to cause the transfer device to move the band carried thereby from the stand-by position to a position between a pair of band-opening heads, each provided with a suction pad. When the band is positioned between the band-opening heads, the crank of the Geneva mechanism takes a position to interrupt the rotation of the transfer device in order to permit opening of the band. One of the band-opening heads is preferably held stationary, and the other band-opening head is moved relative thereto. The pad on the stationary band-opening head preferably has a groove at its lower end into which a portion of the adjacent side of the band is drawn to initially "crack" the band and permit the entry of air between the inner surfaces of the band. The movable band-opening head is preferably mounted upon a pivot arranged so that the face of a suction pad carried thereby is normally slightly inclined downwardly and away from the band prior to engagement therewith, said head pivoting into parallelism when it engages the band. Such pivotal movement may cause a slight slippage of one side of the band relative to the other, but this is not essential, although some benefit may result therefrom in breaking the adhesion of the inner wet surfaces of the band. Suction is applied to both pads prior to engagement of the band by the movable band-opening head. Accordingly, when a band is positioned between the band-opening heads, the movable band-opening head is moved in a manner such that the suction pad carried thereby grips one side of the flat band and presses the other side against the suction pad of the stationary band-opening head, which effects the above "cracking." While the band is thus gripped, the gripper lever holding the band is released by the action of an oscillatable cam. The movable band-opening head is then retracted, whereupon the movable band-opening head will pivot and assume its normal inclined position before it starts to move away from the stationary band-opening head. This pivoting action causes the band to be gradually opened from its lower edge toward its upper edge. In this manner, the adhesion of the wet inner surfaces of the flat band, which would otherwise resist free opening and separation of the sides, is readily overcome. This method of opening the bands constitutes an important feature of the invention because it represents the solution of a very difficult problem.

When the band has been opened into a substantially circular condition, a collapsible band-supporting mandrel (or a solid mandrel) carried by a continuously moving mandrel conveyor is momentarily constrained against forward movement by stationary cams and caused to move upwardly into the open band while the mandrel conveyor is in motion. After the mandrel has entered the open band to a predetermined extent, the vacuum on the band-opening heads is released to free the band, and the mandrel is permitted by the cams to resume forward movement with the mandrel conveyor.

The bottle-supporting conveyor travels at a faster lineal rate of speed than the lineal rate of speed of the mandrel conveyor. The bottles fed onto the bottle-supporting conveyor pass between parallel guide bars, which present the same first, to the trip arm, and then to the star wheels. The guide bars at one side of the container-supporting conveyor include a yieldable or movable section, which normally projects inwardly into the path of travel of a bottle released by the star wheels so as to obstruct or arrest the movement thereof at a given point along the bottle conveyor. The bottle-supporting conveyor continues to move, of course, but with a sliding action relative to the arrested bottle so that the bottle remains stationary. A continuously driven indexing conveyor is arranged between the bottle-supporting conveyor and the mandrel conveyor, travelling at the same lineal speed as the mandrel conveyor. The indexing conveyor carries indexing fingers spaced apart the same distance as the spacing of the mandrels on the mandrel conveyor. The fingers on the indexing conveyor are arranged to come up behind a bottle whose movement has been arrested by the movable guide bars, the function of the indexing fingers being to move the bottle forward against the frictional resistance offered by the movable guide bars. The spacing of the indexing fingers relative to the mandrels is such that the indexing fingers will present successive bottles with their necks in true vertical alignment with successive mandrels. When any of the fingers on the indexing conveyor engage a bottle, the bottle is forced to move forward, the bottle itself pushing back the obstructing section of the guide bars. Any tendency of the main bottle conveyor to carry a bottle supported thereby faster than the movement of the indexing conveyor is overcome by the friction of the movable guide bars against the bottle, and in this manner the bottle is retained in contact with the indexing fingers for positive, controlled advancement by the indexing fingers. While the forward movement of the bottle is thus held to a speed corresponding to that of the speed of the mandrel conveyor, a stripper on the mandrel is actuated by stationary cams to slide the band off the mandrel and onto the neck of the bottle aligned therewith. The stripping operation is completed just before the bottle clears the obstructing section of the guide bars, and after clearing such obstruction the forward movement of the bottle is no longer retarded and it is then again carried by the main bottle conveyor and moved forwardly at a speed greater than the speed of the indexing conveyor. Hence, the bottle is moved clear of the particular fingers of the indexing conveyor which moved it past the obstruction, so that by the time said fingers have reached the sprocket at the end of the conveyor and begin their movement around the end sprocket the bottle will be well in advance thereof. This feature is important because it avoids all possible jamming or breaking of the bottles by the fingers of the indexing conveyor.

The main bottle conveyor, the mandrel conveyor, and the indexing conveyor are continuously driven. The band pickup head, the transfer device, and the band-opening mechanism are driven from a common gear whose rotation is controlled by the clutch aforementioned, said clutch, in turn, being controlled by the trip arm in response to actuation by a container on the main bottle conveyor. If no bottles are being introduced into the machine, the transfer device will remain in the stand-by position previously referred to. If a container is introduced into the machine, the trip arm will be actuated and the clutch will be engaged, and the several devices driven so that a band wil be applied to a mandrel that will subsequently be aligned with the particular bottle that actuated the trip arm. If only the one bottle has actuated the trip arm, then the clutch will be disengaged after the bottle has passed the trip arm, but the mandrel conveyor will continue its motion, the bottle will be advanced by the bottle-supporting conveyor and the indexing conveyor, and the band will be applied to the bottle as described, but the transfer device will remain in its stand-by position until another bottle actuates the trip arm, whereupon the cycle will be repeated.

It will be understood that when a continuous stream of bottles is being fed into the machine by the main bottle conveyor, bands will be successively and continuously removed from the supply magazine by the pickup head one at a time, delivered to the transfer device, moved by the transfer device to the band-opening heads, opened by the band-opening heads and applied to successive mandrels, and later stripped from said mandrels onto bottles aligned therewith, so that continuous and uninterrupted automatic operation of the machine occurs at high speed.

The present machine also includes various features of adjustments for accommodating containers of different shapes and heights, and for applying bands of different sizes to such containers.

While the term "bottle" has been used hereinbefore and will be frequently used hereinafter, it will be understood that the present machine is not limited to applying bands to bottles and that said term, when used, is to be construed broadly as including any container to which it is desired to apply a band.

The principal object of the invention is to provide a practical, automatic band applying machine that can be used commercially for applying a shrinkable band or sleeve of wet regenerated cellulose, or any other suitable material, to the neck portion of a closed bottle or container to form a seal that must be broken before the cork or cap can be removed.

Another object of the invention is to provide an automatic machine capable of successfully applying sealing bands to containers having a revenue strip stamp thereon, such as is commonly applied to bottles containing alcoholic beverages.

Another object of the invention is to provide an automatic machine which will apply preformed sealing bands to the closures of bottles or other containers at a high rate of speed.

Another object of the invention is to provide means for normally distributing containers supported by a travelling conveyor at one zone thereof, in predetermined equally spaced relation upon another zone of said travelling conveyor.

Another object of the invention is to provide means for yieldably obstructing forward movement of a container for indexing purposes, while the weight of said container is supported by a travelling conveyor.

Still another object of the invention is to provide a novel band pickup device and method for successively removing flattened bands of wet regenerated cellulose, or other self-contractible material, from a supply magazine one at a time.

Still another object of the invention is to provide a novel band-opening device and method for opening a wet band of regenerated cellulose material, or other material, from a flat condition into a substantially circular condition.

Still another object of the invention is to provide a transfer device that will receive and grip a flat band delivered thereto by a band pickup device and transfer it in the same flat condition to an automatically operated band-opening device.

A further object of the invention is to provide automatic means for preventing the delivery of a band by the transfer device to the band-opening device in the event that no container has been fed into the machine to receive said band.

A further object of the invention is to provide a container "spotting" device that is automatically effective in the absence of a container at a predetermined point in the machine to interrupt the drive of the band pickup device, the band transfer device, and the band-opening device.

A further object of the invention is to provide means for holding a band in at least a partially open condition for the reception of a moving band support.

A further object of the invention is to provide automatic means for inserting a band support, or mandrel or "thumb" of either a split or solid construction, into a band after it has been opened to a substantially circular condition.

A still further object of the invention is to provide automatic means for stripping a band from a band support or "thumb" and pushing it onto the neck of a bottle or other container.

A still further object of the invention is to provide means for accurately indexing a container and a band carrying support so that the band can be stripped from said support and applied to the container while both are moving in the same direction at a rapid rate of speed.

A still further object of the invention is to provide an automatic band applying machine in which all possible danger of jamming or breaking of the containers is eliminated.

A very important object of the invention, from a practical standpoint, is to provide an automatic band applying machine that is extremely compact and which requires a minimum of floor space.

Other objects and features of the invention will be apparent from the following description taken in conjunction with the accompanying drawings, in which:

Fig. 5 is a sectional plan view taken on the line 5—5 of Fig. 1, showing the motor and the drive means interconnecting the same with the main drive shaft of the machine;

Fig. 6 is an enlarged vertical sectional view taken on the line 6—6 of Fig. 1, through the main clutch and through the hand wheel for effecting manual rotation of the main drive shaft;

Fig. 7 is an enlarged vertical sectional view taken on the line 7—7 of Fig. 1, illustrating the manner in which the front and rear center legs are secured to the bedplate of the machine;

Fig. 8 is an enlarged sectional view taken on the line 8—8 of Fig. 4, showing the discharge end of the container-supporting conveyor and the chain drive for said conveyor;

Fig. 9 is a sectional view taken on the line 9—9 of Figs. 2 and 10, illustrating the supporting means for the feed end of the container-supporting conveyor;

Fig. 10 is an enlarged fragmentary plan view of the container-receiving end of the machine;

Fig. 11 is an enlarged fragmentary plan view of the machine showing the bottle or container "spotting" mechanism and the star wheels associated therewith in a position wherein a trip arm is about to be actuated by a bottle on the container-supporting conveyor;

Fig. 12 is a view similar to Fig. 11 but shows the position of the various parts of the spotting mechanism upon actuation of the trip arm by a bottle;

Fig. 13 is a detail sectional view taken on the line 13—13 of Fig. 10, showing the supporting means for one pair of guide bars;

Fig. 14 is a similar sectional view taken on the line 14—14 of Fig. 10, showing the supporting bracket for the trip arm;

Fig. 15 is a detail fragmentary sectional view taken on the line 15—15 of Fig. 11;

Fig. 16 is an enlarged vertical sectional view through the shaft of the star wheel control mechanism, taken on the line 16—16 of Figs. 1 and 10;

Fig. 17 is an enlarged sectional view through the driving sprocket of the star wheel mechanism, taken on the line 17—17 of Figs. 1 and 10;

Fig. 18 is a sectional plan view of the driving element of the friction clutch associated with the star wheel mechanism, taken on the line 18—18 of Fig. 16;

Fig. 19 is a detail sectional view through the means which supports the trip arm, taken on the line 19—19 of Fig. 11;

Fig. 20 is a sectional view through the link which interconnects the trip device and the pawl throwout rod associated with the star wheel control mechanism, taken on the line 20—20 of Fig. 11;

Fig. 21 is a sectional view taken on the line 21—21 of Fig. 11, showing the details of the pawl throwout rod and a portion of the clutch trip rod which overlies the same;

Fig. 22 is a sectional view taken on the line 22—22 of Fig. 11, illustrating the abutment on the pawl throwout rod in alignment with the stop on the clutch trip rod;

Fig. 23 is a sectional view taken on the line 23—23 of Fig. 12, illustrating the abutment on the pawl throwout rod clear of the stop on the clutch trip rod;

Fig. 24 is an enlarged fragmentary sectional plan view taken on the line 24—24 of Fig. 1, showing the indexing conveyor, and the container guide bars including a movable guide bar section arranged so that it normally yieldably obstructs forward movement of a container by the container-supporting conveyor;

Fig. 25 is a vertical sectional view taken on the line 25—25 of Fig. 24, illustrating the means employed for elevating or lowering the band-applying mechanism relative to the container-supporting conveyor to accommodate containers of different heights;

Fig. 26 is a detail sectional view through the travelling nut of the elevating mechanism, taken on the line 26—26 of Fig. 25;

Fig. 27 is a detail sectional view through the coupling elements associated with the main drive shaft of the machine, taken on the line 27—27 of Fig. 25;

Fig. 28 is a transverse sectional view through the indexing conveyor, taken on the line 28—28 of Fig. 24;

Fig. 29 is an enlarged fragmentary plan view of the parallel linkage which yieldably supports the movable guide bars in an obstruction position above the bottle-supporting conveyor;

Fig. 30 is a detail sectional view taken on the line 30—30 of Fig. 29;

Fig. 31 is a detail sectional view taken on the line 31—31 of Fig. 29;

Fig. 32 is an enlarged fragmentary plan view of the machine showing the band supply magazine, the band pickup head, the band transfer device, and the band-opening heads;

Fig. 33 is a vertical sectional view taken on the line 33—33 of Figs. 32 and 37, particularly illustrating the driving means for the band pickup head and the band transfer device and showing the band pickup head just engaging the foremost band in the magazine;

Fig. 34 is a fragmentary plan view showing the relation of the gripper lever control cam and the gripper levers corresponding to the position of the band transfer device shown in Fig. 33;

Fig. 35 is a sectional plan view taken on the line 35—35 of Fig. 33, particularly illustrating the valve controlling cams for the band pickup head and band-opening heads, and also the Geneva drive mechanism for the band transfer device;

Fig. 36 is a sectional view of the magazine supporting bracket, taken on the line 36—36 of Fig. 33 looking in the direction of the arrows;

Fig. 37 is a horizontal sectional view taken on the line 37—37 of Fig. 33 and particularly illustrating the drive for the band pickup head, and the band-opening mechanism;

Fig. 38 is a sectional view through the jaw clutch that drives the band pickup head, transfer device and band-opening mechanism, taken on the line 38—38 of Fig. 37;

Fig. 41 is a sectional view taken on the line 41—41 of Fig. 33, illustrating the feed magazine in elevation and certain of the gears and cams of the transmission;

Fig. 42 is a sectional view through the magazine and the vertical adjusting means therefor, taken on the line 42—42 of Fig. 33.

Fig. 43 is a sectional view through the band supply magazine and the guide means for one end thereof, taken on the line 43—43 of Fig. 33;

Fig. 44 is a fragmentary sectional view taken on the line 44—44 of Fig. 33, showing the locking means for securing the feed magazine in the desired position of vertical adjustment;

Fig. 45 is an enlarged sectional view taken on the line 45—45 of Fig. 33, showing the discharge end of the magazine in elevation, together with the guide means for one end of the magazine and the foot associated with said magazine for permitting only one band to be removed therefrom at a time;

Fig. 46 is a sectional view taken on the line 46—46 of Fig. 45;

Fig. 47 is a fragmentary elevational view of the foot and its adjustable supporting means, as viewed on the line 47—47 of Fig. 45;

Fig. 50 is a view partly in section illustrating the band pickup head after it has been fully advanced forwardly and is being moved upwardly in said advanced position to remove a band from the supply magazine for delivery to the band transfer mechanism;

Fig. 51 is an enlarged sectional view taken on the line 51—51 of Fig. 50;

Fig. 52 is a sectional view taken on the line 52—52 of Fig. 50 illustrating the position of the Geneva mechanism corresponding to that of the band transfer device shown in Fig. 50;

Fig. 53 is a plan view of the cam controlling the gripper levers of the band transfer device corresponding to the position thereof shown in Fig. 50;

Fig. 54 is a sectional view taken on the line 54—54 of Fig. 50 illustrating the position of the cam for oscillating the gripper lever control cam, in the position which it assumes at the time that the gripper control cam is in the position shown in Fig. 50;

Fig. 59 is a sectional view through the stationary and movable suction heads for effecting opening of a band delivered thereto by the band transfer device;

Fig. 60 is a sectional view through the band-opening heads taken on the line 60—60 of Fig. 59;

Fig. 61 is a view of the suction pad on the movable band-opening head, as seen on the line 61—61 of Fig. 59;

Fig. 62 is a view of the suction pad on the stationary band-opening head, as viewed on the line 62—62 of Fig. 59;

Fig. 63 is a detail sectional view taken on the line 63—63 of Fig. 60;

Fig. 64 is a detail sectional view taken on the line 64—64 of Fig. 60;

Fig. 65 is a view partly in section showing the mechanism for effecting movement of the movable band-opening head toward and away from the stationary band-opening head, said mechanism being shown holding a band in a full open condition with a mandrel inserted in the open band;

Fig. 66 is an elevational view of the band-opening mechanism, as viewed along the line 66—66 of Fig. 65;

Fig. 67 is a sectional view taken on the line 67—67 of Fig. 65;

Fig. 72 is a sectional view taken on the line 72—72 of Fig. 75 through the vacuum control valve, particularly illustrating the valve control mechanism and cam for controlling the application of vacuum to the suction pad of the band pickup head;

Fig. 73 is a similar sectional view taken on the line 73—73 of Fig. 75, but illustrating the valve control mechanism and the cam for simultaneously controlling the application of suction to the suction pads of the band-opening heads;

Fig. 74 is a fragmentary sectional view taken on the line 74—74 of Fig. 72;

Fig. 75 is a vertical sectional view through the vacuum control valve, taken on the line 75—75 of Fig. 73;

Fig. 76 is a sectional view taken through the vacuum control valve on the line 76—76 of Fig. 75;

Fig. 77 is a vertical sectional view through the two operating levers for the vacuum control valve, taken on the line 77—77 of Fig. 72;

Figure 85:
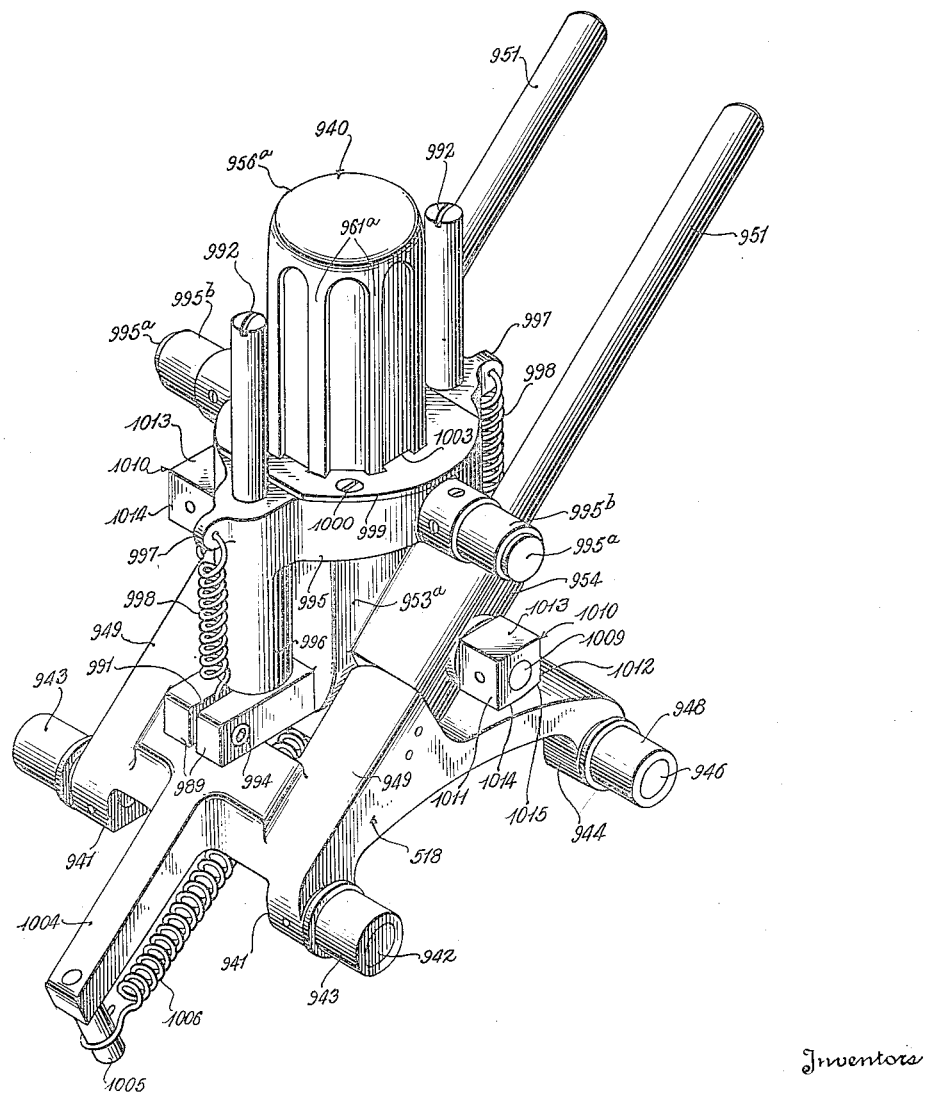

Figs. 78 to 84, inclusive, are perspective views illustrating various details of the band supporting mandrel and the carriage member for conveying the same. Specifically: Fig. 78 is a perspective view of the carriage member; Fig. 79 is a perspective view of the stationary part or element of the mandrel which is slidably mounted upon the carriage member; Fig. 80 is a perspective view of the movable part or element of the mandrel; Fig. 81 is a perspective view of the arm for effecting movement of the movable part of the mandrel with respect to the stationary part of said mandrel; Fig. 82 is a perspective view of a stripper block which is carried by the mandrel; Fig. 83 is a perspective view of the stripper plate for stripping a band from the mandrel; and Fig. 84 is a perspective view of a cam for actuating the arm shown in Fig. 81;

Fig. 85 is a perspective view of a modified form of mandrel and carriage member;

Fig. 86 is a somewhat diagrammatic view illustrating the relation of the open band and the mandrel prior to entry of the mandrel into the open band;

Fig. 87 is a similar diagrammatic view, but illustrating the mandrel in contracted condition and inserted into the open band;

Fig. 88 is a detail sectional view taken on the line 88—88 of Fig. 86;

Fig. 89 is a sectional view illustrating the mandrel of Fig. 87 after it has started to move forward with the band disposed thereon;

Fig. 90 illustrates the mandrel of Fig. 87 after it has been carried to the lower side of the mandrel conveyor into an inverted position, and in registration with the upper end of a bottle that is to receive the band;

Fig. 91 illustrates the manner in which the band is stripped from the mandrel of Fig. 90 and applied to the neck of the bottle; and Fig. 92 is a cam diagram illustrating the timing of the various operations of the machine controlled by the several cams.

Referring now to Figs. 1 to 7, inclusive, of the drawings, the automatic band applying machine comprises a main frame consisting of a bedplate 81 having a left end leg 82 secured thereto by cap screws 83 and a right end leg 84 secured thereto by cap screws 85. A front center leg 86 has a laterally extending flange 87 (Fig. 7) which projects through an opening 88 formed in a front wall 81ª of the bedplate 81. Cap screws 89 fasten the upper end of the leg 86 to the front wall 81ª and cap screws 90 fasten the flange 87 to the bedplate 81. A center rear leg 91 has its upper end disposed under the bedplate 81 and cap screws 92 fasten said leg to the bedplate 81 and cap screws 93 fasten said leg to a rear wall 81ᵇ of said bedplate. The lower ends of the center legs 86 and 91 are interconnected by a tie plate 94 secured to the respective legs by cap screws 95 and 96. A base plate 97 is fastened to the left leg 82, the tie plate 94, and the right leg 84 by cap screws 98, thereby providing a very rigid frame structure.

The base plate 97 has an electric motor 99 fastened directly thereto by cap screws 100. The motor 99 has a shaft 101 (Fig. 5) carrying a grooved pulley 102 and a conventional Reeves drive pulley 103. A conventional vacuum pump 104 is secured to a spacer 104ª by cap screws 105 and the spacer itself is secured to the base plate 97 by cap screws 105ª. The vacuum pump 104 has a shaft 106 carrying a grooved pulley 107. A V-belt 108 interconnects the pulley 102 on the motor shaft 101 with the pulley 107 on the vacuum pump shaft 106 so that the vacuum pump 104 is continuously driven by the motor 99. A combined pressure and vacuum gauge 109 is connected with the vacuum pump 104 to indicate the degree of vacuum maintained thereby. The vacuum pump 104 is connected with one end 110ª of a vacuum tank 110 by a pipe 111. The vacuum tank 110 has a mounting plate 110ᵇ (Figs. 3 and 9) welded thereto and secured to the underside of the bedplate 81 by cap screws 110ᶜ. The opposite end 110ᵈ of the vacuum tank 110 is connected by piping with a control valve for controlling the application of vacuum to the band pickup head and the band-opening heads, as will be described in detail hereinafter.

A conventional, adjustable variable speed jack 112 is mounted upon an arm 112ª which is pivotally connected at its lower end by a pin 112ᵇ to a bracket 113 which is fastened to the base plate 97 by cap screws 114. The speed changing jack 112 includes elements providing V-pulleys 115 and 116 (Fig. 5). The pulley 115 is drivingly interconnected with the Reeves pulley 103 on the motor shaft 101 by a V-belt 117, and the pulley 116, in turn, is drivingly interconnected with a pulley 118 by a V-belt 119. The pulley 118 is mounted upon a horizontal input shaft 120 of a conventional speed reduction gear unit 121 which is mounted upon a spacer 121ª by cap screws 122, the spacer 121ª being fastened to the base plate 97 by cap screws 121ᵇ.

The speed reduction unit 121 has a vertical shaft 123 to which one element 124 of a conventional friction clutch is secured. A shaft section 125, constituting one element of a divided main drive shaft for the machine, is vertically aligned with the output shaft 123 and carries a clutch element 126 adapted to be drivingly engaged with the clutch element 124. The clutch element 126 is slidable axially upon the shaft section 125, but is prevented from rotating relative thereto by a key 127 (Fig. 6). The shaft section 125 rotates in a bushing 128 mounted in the lower end of a bracket 129, which is fastened to the under side of the bedplate 81 by cap screws 130. The shaft section 125 extends upwardly through an opening 81ᶜ in the bedplate 81 and also rotates in bushings 131 (see Figs. 6 and 25) mounted in extensions 132 and 132ª formed on a bracket 133 mounted upon the top of the bedplate 81 by cap screws 134.

Referring to Fig. 6, the right end leg 84 comprises upwardly converging column portions 135, each of which carries an integral pad 136 forming a seat for a bracket 137. The brackets 137 are secured to the pads 136 by cap screws 138, and a rod 139 is journalled in said brackets and constrained against axial movement by collars 140 arranged at the inner side of said brackets. The rod 139 carries a yoke 141 provided with blocks 142 which project into a groove 143 formed in the slidable clutch element 126. An upright arm 144 is secured at its lower end to the rod 139 by a set screw 145. One end of a link 146 is pivotally connected to the upper end of the arm 144 by a pin 147. The opposite end of the link 146 is pivotally connected by a pin 148 (Figs. 1, 3 and 4) to an arm 149 fastened to a shaft 150 journalled in the front wall 81ª and the rear wall 81ᵇ of the bedplate 81. The lower end of a control lever 151 is fastened to the shaft 150 at the front of the machine and carries a knob 152 at its upper end. A similar control lever 153 is fastened to the shaft 150 at the rear of the machine.

Figure 1:
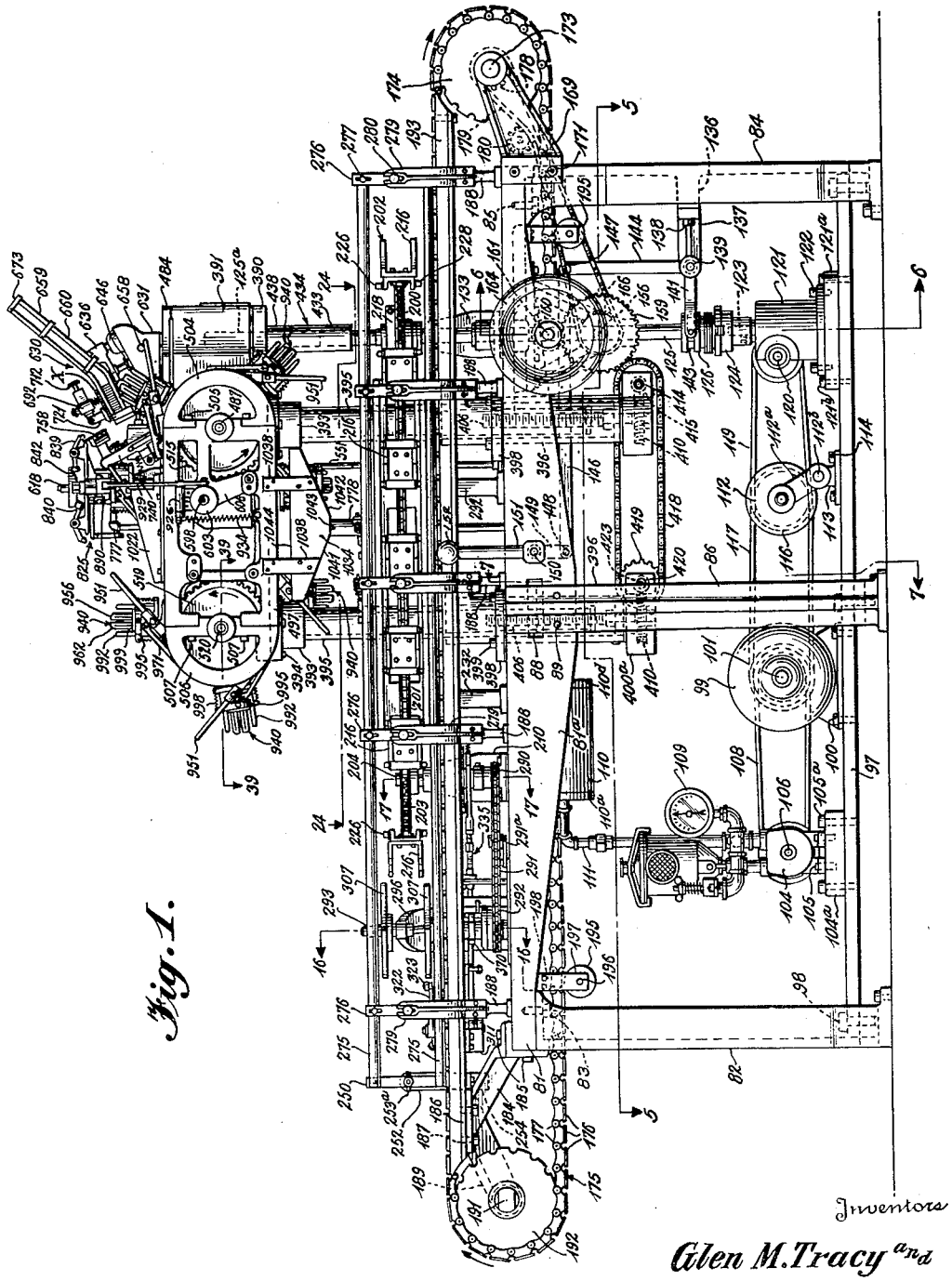
Fig. 1 is a front elevational view of an automatic band applying machine embodying the principles of the invention.
Figure 2:
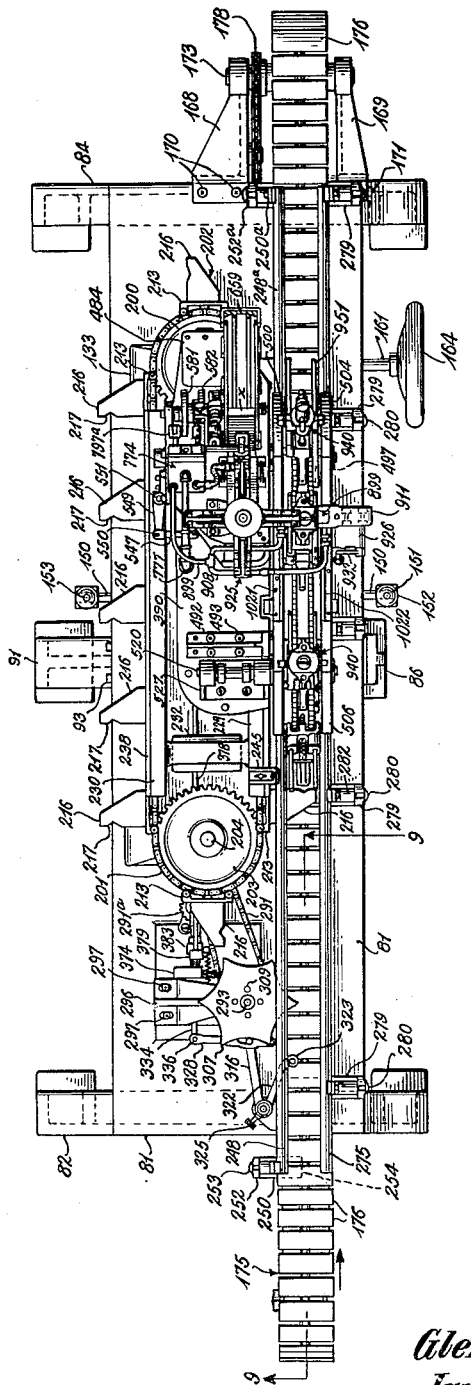
Fig. 2 is a plan view of the machine shown in Fig. 1.

It will be apparent from Fig. 1 that, upon manual movement of the knob 152 of the clutch control lever 151, in a clockwise direction, the like rotation of the shaft 150 with the arm 149 attached thereto will cause the link 146 to move toward the left, thereby causing the arm 144 to move in a counter-clockwise direction to rotate the rod 139 in a corresponding direction, and through the yoke 141, to engage the clutch element 126 with the clutch element 124 to effect the drive of the shaft section 125.

Referring to Fig. 6, the shaft section 125 has a bevel gear 154 secured thereto which meshes with a bevel pinion 155 secured to a horizontal shaft 156. The shaft 156 is journalled adjacent one end thereof in the bracket 129 and is journalled adjacent its opposite end in a bracket 157 secured to the under side of the bedplate 81 by cap screws 158. A spur gear 159 is mounted upon the end of the shaft 156 adjacent the bracket 157 and meshes with a spur pinion 160 secured to a shaft 161. The shaft 161 is journalled in the brackets 129 and 157 and is restrained against longitudinal movement by collars 162 and 163 disposed between and adjacent said brackets. A hand wheel 164 is secured to the outer end of the shaft 161 to enable the drive shaft 125 to be rotated manually, and this is effected through the spur pinion 160, spur gear 159, shaft 156, bevel gear 155, and bevel gear 154.

A small sprocket wheel 166 is fastened to the shaft 156 adjacent the bracket 129. Brackets 168 and 169 (Figs. 1 to 4) are respectively secured by cap screws 170 and 171 to the bedplate 81 and to the right leg 84. The brackets 168 and 169 support a horizontal shaft 173 upon which is mounted a conveyor sprocket 174 arranged at one end of a bottle-supporting conveyor generally identified by the numeral 175. The conveyor 175 comprises an endless chain consisting of a plurality of flat, oblong-shaped links 176 pivotally interconnected by pins 177. A driven sprocket 178 is arranged between the bracket 168 and the conveyor sprocket 174 and is fastened to the shaft 173. A chain 179 drivingly interconnects the sprocket 178 with the small sprocket 166 on the shaft 156. An idler sprocket 180 (Fig. 8) is rotatable upon a stud shaft 181 having an eccentric mounting stem 182. The idler sprocket 180 serves to keep the upper run of the chain clear of an opening 183 in the right leg 84.

The sprocket 174 is located at the discharge end of the bottle-supporting conveyor 175 and serves as the driving sprocket for said conveyor. The manner of supporting the forward or feed end of the bottle conveyor 175 is best illustrated in Figs. 1, 3, 9 and 10 from which it will be apparent that a bracket 184 is mounted upon the bedplate 81 by a plurality of cap screws 185 and extends toward the left and forms a support for one end of a chain bed 186, which is fastened thereto by cap screws 187. The chain bed 186 is supported at spaced intervals by five pedestals 188 secured to said chain bed by cap screws 188ª and to the bedplate 81 by cap screws 188ᵇ (Fig. 9). A second bracket 189 is adjustably secured to the under side of the chain bed 186 by cap screws 190. A bracket 189 carries a stud 191 (Fig. 10) upon which a conveyor sprocket 192 is rotatably mounted. The links 176 of the bottle-supporting conveyor 175 pass around the sprocket 192. Bottles or other containers can be fed to the endless conveyor 175 manually or by other conveyor means, not shown, so long as they are fed at a rate at least equal to the band applying capacity of the machine.

The chain bed 186 has a pair of spaced rails 193 (Figs. 1, 8, 9 and 13) secured to the upper side thereof by cap screws 194. The upper surface of the rails 193 is engaged with the lower or inner surface of the upper run of the conveyor links 176 and supports said conveyor links in a manner to eliminate all sag and to cause the same to travel in a fixed horizontal path between the conveyor sprockets 192 and 174. The lower run of the conveyor 175 is supported by rollers 195 mounted upon pins 196 carried by brackets 197 depending from the bedplate 81 and secured thereto by cap screws 198.

Referring to Fig. 25, the shaft section 125 extends upwardly beyond the boss 132ᵃ of the bracket 133, and has a sprocket wheel 200 loosely mounted thereon. A chain 201 of an indexing conveyor generally identified by the numeral 202 extends around the sprocket 200, and around a sprocket 203 (Figs. 17 and 24). The sprocket 203 is connected to the upper end of a vertical shaft 204 by a set screw 205. The shaft 204 extends downwardly through bushings 206 and 207 mounted in laterally projecting bosses 208 and 209 carried by a bracket 210. The bracket 210 is mounted upon the bedplate 81 by cap screws 211.

The chain 201 includes flanged links 212 arranged therein at equal intervals and having a carrier 213 secured thereto by screws, rivets, or otherwise. Twelve carriers 213 are mounted upon the chain 201 and each of said carriers has a bracket 214 secured thereto by screws 215 (Fig. 28). Each of the brackets 214 carries a pair of horizontal, spaced indexing fingers 216, each of which is provided with a notch 217 to facilitate centering of a bottle B on the conveyor 175.

A timing block 218 (Figs. 24 and 25), for the indexing conveyor 202, is secured to the shaft section 125 at the upper side of the sprocket 200. The timing block 218 has a pair of projections 219 arranged at each end thereof, each of said projections carrying a screw 220 and a lock nut 221. A pair of studs 222 is mounted upon the upper side of the sprocket 200 and one of said studs projects upwardly between each pair of the projections 219. The upper ends of the studs 222 are flattened and are adapted to be engaged by the ends of the screws 220. The angular position of the sprocket 200 with respect to the shaft 125 and the block 218 fastened thereto can be varied by advancing or backing out certain of the screws 220 in an obvious manner. Thus, the timing block 218 provides for adjustment of the sprocket 200 relative to the shaft 125 through an angle corresponding to any fractional part of the length of one of the links of the chain 201. Of course, if an adjustment of the indexing conveyor 202 through a distance greater than the length of one link is required, then the entire chain 201 can be shifted one tooth or more on the sprocket 200. The importance of this adjustment feature of the indexing conveyor 202 will become apparent later.

Each of the carriers 213 has a pair of studs 225 (Fig. 28) at the upper side thereof carrying rollers 226, and a similar pair of studs 227 at the lower side thereof carries rollers 228. The carriers 213 are guided while travelling between the horizontal sprockets 200 and 203 (Fig. 24) by the rollers 226 and 228, which travel in parallel guideways 229 and 230. The guideways 229 and 230 are mounted upon the extremities of the heads 231 of a pair of generally T-shaped brackets 232, said guideways being secured to said heads by cap screws 233. The brackets 231 include a stem portion 234, the lower end of which rests upon the bedplate 81 and is secured thereto by cap screws 235. The guideway 230 is grooved at 236 to provide a track for the rollers 226 and is grooved at 237 to provide a track for the rollers 228. The rollers 226 are retained in the groove 236 by a rail 238 fastened to the guideway 230 by cap screws 239. Similarly, the rollers 228 are retained in the groove 237 by a rail 240 fastened to the guideway 230 by cap screws 241. The guideway 230 is chamfered at the ends of each of the grooves 236 and 237, as indicated at 242 in Fig. 24 and the rails 238 and 240 are similarly chamfered at their ends as indicated at 243. These chamfered portions facilitate entry of the rollers 226 and 228 into the track forming grooves 236 and 237.

The guideway 229 is similar to the guideway 230 and includes track forming grooves 236ᵃ and 237ᵃ corresponding to the grooves 236 and 237 for the reception of the rollers 226 and 228, respectively. Rails 238ᵃ and 240ᵃ are similarly secured to the guideway 229 to retain the rollers in their associated tracks. The guideway 229 is chamfered at 242ᵃ and the rails 238ᵃ and 240ᵃ at 243ᵃ, to facilitate entry of the rollers 226 and 228 into the grooves 236ᵃ and 237ᵃ.

The guideway 229 has a pair of brackets 245 (Figs. 24 and 28) mounted upon the upper and lower surfaces thereof by cap screws 246. Each of the brackets 245 has an elongated slot 247 through which the cap screw 246 extends in order to permit transverse adjustment of the brackets 245 relative to the guideway 229. A pair of tubular metal guide bars 248 is arranged above the bottle conveyor 175 at the feed end thereof and is secured to the brackets 245 by screws 249. The guide bars 248 are spaced apart to permit the passage of the indexing fingers 216 therebetween, and are interconnected at their extreme left ends by a tie plate 250 (Fig. 13) and cap screws 250ᵃ and 250ᵇ, the tie plate 250 having an elongated slot 251 through which the cap screw 250ᵇ extends in order to permit adjustment of the upper guide bar 248 relative to the lower guide bar. The tie plate 250 is mounted upon a slotted bracket 252 by a bolt 253 and wing nut 253ᵃ, a spacer 253ᵇ being interposed between the bracket 252 and the tie plate 250. The lower end of the bracket 252 is secured to a bracket 254 by cap screws 254ᵃ and the bracket 254 in turn is secured by cap screws 255 to the under side of the chain bed 186.

Two pairs of brackets 245ᵃ (Fig. 24), similar to the brackets 245, are adjustably mounted upon the upper and lower sides of the guideway 229 by cap screws 246ᵃ. A second pair of tubular metal guide bars 248ᵃ is secured to the brackets 245ᵃ by cap screws 249ᵃ. The ends of the bottle guide bars 248ᵃ remote from the guideway 229 are secured by a tie plate 250ᴬ and bracket 252ᴬ (see Fig. 3), similar to the tie plate 250 and bracket 252, to the chain bed supporting pedestal 188 at the extreme right end of the machine.

The bottles carried by the conveyor 175 are yieldably obstructed against forward movement with their supporting links 176 at a predetermined point in their travel by a third pair of guide bars 256, preferably made of hard fiber, until engaged by one set of the fingers 216 on the indexing conveyor 202, as will be explained later. The guide bars 256 are disposed intermediate and in end-to-end relation with the pairs of guide bars 248 and 248ᵃ, as best shown in Figs. 24, 28 and 29, and are movable with respect thereto. Each of the fiber guide bars 256 has a pair of angle brackets 257 secured thereto by screws 258. A pair of brackets 259 is secured in longitudinally spaced relation to the guideway 229 at the upper and lower sides thereof, by cap screws 260. One end of a link 261 is pivotally connected by a pin 262 to each of the brackets 259, and the opposite end of each of said links is connected to one of the angle brackets 257 by a pivot pin 263. Hence, the links 261 provide a parallel linkage for maintaining the guide bars 256 in parallelism with the guide bars 248, 248ª and the conveyor 175 while permitting said guide bars to move transversely relative to the conveyor 175.

Transverse movement of the fiber guide bars 256 toward the guideway 229 is yieldably opposed by compression springs 264 which are mounted upon rods 265. One end 266 of each of the rods 265 is bent downwardly and is pivotally connected to the angle bracket 257, while the other end of each of said rods extends through a lug 267 carried by the brackets 259. A stop 268 is welded to each rod 265 and one of the compression springs 264 is interposed between each of the stops 268 and one of the lugs 267. A thumb nut 269 is threaded upon the outer end of each of the rods 265 and abuts one of the lugs 267 for adjusting the position of the fiber guide bars 256 with respect to the guide bars 248 and 248ª. The thumb nuts 269 on the several rods 265 are normally adjusted so that the guide bars 256 project farther away from the guideway 229 than the guide bars 248 and 248ª, whereby to provide a yieldable obstruction overlying the conveyor 175 in the normal path of travel of a bottle supported by said conveyor.

A pair of tubular metal bottle guide bars 275 extends from one end of the machine to the other (Fig. 1) and is disposed above the bottle conveyor 175 in confronting relation to the three pairs of guide bars 248, 256, and 248ª. The guide bars 275 are interconnected by a tie plate 276 (Fig. 16), similar to the tie plate 250, by cap screws 277, the uppermost of which extends through an elongated slot 278 in said tie plate to permit vertical adjustment of the upper bar 275 relative to the lower bar. The tie plates 276, in turn, are secured to the upper ends of brackets 279 by bolts 280 which project through slots 281 in said brackets and through a spacer 282 interposed between said brackets and the tie plates 276. A wing nut 283 is fastened to the inner end of the bolt 280 to clamp the tie plate 276 and spacer 280 against the bracket 279. The lower ends of the brackets 279 are fastened by screws 284 to flanges 285 formed upon the chain bed supporting pedestals 188.

It will be apparent from the foregoing that all of the guide bars 248, 256, 248ª and 275 can be adjusted relative to each-other to accommodate bottles of different sizes and shapes. Thus, the rails 248 can be adjusted by repositioning the brackets 245 and changing the spacer 253ª, and the guide bars 248 can be adjusted by repositioning the brackets 245ª and changing the spacer associated with the bracket 252A. Likewise, the movable guide bars 256 can be adjusted by turning the thumb nuts 269 on the rods 265. The position of the front guide bars 275 can be adjusted toward or away from the guide bars 248, 256 and 248ª by substituting spacers 282 of different lengths. The guide bars 275 can also be adjusted by virtue of the slots 281 to raise or lower the same relative to the conveyor 175 by adjusting the wing nuts 283. The guide bars 248 and 248ª are adjustable in a similar manner. Furthermore, limited individual up or down adjustment of the upper guide bars 248, 248ª and 275 can be effected by adjustment of the cap screws in the elongated slots 251 and 278 in the tie plates associated therewith.

The ends of the fiber guide bars 256 nearest the guide bars 248 are chamfered, as indicated at 274 (Figs. 24 and 29), in order to enable a bottle, such as the bottle B, to engage the same and be held thereby against forward movement by the conveyor 175. Moreover, the chamfered surfaces 274 act as cam surfaces enabling the bottle B to retract the bars 256 to the position shown in Fig. 29, wherein said bottle is shown engaged by a pair of indexing fingers 216 carried by the indexing conveyor 202 and is pressed against the guide bars 275 by the springs 264 acting on the guide bars 256. The fingers 216 cause the bottle B to positively move forward at the lineal speed of the indexing conveyor 202 against the frictional resistance or braking action offered by the spring-pressed fiber guide bars 256. Of course, after the bottle B has been moved beyond the far ends of the fiber guide bars 256, the springs 264 act to return said guide bars to their initial obstructing position or to yieldably oppose movement of the bottle engaged by the next set of indexing fingers 216. Once the bottle B has cleared the rails 256, it will travel forward more rapidly on the bottle conveyor 175 than it did while being moved by the indexing conveyor 202 for the reason that said bottle conveyor travels at a faster lineal speed than the indexing conveyor. Accordingly, the bottles will move away from their associated indexing fingers 216 and be well in advance thereof by the time that said fingers travel around the sprocket 200. In this manner, all possible jamming or breaking of the bottles by the indexing fingers 216 is avoided.

Referring to Figs. 11 and 17, the lower end of the shaft 204 has a small sprocket 290 secured thereto, the teeth of which are engaged with the links of a chain 291. The chain 291 passes around a sprocket 292 (Figs. 15 and 16), which is rotatably mounted upon a vertical star wheel shaft 293 journalled in bushings 294 and 295 mounted in a bracket 296 adjustably secured to the bedplate 81 by cap screws 297. An idler sprocket 291ª is adjustable to take up any slack in the chain 291. The lower face of the sprocket 292 is provided with a plurality of cylindrical recesses 298 for the reception of compression springs 299 and cap screws 300. The cap screws 300 extend through the springs 299 and through holes 301 which form extensions of the recesses 298. Each of the cap screws 300 is threaded into an inverted cup 302 forming a housing for a disc 303 having a hub 304 fastened to the shaft 293. Friction discs 305 are interposed between the sprocket 292 and the disc 303 and frictionally interconnect the same in a manner to permit the sprocket 292 to slip under certain conditions, without effecting rotation of the star wheel shaft 293, as will be explained later.

The lower end of the shaft 293 abuts against the bedplate 81 (Fig. 16) and a collar 306 mounted thereon adjacent the bushing 294 constrains said shaft against upward axial movement. The shaft 293 also carries a pair of six-point star wheels 307, preferably formed of hard fibrous material, and mounted upon metal hubs 308 by means of countersunk screws 309, said hubs being fixed to the shaft 293 by set screws 310. As will be apparent from Figs. 11 and 16, the star wheels 307 project between the bottle guide bars 248 and partially overlie the bottle conveyor 175. The star wheels 307 are made of non-metallic material in order to insure quiet operation of the machine as the bottles engage said star wheels and are permitted to advance on the conveyor 175 in predetermined timed relation to the fingers 216 on the indexing conveyor 202.

A bracket 311 (Figs. 10, 14 and 19) is secured to the under side of the chain bed 186 by cap screws 312. The bracket 311 includes an offset extension 313 into which the lower end of an upright stud 314 (see Fig. 19) is threaded. A trip member 315 including an integral arm 316 and a hollow cylindrical portion 317 is mounted upon the stud 314. Ball bearings 318 and 319 support the trip member 315 for substantially frictionless rotation with respect to the stud 314. A cap 320 is secured to the upper end of the stud 314 by a set screw 321 and holds the trip member 315 against axial movement relative to said stud. One end of a trip arm 322 is mounted upon the cylindrical portion 317 and a roller 323 is rotatably mounted upon the other end thereof and is normally disposed in the path of travel of the bottles B on the conveyor 175. The trip arm 322 is adjustably secured to the upper end of the cylindrical portion 317 of the trip member 315 by a thumb screw 324 having a knurled head 325.

The free end of the arm 316 has a pin 326 (Fig. 20) fastened thereto which extends through an elongated slot 327 located near the middle of a link 328. A pin 329 is fastened to the link 328 at one end thereof and a tension spring 330 yieldably interconnects the pins 326 and 329. The opposite end of the link 328 is pivotally connected to one end of a section 334 of a combined clutch control and pawl throwout rod 335 by a pin 336. The opposite end of the section 334 (see Fig. 21) is enlarged to cylindrical form as indicated at 337 and is provided internally thereof with an opening 338 having a left-hand thread adapted to receive a correspondingly threaded end 339 of a turnbuckle 340. The opposite end 341 of the turnbuckle has a right-hand thread and extends into a correspondingly threaded opening 342 in a fork 343. The turnbuckle 340 can be locked in any desired position of adjustment by lock nuts 339a and 341a threaded upon the portions 339 and 341, respectively. The fork 343 carries a stud 344 upon which a roller 345 is rotatably mounted. The fork 343 has legs 346 (Figs. 11 and 12), which are slidably received in grooves 347, best shown in Fig. 17, formed in the opposite sides of a rectangular block 348 through which the shaft 204 rotatably extends. A bottle spotting cam 349 (Fig. 12) having three lobes 350 spaced 120° apart is fastened to the shaft 204 above the block 348. The bottle spotting cam 350 makes one revolution for each three complete cycles of the machine. A tension spring 352 is connected at one end thereof to one of the legs 346 of the fork 343 and the opposite end of said spring is connected to a pin 353 mounted upon the bedplate 81. The spring 352 continuously tends to pull the entire rod 335 toward the right, as viewed in Figs. 11 and 12, and thus maintains the roller 345 in contact with the periphery of the spotting cam 349 at all times.

A pin 354 is mounted on the under side of the section 334 in a threaded opening 355 (Figs. 16 and 21). One end of a tension spring 356 is connected to the pin 354 and the opposite end of said spring is connected to a stud 357 mounted on one side of a support 358. The support 358 rests upon the foot of the bracket 296 and is secured thereto by cap screws 359. It will be observed from Figs. 11 and 12 that the spring 356 tends to pull the pawl throwout rod 335 sidewise toward the arm 316 or, in other words, tends to rotate the pawl throwout rod 335 counterclockwise about the shaft 204. However, the spring 356 is weaker than the spring 330 so that whenever the roller 323 on the trip arm 322 is engaged by a bottle B, it will move the pawl throwout rod 335 in the opposite direction, overcoming the tension of the spring 356 in doing so. The object of this arrangement will be explained later.

The section 334 of the pawl throwout rod 335 has a slot 360 (Figs. 11 and 12) formed therein and having one end thereof defined in part by an abutment wall 361 and a relatively narrow slot 362 forming a continuation of said slot. A pin 363 is fixed to one end of a pawl 364 and projects downwardly into the slot 360 at all times. The pawl 364 includes a longitudinal offset portion 364a (Fig. 15) arranged so that the portion carrying the pin 363 is disposed above the slot 360. The pawl 364 is fulcrumed for pivotal movement about a pin 365 mounted on the top of the support 358. The opposite end 368 of the pawl 364 is adapted to engage with the teeth 369 of a six-tooth ratchet wheel 370, which is fastened to the shaft 293 above the friction plate or disc 303, as is best shown in Fig. 16.

Reverting to Figs. 11 and 12, one end of a tension spring 371 is connected with the pawl 364 by a pin 372 located between the depending pin 363 and the fulcrum pin 365, and the opposite end of said spring is connected to a pin 373 mounted on the bedplate 81. The spring 371 continually tends to urge the end 368 of the pawl 364 into engagement with the teeth 369 of the ratchet wheel 370.

A bracket 374 (Figs. 12 and 16) is secured to the bedplate 81 by cap screws 375 and is arranged adjacent the right side of the bracket 296. The bracket 374 has a lateral extension 376 at its upper end, which overlies the pawl actuating rod 335 and contains a bushing 377 adapted to slidably receive one end of a clutch trip rod 378. The opposite end of the clutch trip rod 378 is connected with mechanism for controlling a clutch 536 (Fig. 35) that drives the band pickup head, transfer device, and the band-opening mechanism, as will be described later. A lug 379 is secured to the rod 378 by a pin 380 (Figs. 21 to 23) and a compression spring 381 is interposed between the lug 379 and the lateral extension 376 of the bracket 374. The lug 379 has a stop 382 projecting downwardly therefrom, as best shown in Figs. 22 and 23. An abutment 383 on the section 334 of the pawl throwout rod 335 is adapted to engage the stop 382, under certain conditions, which will be explained later, to effect movement of the clutch trip rod 378 toward the left. The abutment 383 is secured to the end 337 of the section 334 by a set screw 384.

It will be apparent from the foregoing that the bottle conveyor 175 moves continuously when the machine is in operation, and that by virtue of the driving connection between the shafts 125 and 204 provided by the chain 201 of the indexing conveyor 202, the sprocket 290 is continuously driven and in turn continuously drives the sprocket 292 through the chain 291; thus, providing a constant potential drive for the star wheel shaft 293. However, when the pawl 364 is engaged with the ratchet wheel 370 it holds the star wheel shaft 293 stationary and slippage then occurs between the sprocket 292 and the drive disc 303 through the friction discs 305. However, when a bottle on the conveyor 175 is brought into engagement with the roller 323 on the trip arm 322, the pawl throwout rod 335 will be moved or shifted sidewise in a direction away from the star wheel shaft 293 by the arm 316 and spring 330, as previously described, and this shifting of the rod 335 will position the abutment 361 at the end of the slot 360 so that it will engage the pin 363 depending from the pawl 364. Accordingly, when one of the lobes 350 on the bottle spotting cam 349 engages the roller 345, the rod 335 will be bodily moved toward the left, to the position shown in Fig. 12, thus effecting rotation of the pawl 364 about its fulcrum 365 and disengaging it from the ratchet wheel 370. Upon disengagement of the pawl 364, the friction elements 305 become effective to drive the star wheel shaft 293 and the star wheels 307 are rotated through at least ⅛ of a revolution to permit one bottle to pass the same. If the conveyor 175 is loaded with bottles so that the roller 323 on the trip arm 322 is engaged by the successive bottles, the pawl 364 will be prevented from re-engaging any tooth 369 of the sprocket 370 and continuous rotation of the star wheels 307 will result. However, if there is a substantial gap between any two bottles on the conveyor 175 ahead of the trip arm 322, or if the supply of bottles becomes exhausted, the trip arm 322 will not be actuated to shift or maintain the pawl throwout rod 335 in a position wherein the abutment wall 361 can engage the pin 363. Hence, when a lobe 350 on the bottle spotting cam 349 next engages the roller 345, the rod 335 will be shifted lengthwise toward the left, as previously described, but this time the pin 363 depending from the pawl 364 will enter the narrow slot 362 and permit the spring 371 to position the pawl 364 to engage the ratchet wheel 370 and positively hold the star wheel shaft 293 against rotation.

The absence of a bottle on the conveyor 175, and the consequent failure to actuate the trip arm 322 also effects another important function, in that it permits the abutment 383 to move in a path such as to engage the stop 382 depending from the lug 379 carried by the clutch trip rod 378. Accordingly, longitudinal shifting movement of the pawl actuating rod 335 toward the left results in a corresponding shifting movement of the clutch rod 378 toward the left, and such movement of the rod 378 effects the disengagement of the clutch 536 previously referred to as controlling the driving mechanism for the band pickup head, transfer mechanism and the band-opening mechanism.

Stated another way, prior to actuation of the trip arm 322 by a bottle on the conveyor 175, the pawl throwout rod 335 assumes the position shown in Fig. 11 and the abutment 383 assumes a position relative to the stop 382 indicated in Fig. 22. However, when the trip arm 322 is actuated by a bottle, the pawl throwout rod 335 is shifted sidewise to the position shown in Fig. 12 and the abutment 383 assumes a position relative to the stop 382 indicated in Fig. 23. Thus, when the pawl throwout rod 335 is moved toward the left with the abutment 383 and the stop 382 in the relative positions shown in Fig. 23, the abutment 383 will pass the stop 382 without actuating the clutch trip rod 378. On the other hand, when the abutment 383 is permitted to remain in the position shown in Fig. 22, the longitudinal shifting of the pawl throwout rod 335 toward the left will cause the abutment 383 to engage the stop 382 and thereby effect longitudinal shifting of the clutch trip rod 378 toward the left to thereby effect disengagement of the clutch aforesaid.

Referring to Fig. 25, a platform 390 supports a gear box 391 which is secured thereto by cap screws 392. A pair of flanged rings 393 is fastened to the under side of the platform 390 by cap screws 394. A hollow tube 395 is non-rotatably secured to and extends downwardly from each of the flanged rings 393 and its lower end projects into a cylindrical housing 396. Each of the housings 396 is mounted in an opening 397 in the bedplate 81 and has a flange 398 located at a point about ⅓ the way from the upper end of said housing. The flanges 398 rest upon the bedplate 81 and cap screws 399 fasten said flanges to said bedplate. A worm wheel housing 400 is arranged at the lower end of one of the cylindrical housings 396 and a similar worm wheel housing 400ª is arranged at the lower end of the other of said cylindrical housings. The worm wheel housings 400 and 400ª each include a central boss 401 that is snugly received in the lower end of its associated cylindrical housing 396. The worm wheel housings 400 and 400ª are secured to and prevented from rotating with respect to their associated cylindrical housings by a plurality of cap screws 402, which extend through the side wall of said cylindrical housings and are threaded into openings 403 in the central bosses 401. A shaft 404 extends through each of the bosses 401 and is journalled in a bushing 405 mounted in said bosses. Each of the shafts 404 includes an enlarged threaded portion 406 which is threaded into a travelling nut 407 mounted in the lower end of the tubes 395 and is constrained against all movement with respect thereto by set screws 408. A ball thrust bearing 409 is interposed between each of the bosses 401 and the adjacent end of the threaded portion 406 of the shaft 404. A worm wheel 410 is secured to the lower end of each of the shafts 404 by a set screw 411.

Referring to Fig. 5, the worm wheel housing 400 is provided with a pair of spaced lugs 412 having a bushing 413 mounted therein. The housing 400 has a shaft 414 journalled in the bushings 413 associated therewith and a worm 415 is mounted on said shaft between the lugs 412. A hand crank 416 is fastened to the shaft 414 at the rear of the machine and provides means whereby the shaft 414 can be manually rotated. A sprocket 417 is fastened to the shaft 414 at a point between the housing 400 and the crank 416. A sprocket chain 418 extends around the sprocket 417 and also around a sprocket 419 secured to a shaft 420 journalled in the bushings 421 mounted in lugs 422 projecting from the worm wheel housing 400ª. A worm 423 is fastened to the shaft 420 between the lugs 422.

The worms 415 and 423 mesh with the worm wheels 410 in their associated housings and are drivingly interconnected by the chain 418. Accordingly, when the hand crank 416 is rotated, both worms 415 and 423 will be rotated at the same speed and effect simultaneous rotation of the shafts 404. Rotation of the shafts 404 will cause the threaded portions 406 thereof to move the travelling nuts 407 either up or down, depending upon the direction in which the hand crank 416 is turned. In this manner, the tubes 395 either enter the cylindrical housings 396 of the elevating mechanism or are projected therefrom to effect raising or lowering of the platform 390 and the gear box 391, etc., carried thereby.

The upper end of each of the cylindrical housings 396 is provided with a slot 424 (Figs. 24 and 25) and spaced ears 425 are arranged on the opposite sides of said slot. A cap screw 426 extends through an opening 427 in one of the ears 425 and is threaded into an opening 428 in the other of said ears. It will be apparent, therefore, that when the platform 390 has been adjusted to the desired height (to accommodate bottles or containers of various heights), the tubes or columns 395 can be locked against inadvertent movement by tightening the cap screws 426 to clamp the split end of the housings 396 around said columns.

The platform 390 (Fig. 25) is provided with an opening 429 through which the upper section 125ª of the main drive shaft extends. The shaft section 125ª is vertically aligned with the shaft section 125. The upper end of the shaft section 125 is provided with a long keyway 430 in which a key 431 is mounted. The key 431 is held in the keyway 430 by a plurality of small dowel pins 432. One element 433 of a sleeve coupling 434 has a keyway 435 which receives a portion of the key 431 and prevents the sleeve section 433 from rotating with respect to the shaft 125. The shaft section 125ª has a keyway 436 in which a key 437 is mounted. The other element 438 of the sleeve coupling 435 has a keyway 439 which cooperates with the key 437 to prevent relative rotation between the coupling element 438 and the shaft section 125ª. The lower end of the coupling element 438 is provided with three notches 440 which are adapted to receive projections 441 formed upon the upper end of the coupling element 433 so that the two coupling elements are thus drivingly interconnected. Axial movement of the coupling elements 438 with respect to the shaft section 125ª is prevented by a pin 442, and axial movement of the coupling element 433 is prevented by a set screw 443, so that the coupling elements are thus maintained in driving engagement. The set screw 443 is loosened whenever it is desired to raise or lower the platform 390 relative to the main bed 81, and such loosening of the set screw permits telescoping of the main shaft section 125 with respect to the coupling sleeve 433 while the platform 390 is being raised or lowered. After the platform 390 has been adjusted to the desired height, the set screw 443 is retightened so that the coupling elements 433 and 438 are held engaged and a driving connection is maintained between the main drive shaft parts 125 and 125ª.

The gear housing 391 has a bottom wall 447 which is counterbored at 448 to receive a ball bearing 449 serving as one journal for the shaft section 125ª. A bracket 450 (Fig. 33) is mounted upon an end wall 451 of the gear housing 391 by cap screws 452. The bracket 450 is counterbored at 453 to receive a ball bearing 454 forming a journal for the upper end of the shaft section 125ª. A spiral gear 455 is secured to the shaft section 125ª by a key 456 and its hub engages a shoulder 457 formed on the portion of said shaft section which is disposed in the ball bearing 449. A small spacer 454ª is interposed between the bearing 454 and said spiral gear 455. The shaft section 125ª has a reduced threaded extension 458 which extends through the ball bearing 454 and the spacer 454ª, and a nut 459 threaded upon said extension maintains the gear 455, spacer 454ª and ball bearing 454 assembled on said shaft section. The bracket 450 prevents axial movement of this assembly relative to the gear housing 391.

The spiral gear 455 meshes with a spiral gear 460 (Fig. 37), which is arranged at right angles thereto and fastened to a shaft 461 by a key 462. The shaft 461 has one end thereof journalled in a ball bearing 463 mounted in a counterbored opening 464 formed in the front wall 465 of the gear housing 391. A bracket 466 is secured to the bottom wall 447 of the gear housing 391 by cap screws 467. A ball bearing 468 is mounted in the bracket 466 and serves as a second journal for the shaft 461. A spur gear 469 is fastened to the shaft 461 adjacent the ball bearing 463 by a set screw 470. A spacer 471 is arranged between the ball bearing 463 and a shoulder on the shaft 461 adjacent the spur gear 469, another spacer 472 is arranged between the hub of the spur gear 469 and the ball bearing 468, and still another spacer 473 is arranged between the ball bearing 468 and the spiral gear 460. The end of the shaft 461 adjacent the spiral gear 460 is threaded as indicated at 474, and a nut 475 is threaded thereon to retain the spiral gear 460 upon said shaft.

The spur gear 469 meshes with a spur gear 476 which is secured to a shaft 477 by a set screw 478. One end of the shaft 477 is journalled in a bushing 479 mounted in a rear wall plate 480, which is fastened along its lower edge to the bottom wall 447 of the gear housing 391 by cap screws 481 and is fastened at its upper end by cap screws 483 (Figs. 35 and 48) to the rear edge of a cover plate 484. The front edge portion of the cover plate 484 rests upon the upper edge of the front wall 465 and is secured to lugs 485 projecting inwardly therefrom by cap screws 486. The cover 484 is also secured to the upper edge of the housing end wall 451 by cap screws 487'.

Figures 39, 40:
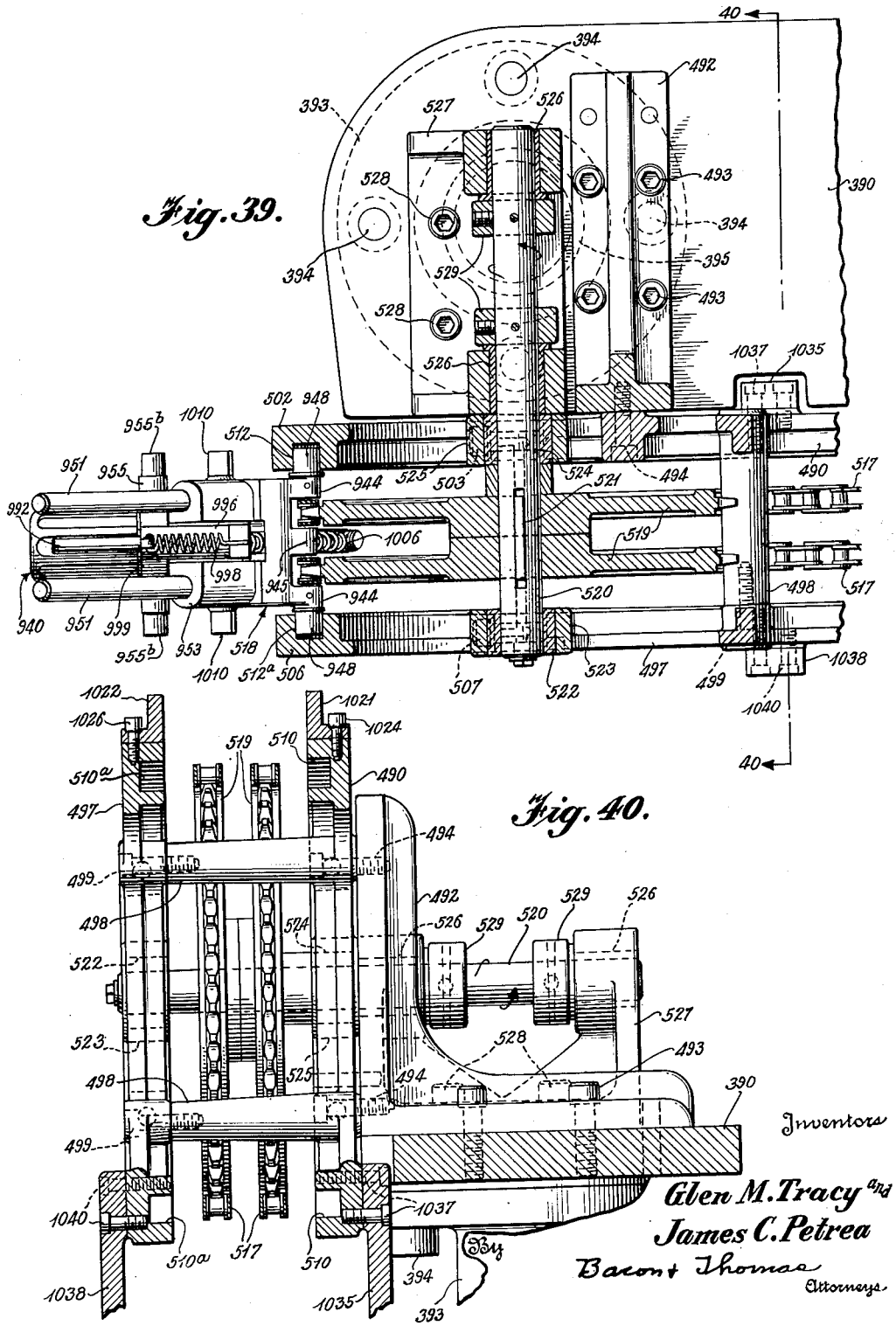
Fig. 39 is a horizontal sectional view taken on the line 39—39 of Fig. 1, illustrating the supporting bracket and sprocket for the left hand of the mandrel conveyor.
Fig. 40 is a sectional view taken on the line 40—40 of Fig. 39.

The shaft 477 extends through a bushing 486 (Figs. 37 and 48) mounted in the front wall 465 and has an enlarged portion 487 disposed exteriorly of the gear housing 391. The enlarged shaft portion 487 extends through a bushing 488 mounted in a boss 489 formed at the right end of a rear conveyor-guide plate 490. The plate 490 is secured to the front wall 465 of the gear housing 391 by a plurality of cap screws 491 and is supported at a point beyond the left end of said housing by a bracket 492 (Figs. 39 and 40), which is secured to the platform 390 by a plurality of cap screws 493, other cap screws 494 securing said plate to said bracket. Reverting to Figs. 37 and 48, the enlarged portion 487 of the shaft 477 is also journalled in a bushing 495 formed in a boss 496 at the right end of a front conveyor-guide plate 497. The rear plate 490 has three posts 498 projecting forwardly therefrom and the front plate 497 is fastened against the ends of said posts by cap screws 499. The rear plate 490 has a semi-circular end section 500 fastened to the right end thereof by cap screws 501, and a similar semi-circular end section 502 (Fig. 39) is fastened to the left end thereof by cap screws 503. The front plate 497 also has a semi-circular end section 504 secured to the right end thereof by cap screws 505, and a semi-circular end section 506 secured to the left end thereof by cap screws 507.

The rear conveyor-guide plate 490 is grooved on its inner side adjacent the longitudinal edges thereof to provide parallel tracks 510 (Figs. 40 and 48), and the end section 500 is provided with a semi-circular groove 511 (Fig. 37) that interconnects the tracks 510 at the right end of the rear plate 490. The end section 502 is provided with a semi-circular groove forming a track 512 (Fig. 39) interconnecting the tracks 510 at the left end of the rear plate 490. The front conveyor-guide plate 497 is also grooved on its inner side along the upper and lower edges thereof to provide tracks 510ᵃ arranged in confronting relation to the tracks 510. The end section 504 (Fig. 37) is provided with a semi-circular groove 511ᵃ which confronts the groove 511 and interconnects the tracks 510ᵃ at the right end of the front plate 497. Similarly, the end section 506 (Fig. 39) is provided with a semi-circular groove 512ᵃ which confronts the groove 512 and interconnects the tracks 510ᵃ at the left end of the front plate 497. Thus, two endless conveyor tracks are provided for positively guiding the carriages of a plurality of band-receiving mandrels, as will be explained more fully hereinafter.

A pair of sprocket wheels 515 (Fig. 37) is mounted upon the enlarged portion 487 of the shaft 477 between the front and rear conveyor-guide plates 490 and 497. A key 516 connects the sprockets 515 for rotation with the shaft 477. A chain 517 extends around each of the sprockets 515 and these chains jointly interconnect a plurality of mandrel carriages generally identified by the numeral 518. The chains 517 also extend around a pair of sprockets 519 (Figs. 39 and 40) fastened to a shaft 520 by a key 521. The shaft 520 is journalled at one end in a bushing 522 mounted in a boss 523 formed integral with the front left end section 506. The shaft 520 is further journalled in a bushing 524 mounted in a boss 525 formed integral with the rear left end section 502. The shaft 520 is supported in bushings 526 mounted in a double bracket 527 disposed adjacent the bracket 592 and fastened to the platform 390 by cap screws 528. Collars 529 secured to the shaft 520 between the bushings 526 prevent axial movement of the shaft 520 with respect to the bracket 527.

Referring again to Fig. 37, the shaft 477 has one element 535 of a jaw clutch 536 slidably but non-rotatably secured thereto by a key 537. The other element 538 of the jaw clutch 536 is rotatably mounted upon the shaft 477 and the hub portion 539 thereof carries a spur gear 540. The jaw clutch element 535 has a groove 541 for the reception of rollers 542 carried by a yoke portion 543 of a clutch actuating lever 544. The lever 544 is supported by a post 545 extending upwardly from the bottom wall 447 of the gear housing 391 and is fulcrumed upon said post by a pin 546. The free end of the lever 544 is pivotally connected to one end of a link 547 by a pin 548 and the opposite end of said link is pivotally connected to one end of arm 549 by a pin 550. The arm 549 is secured to a vertical shaft 551 by a set screw 552. The shaft 551 is journalled in a pillow block 553 (Fig. 48) secured to the platform 390 by cap screws 554. The lower end of the shaft 551 is journalled in a block 555 (Fig. 25) secured to the bedplate 81 by cap screws 556. A collar 557 adjacent the pillow block 553 supports the weight of the shaft 551 and relieves the linkage comprising the arm 549, link 547 and lever 544 of all strain. Whenever the platform 390 is raised or lowered the collar 555 is, of course, loosened as is also the set screw 552 which secures the arm 549 to the shaft 551 in order not to interfere with the adjustment of the platform 390 relative to the conveyor 175. After the platform 390 has been adjusted, as desired, the collar 557 is again fastened to the shaft 551 and the set screw 552 is tightened to secure the arm 549 to said shaft.

The shaft 551 includes an offset portion 560 (Figs. 4, 24 and 25) intermediate its ends and a lug 561 is secured to said offset portion by a screw 562. One end of the trip rod 378, previously described, is bent upwardly as indicated at 563 and pivotally connected to the lug 561. Thus, it will be apparent that whenever the trip rod 378 is longitudinally actuated by the bottle spotting mechanism, as previously described, the shaft 551 will be caused to rotate in a clockwise direction as viewed in Fig. 37 to effect disengagement of the clutch 536 through the actuation of the arm 549, link 547 and clutch lever 544.

The spur gear 540 carried by the clutch element 538 meshes with a spur pinion 568 (Figs. 33 and 41), which is secured to a shaft 569 by a set screw 570. The shaft 569 is journalled at one end thereof in a bushing 571 mounted in the rear wall plate 480 of the gear housing 391, and is further journalled in a bushing 572 mounted in the same bracket 466 that supports the shaft 461. A collar 573 is fastened to the shaft 569 adjacent the bushing 572 and cooperates with the pinion 568 to prevent axial movement of the shaft 569 relative to the gear housing 391. A spur gear 574 is fastened to the shaft 569 and meshes with a spur gear 576 secured to a shaft 577 (Fig. 35) which is journalled in a bushing 578 mounted in the previously mentioned bracket 466 and in a bushing 579 mounted in the rear plate 480 of the gear housing 391.

The shaft 569 carries a cam 580 (Figs. 33 and 41) for controlling the movements of a band pickup mechanism which will be described in detail later. On the other hand, the shaft 557 carries a face cam 581 (Fig. 35) for controlling the application of vacuum to the band pickup mechanism, and a face cam 582 for controlling the application of vacuum to a pair of band-opening heads, which will also be described in detail later.

Referring to Fig. 37, the spur gear 540 on the clutch element 538 meshes with a spur gear 585 mounted on a shaft 586 journalled in a bushing 587 in the rear plate 480 and a bushing 588 mounted in the front wall 465 of the gear housing 391. A gear 589 is fastened to the shaft 586 adjacent the front wall 465 and meshes with a gear 590 (Figs. 33 and 48) therebelow mounted on a shaft 591. The shaft 591 is journalled at one end in a bushing 592 mounted in the front wall 465 and is further journalled in a bushing 593 mounted in a pedestal 594 projecting upwardly from the bottom wall 447 of the gear housing 391. The gear 589 also meshes with a gear 595 rotatably arranged upon a stud 596 mounted on the front wall 465 of the gear housing 391. The gear 595 in turn meshes with a gear 597 mounted upon one end of a shaft 598. The shaft 598 projects through the front wall 465 (Fig. 37) and is journalled in a bushing 599 mounted in said front wall. The shaft 598 also extends through a bushing 600 mounted in a boss 601 formed in an upright web 602 of the front conveyor plate 497. A cam 603 is fixed upon the projecting end of the shaft 598. The cam 603 controls the movements of the movable head of the band-opening mechanism, as will be explained in detail later.

Figure 48:
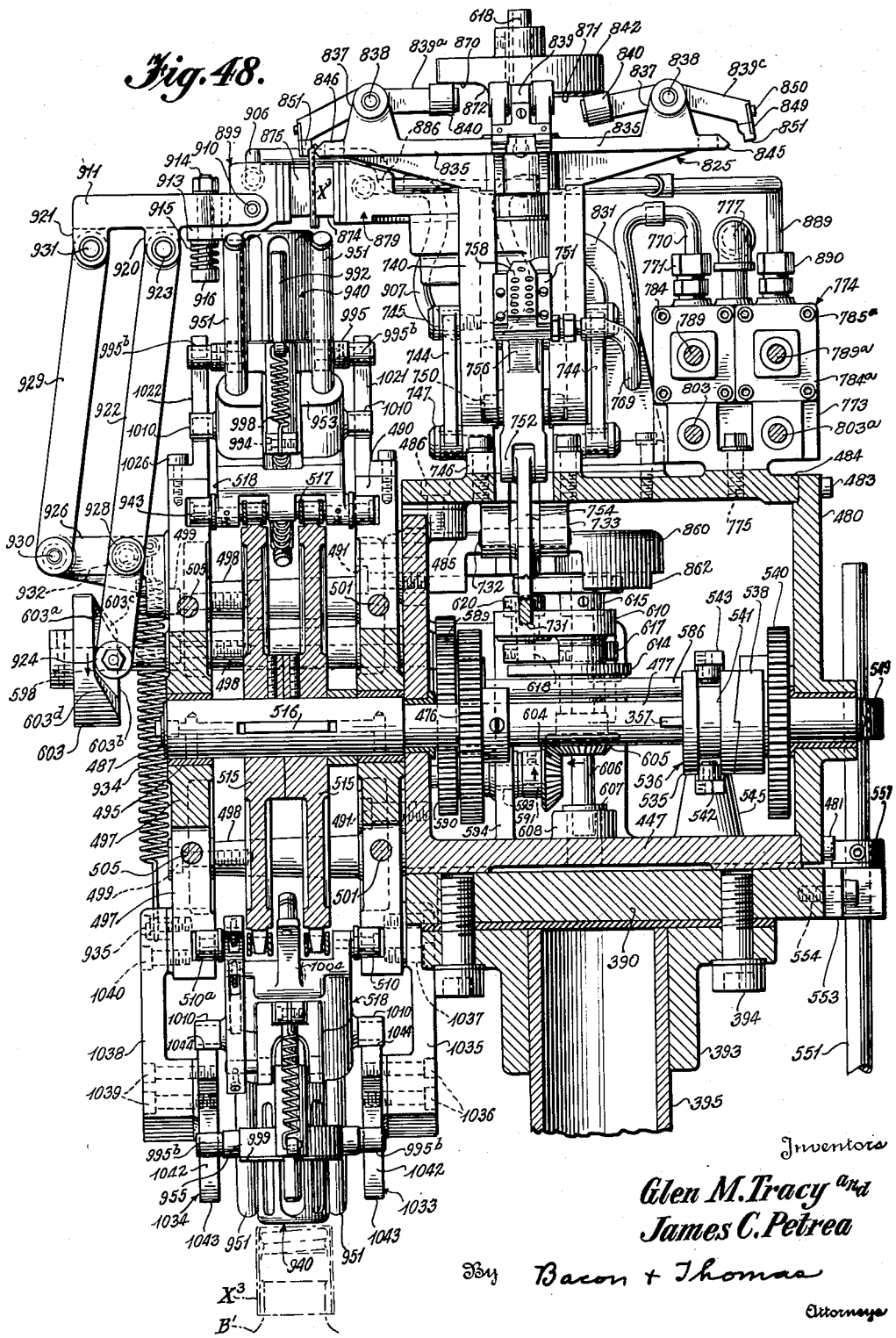
Fig. 48 is a vertical sectional view taken on the line 48—48 of Fig. 33, but illustrating the band transfer device with one arm in position to receive a band and another arm supporting a band ready to be opened by the band-opening mechanism.

Referring to Figs. 37 and 48, the shaft 591 has a bevel gear 604 fastened thereto that meshes with a bevel gear 605 fastened to a vertical shaft 606. The lower end of the shaft 606 is journalled in a bushing 607 mounted in a boss 608 projecting upwardly from the bottom wall 447 of the gear housing 391. The upper end of the shaft 606 is journalled in a bushing 609 (Fig. 33) mounted in a plate 610 fastened by cap screws 611 to a shelf 612 projecting inwardly from the left end wall 613 of the gear housing 391. A cam 614 is fastened to the shaft 606 at the lower side of the plate 610 and a Geneva crank 615 is fastened to said shaft above said plate and cooperates with the hub of the cam 614 to prevent axial movement of the shaft 606. The function and purpose of the Geneva crank 615 will be described in detail later. The periphery of the cam 614 engages a roller 616 carried by one end of an arm 617. The arm 617 is fastened to a vertical shaft 618 journalled in a bushing 619 in the plate 610. The arm 617 is arranged at the lower surface of the plate 610 and a collar 620 is fastened to the shaft 618 at the upper side of the plate 610 and cooperates with said arm to prevent axial movement of the shaft 618. As is best shown in Fig. 37, a pin 621 is mounted in the arm 617 at a point adjacent the shaft 618 and has one end of a tension spring 622 connected thereto. The other end of the spring 622 is fastened to a pin 623 depending from the plate 610 (see Fig. 50). The tension in the spring 622 tends to maintain the roller 616 in contact with the periphery of the cam 614 at all times. The function of the cam 614 is to effect oscillatory movement of the shaft 618 for a purpose described later.

The type of band X of wet regenerated cellulose material applied by the present machine to the necks of bottles or other containers is illustrated in its normally flat condition in Figs. 33, 45 and 50. These bands may be plain or bear any desired identifying indicia or advertisement (not shown). A stack of the wet bands X is manually placed in a feed magazine generally identified by the numeral 630. The feed magazine 630 is supported upon a base 631 (Fig. 33) adjustably mounted upon the cover plate 484 of the gear housing 391 by three cap screws 632. The base 631 includes a top wall 633 inclined on an angle of about 30° with respect to the horizontal and bulbous enlargements 634 and 635 are formed upon said wall. A movable bracket 636 has studs 637 secured thereto which are guided in bushings 638 mounted in the enlargements 634 and 635. The lower end of the studs 637 are threaded as indicated at 639 for the reception of adjusting nuts 640 and compression springs 641 surround said studs and are located between the nuts 640 and the bushings 638. The action of the springs 641 constantly tends to draw the bracket 636 toward the base 631.

Adjustment of the bracket 636 relative to the base 631 is effected by a threaded stem 642, the upper end of which is fastened by a pin 643 to the bracket 636. The stem 642 extends through an opening 644 in the wall 633 and terminates in a reduced portion 645. A knurled nut 646 is threaded on the stem 642 and the lower face thereof engages a boss 647 on the upper surface of the inclined wall 633. Inasmuch as the stem 642 is prevented from turning by the pin 643, rotation of the nut 646 will cause the bracket 636 to be moved either toward or away from the base 631, depending upon the direction in which said nut is turned.

Referring to Figs. 44 and 45, the base 631 includes side walls 648 and 649 which extend downwardly from the wall 633. A web 650 interconnects the side walls 648 and 649 and a clamping member 651 is fastened to the under side of the web 650 by a cap screw 652. The clamping member 651 has an opening 653 to receive the reduced end 645 of the stem 642. A slot 654 formed in the locking member 651 extends inwardly from one end of said member to a point beyond the opening 653. A screw 655 extends through an opening 656 in the wall 649 and has a reduced threaded end 657 arranged to draw the split portions of the locking member 651 together to tightly clamp the same about the reduced portion 645 of the stem 642 to lock said stem in any desired position of adjustment. The screw 655 has a knurled head 658 enabling the same to be turned by the fingers.

Referring now to Figs. 33, 41 to 43, and 45, the magazine 630 further comprises an inclined chute 659 mounted upon the bracket 636. The chute 659 includes a bottom plate 660 which is fastened to lugs 661 projecting laterally from the bracket 636 by cap screws 662. The plate 660 is grooved to provide a pair of upstanding ridges 663 adapted to support a stack of bands X and to reduce to a minimum the area of frictional contact between said bands and the bottom plate 660. The grooves thus formed collect any liquid that drips off the wet bands X. A stop plate 664 is fastened to the lower end of the bottom plate 660 by cap screws 665 and is arranged to prevent the stack of bands from inadvertently sliding out of the chute 659. The stop plate 664 is cut away, as indicated at 666, to form an opening affording access to the foremost of the bands X. The lower end face of each of the ridges 663 has a channel 667 (Fig. 45) formed therein to interconnect the grooves 668 disposed outwardly thereof with the central groove 669. The plate 664 has an opening 670 communicating with the groove 669 and a drain pipe 670ᵃ is connected with said opening.

A pair of guide rails 671 is arranged above the bottom plate 660 and supported by L-shaped brackets 673 adjustably secured at spaced intervals to the bottom plate 660 by cap screws 674, the rails 671 being fastened to the brackets 673 by rivets 675. The adjustability of the brackets 673 permits the rails 671 to be positioned to accommodate bands X of different widths.

It will be noted from Fig. 33 that the bottom plate 660 includes a portion 678 adjacent the discharge end thereof which is straight but inclined and another straight portion 679 arranged at a greater angle to the horizontal, the two straight portions 678 and 679 being interconnected by a gently sloping or curved portion 680, in order to facilitate gravity feeding of the bands toward the stop plate 664. The guide rails 671, of course, are bent lengthwise so that they follow the contour of the upper surface of the plate 660.

Referring now to Fig. 45, the bracket 636 includes an enlargement 681 through which a shackle bolt 682 extends. The shackle bolt 682 has a head 683 at one end thereof and is provided with threads 684 at the opposite end thereof. A knurled nut 685 is mounted upon the threads 684 and is adapted to be manually tightened to hold the shackle bolt 682 in any desired position of adjustment with respect to the bracket 636. The bolt head 683 has an opening 686 to receive an upright post 687. The post 687 has a keyway 688 and a key 689 is mounted therein. The opening 686 also has a keyway 690 for the reception of the key 689, whereby to prevent the post 687 from turning in the head 683. The post 687 can be vertically adjusted with respect to the head 683 and locked in any desired position of adjustment by a set screw 691.

A bracket 692 (Figs. 45 to 47) has an opening 693 for the reception of the upper portion of the post 687 and a Woodruff key 694 is carried by the post 687 and arranged to prevent the bracket 692 from rotating with respect thereto. The upper end of the post 687 is reduced in diameter and is provided with threads 697. A knurled nut 698 is arranged upon the threads 697. A collar 699 is adjustably secured to the post 687 by a set screw 700 and is located between the bracket 692 and the head 683. A compression spring 701 surrounds the portion of the post 687 between the collar 699 and the bracket 692, and constantly urges said bracket in a direction away from the collar and holds the same in engagement with the lower face of the nut 698.

A pair of gibs 702 is fastened to the left side of the bracket 692, as viewed in Fig. 45, by cap screws 703. A slide 704 is arranged between the gibs 702 and has a transverse projection 705 at one end thereof. The bracket 692 has a wall 706 arranged parallel with the projection 705. A screw 707 is threaded into an opening 708 in the wall 706 and has a reduced end 709 rotatably received in a slot 710 in the lateral projection 705. An enlargement 711 at the extreme end of the slot 707 constrains the slide 704 against axial movement relative to the screw 707. The screw 707 has a knurled head 712 whereby the same can be rotated by the fingers to effect adjustment of the slide 704 relative to the bracket 692.

The slide 704 has an elongated slot 713 and a cap screw 714 extends through said slot and is threaded into an opening 715 in the bracket 692. The cap screw 714 is adapted to be tightened to lock the slide 704 in any desired position of longitudinal adjustment with respect to the bracket 692. The slide 704 has an end 716 which projects beyond the bracket 692 and carries a horizontally projecting stud 717 which is fastened thereto by riveting over a reduced end of said stud, as indicated at 718 (Fig. 46). A stop 719 (Fig. 47) is adjustably mounted upon the stud 717 by a set screw 720. The stop 719 carries a foot 721 which is adapted to lie adjacent the upper edges of the stack of bands X in the delivery chute 659. The foot 721 has a toe portion 722 which is adapted to be positioned so that it prevents removal of all but the foremost band of the stack, by a pickup mechanism, as will be explained later, and a curved heel portion 723 which facilitates forward sliding of the bands beneath the foot 721.

It will be apparent from the foregoing that, the height of the foot 721 with respect to the bottom plate 660 of the chute 659 can be varied by either adjusting the post 687 in the head 683, if a substantial change in adjustment is necessary, or simply by adjusting the nut 698 to effect up or down movement of the bracket 692 on the post 687 for minor adjustments. Such adjustment is desirable to adapt the machine for bands or sleeves of different heights. It will also be apparent that the foot 721 can be moved toward or away from the plate 664 at the lower end of the chute 659 by adjustment of the slide 704 upon turning of the head 712 of the screw 707. Aside from the adjustment of the foot 721 to adapt the machine for bands of different heights, it is important to be able to adjust the foot 721 to accommodate the forward movement of a band pickup head, which removes the foremost band in the stack, but before doing so, pushes back the entire stack of bands in the magazine to a predetermined position, as previously indicated, wherein only sufficient clearance is left between the band pickup head and the toe 722 to permit only one band to be removed from the magazine at a time.

Referring to Figs. 33, 49, 50 and 55, the band pickup mechanism is generally identified by the numeral 730. This mechanism comprises a lever 731 which is pivotally mounted upon a pin 732 carried by a bifurcated bracket 733 secured to the under side of the cover plate 484 of the gear housing 391 by cap screws 734. The lower end of the lever 731 has a roller 735 secured thereto by a pin 736. The roller 735 engages with the periphery of the cam 580, which it will be recalled is mounted upon the shaft 569. The upper portion of the lever 731 extends through an opening 737 in the cover plate 484 and is pivotally connected by a pin 738 with a rearward projection 739 formed integral with a carriage guide 740. The carriage guide 740 includes parallel rails 741, each provided with a track 742, the rails 741 being interconnected by the projection 739 at a point spaced from the lower end thereof and being connected adjacent their upper ends by a transverse web 743. Each of the rails 741 is pivotally connected with the upper end of a link 744 by studs 745. The lower end of each of the links 744 is pivotally connected to a bracket 746 by studs 747. The brackets 746 are arranged along opposite sides of the opening 737 and are secured to the cover plate 484 of the gear housing 391 by cap screws 748.

A carriage 749 is arranged between the rails 741 and has two rollers 750 secured to each of the sides thereof by studs 751. The rollers 750 ride in the tracks 742 so that said carriage is reciprocable in the carriage holder 740. The lower end of the carriage 749 is slotted as indicated at 752 and is pivotally connected by a pin 753 with the upper end of a link 754. The lower end of the link 754 is connected by a stud 755 to the cam 580 and serves as a crank pin to effect reciprocation of the carriage 749 in its guide 740. A pin 740ᵃ is mounted on the projection 739 and one end of a tension spring 740ᵇ is connected thereto. The opposite end of the spring 740ᵇ is connected to a pin 740ᶜ mounted on a bracket 831. The spring 740ᵇ acts to maintain the roller 735 in contact with the periphery of the cam 580 and to effect retraction of the holder 740 as permitted by said cam.

The carriage 749 has an integral forward extension or band pickup head 756 (Fig. 51) provided with flanges 757 on the opposite sides thereof. A rubber suction pad 758 is provided with side flanges 759 and is cemented to the end face 760 of the head 756. The plates 761 overlie the flanges 759, and cap screws 762 extend through said plates and the flanges 759 of the rubber pad 758 and into threaded openings 763 in the flanges 757 to tightly clamp the pad 758 against the face 760 of said head.

Figure 71:
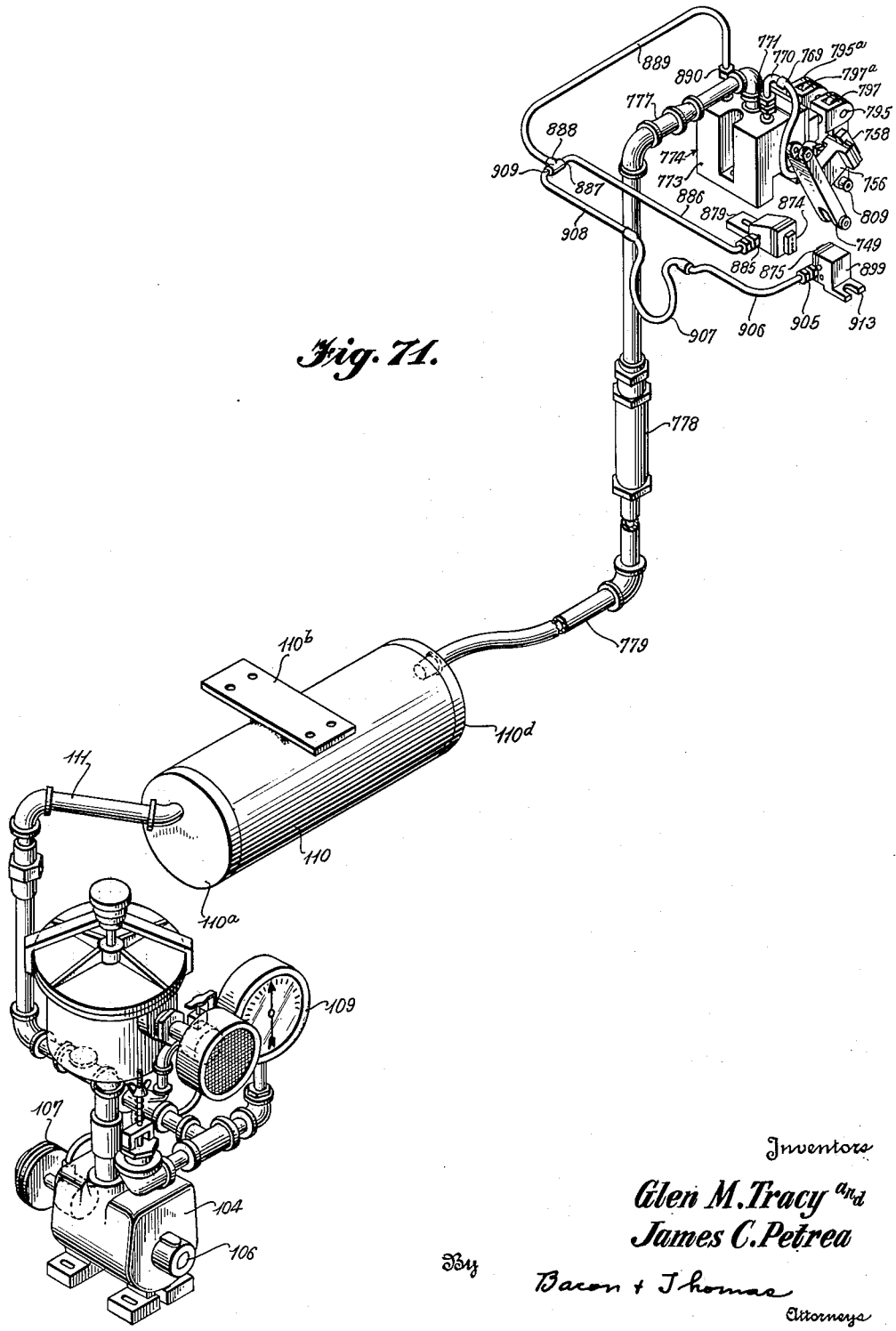
Fig. 71 is a diagrammatic perspective view of the complete vacuum system and suction control valve associated with the band pickup head and the band-opening heads.

The suction pad 758 has a plurality of passageways 764 opening on the outer face 765 thereof, said passageways being countersunk at said face to increase the area of effectiveness of said suction pad. The passageways 764 communicate at their inner ends with a chamber 761ᵃ which has a port 761ᵇ opening thereinto. The face 760 is provided with a recess 766, which extends for substantially the full height of the pad 758. A passageway 767 communicates with the recess 766 and one end of a tube 768 is connected in communication with the passage 767 by a conventional fitting 768ª. One end of a flexible conduit 769 is connected to the tube 768 and the opposite end of said conduit is connected to a tube 770 (Fig. 71). The tube 770 is connected by a conventional fitting 771 with a passage 772 (Figs. 72 and 75) in a body 773 of a vacuum control valve 774. The valve 774 is adjustably fastened to the cover plate 484 of the gear housing 391 by cap screws 775. The valve body 773 has a main passageway 776, which is connected by a pipe 777 with a telescopic slip joint 778 (Fig. 71). The opposite end of said slip joint is connected by a pipe 779 to the end 110$^d$ of the vacuum tank 110. The slip joint 778 permits the platform 390 to be raised and lowered, as previously described, without in any way disrupting the connection between the valve 774 and the vacuum tank 110.

The main passageway 776 intersects two cylindrical chambers 780 and 781 formed in the valve body 773. A port 782 (Fig. 74) is arranged to establish communication between the passage 772 and the chamber 781. A conical seat 783 is formed at the end of the port 782 remote from the passage 772. The chamber 781 is closed by a valve cover 784 secured to the valve body 773 by four cap screws 785 (Fig. 72), a gasket 786 being interposed between the cover 784 and the adjacent surface of the valve body 773. The cover 784 has a boss 787 containing bushings 788 adapted to slidably receive a valve stem 789, which controls the application of vacuum to the suction pad 758 of the band pickup head 756. The valve stem 789 is enlarged at one end to provide a frusto-conical head 790 adapted to engage with the seat 783. The valve stem 789 has a threaded portion 791 adjacent the head 790 and a circular plate 792 is threaded thereon. A Sylphon bellows 793 has one end thereof secured to the plate 792 and its opposite end connected to the cover 784 to form a tight seal around the valve stem 789. A compression spring 794 is arranged within the bellows 793 between the cover 784 and the plate 792 and constantly urges the valve head 790 into engagement with its seat 783.

A swivel 795 is fastened to the outer end of the valve stem 789 by set screws 796. One end of a lever 797 is pivotally connected with the swivel 795 by a pin 798. The pin 798 is received in elongated openings 799 in the swivel 795 to provide the clearance necessary to permit oscillatory movement of the lever 797. The lever 797 is fulcrumed upon a pin 800 mounted in a clevis 801 threaded upon the reduced end 802 of an exhaust valve stem 803. The exhaust valve stem 803 is slidable in bushings 804 mounted in the valve body 773. The inner end of the exhaust valve stem 803 is ground to form a frusto-conical head 805 that engages a conical seat 806 formed at the outer end of a port 807 that communicates with the lower end of the passage 772. The lower end of the lever 797 carries a stud 808 upon which a roller 809 is mounted. The roller 809 extends into a groove 811 formed in the face cam 582 previously referred to, which is mounted upon the shaft 577.

The groove 811 of the cam 582 includes a portion 812 which is concentric with the axis of the cam and extends through an angle of 160°. The cam groove 811 also includes a concentric portion 813 extending through an angle of 160°, but with the opposite sides of the portion 813 formed upon radii shorter than those forming the sides of the groove portion 812. The groove portions 812 and 813 are interconnected at their adjacent ends by groove portions 814 and 815, each of which extends through an angle of 20°.

It will be apparent from the foregoing, that when the cam 582 is rotating in a counterclockwise direction, as indicated by the arrow in Fig. 72, the vacuum control valve stem 789 and the exhaust control valve stem 803 will be alternately operated so that when one valve is open the other is closed, the closing of one valve occurring prior to the opening of the other. Thus, when the intermediate part of the groove portion 814 is engaged with the roller 809, both valve stems 789 and 803 are seated, as shown. However, when the groove portion 812 is engaged with the roller 809, the lever 797 will have been caused to fulcrum in a counterclockwise direction about the pin 800 with the result that the lever 797 assumes a position causing the head 790 of the vacuum supply valve stem 789 to be moved away from its seat 783 against the resistance of the spring 794, to thereby open the passage 772 to the chamber 781, which is always under vacuum. The conduit 789 connected with the suction pad 758 of the band pickup head 756 is thus placed in communication with the vacuum tank 110, whereby the suction will grip any band contacting said pad to effect removal thereof from the magazine 659, as will be described later.

As the cam 582 continues to rotate and the portion 815 of the cam groove 811 engages with the roller 809, the lever 797 will fulcrum about the pin 800 as the head 790 of the valve stem 789 re-engages its seat 783 to cut off vacuum communication with the passage 772 and the suction pad 758. Thereafter, the fulcrum point of the lever 797 will shift to the pin 798 and further movement of the lever 797 will cause the exhaust valve stem 803 to move toward the right, as viewed in Fig. 72, to move its head 805 away from the seat 806 to thus open the passage 772 to the atmosphere. The exhaust valve stem 803 will remain in its open position so long as the cam portion 813 engages the roller 809. The connection of the suction pad 758 with the atmosphere will, of course, effect the release of any band being held by the pickup head 756. Such release is timed to occur after the band has been clamped upon a band transfer device, as will be explained later.

Figure 49:
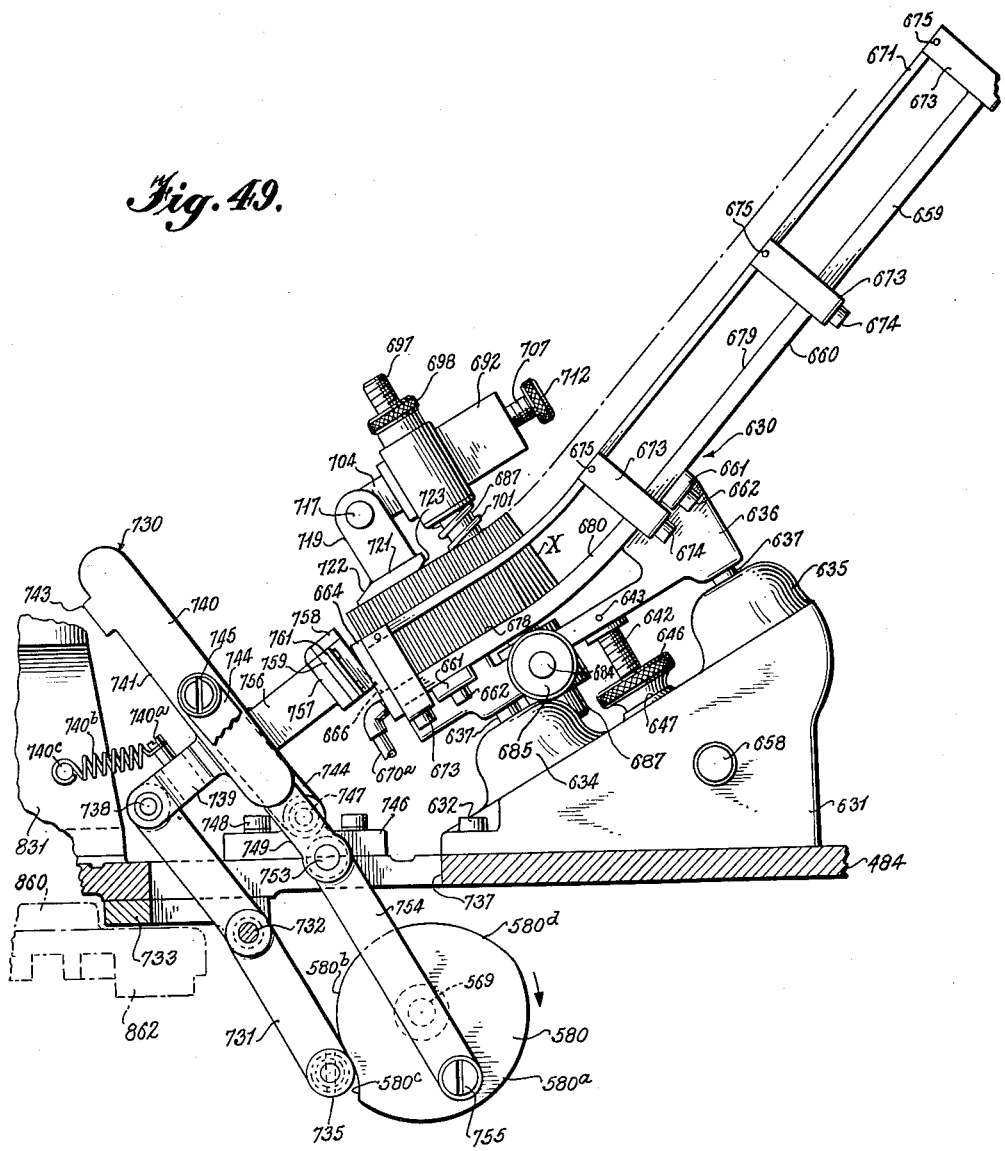
Fig. 49 is a view partly in section showing the band pickup head and supply magazine with the band pickup head in its fully retracted position.

The timing of the opening and closing of the valves controlled by the stems 789 and 803 is correlated with the movement of the band pickup mechanism 730 which, in turn, is controlled by the combined cam and crank 580. As shown in Fig. 50, the cam 580 rotates in a clockwise direction and includes a peripheral surface 580ª constituting a dwell and extending through an angle of 170°. The crank pin 755 is located upon a radial line intersecting the dwell 580ª at a point approximately medially of the length of said dwell. The cam 580 includes a relatively shorter dwell 580$^b$ which extends through an angle of about 60°. The dwells 580ª and 580$^b$ are interconnected by surfaces 580$^c$ and 580$^d$. When the cam surface 580$^b$ is in engagement with the roller 735, the carriage guide 740 is fully retracted from the magazine 659, as shown in Fig. 49. However, as the cam surface 580$^c$ engages the roller 735 (Fig. 33), the pickup head 756 carrying the suction pad 758 is moved in substantially a straight line toward the stack of bands X in the magazine 659, and the movement thereof is such that the suction pad 758 enters the opening 666 in the plate 664 and causes the entire stack of bands to be pushed back into the supply magazine 659, to a predetermined position, as previously mentioned. The suction pad 758 is maintained in this advanced position by engagement of the dwell 580ᵃ with the roller 735. It will be observed from Fig. 33 that at about the time that the surface 580ᵃ contacts the roller 735, the crank pin 755 has just passed the lowest part of its stroke and that the carriage 749 is, therefore, at the lower end of the carriage guide 740.

It will also be noted from the cam timing diagram, Fig. 92, that the cam 582 is now holding the vacuum supply control valve 790 in its open position so that the suction pad 758 is now gripping the foremost band X' in the magazine 659. Accordingly, as the cam 580 continues its rotation, the dwell 580ᵃ will hold the guide 740 in a fixed position substantially parallel with the plate 664 in opposition to the action of the spring 740ᵇ. While the guide 740 is thus held, the crank pin 755 acting through the connecting rod 754 will cause the carriage 749 to move upwardly and thereby withdraw the foremost band X' from the magazine 659, as will be clear from the cam diagram (Fig. 92) and also from Fig. 50, which shows the pickup head 756 in the act of removing the foremost band X' from the stack. The foot 721, as previously described, is adjusted to a position to permit the removal of the foremost band X' and to hold back the second band X" and all of the remaining bands X. The crank pin 755 continues to raise the carriage 749 until the band pickup head 756 reaches the position shown in Fig. 54, wherein the band X' is shown as having been delivered to a band transfer device or head generally identified by the numeral 825. The suction on the pad 758 is released just before the crank pin 755 starts to move the carriage 749 downwardly and just before the cam surface 580ᵈ engages the roller 735 and effects the return of the holder 740 to its retracted position shown in Fig. 49. Thus, it will be clear from a comparison of Figs. 49, 33 and 55, that the suction pad 758 of the band pickup head 756 travels through a substantially triangular path for each cycle of its operation.

Figure 55:
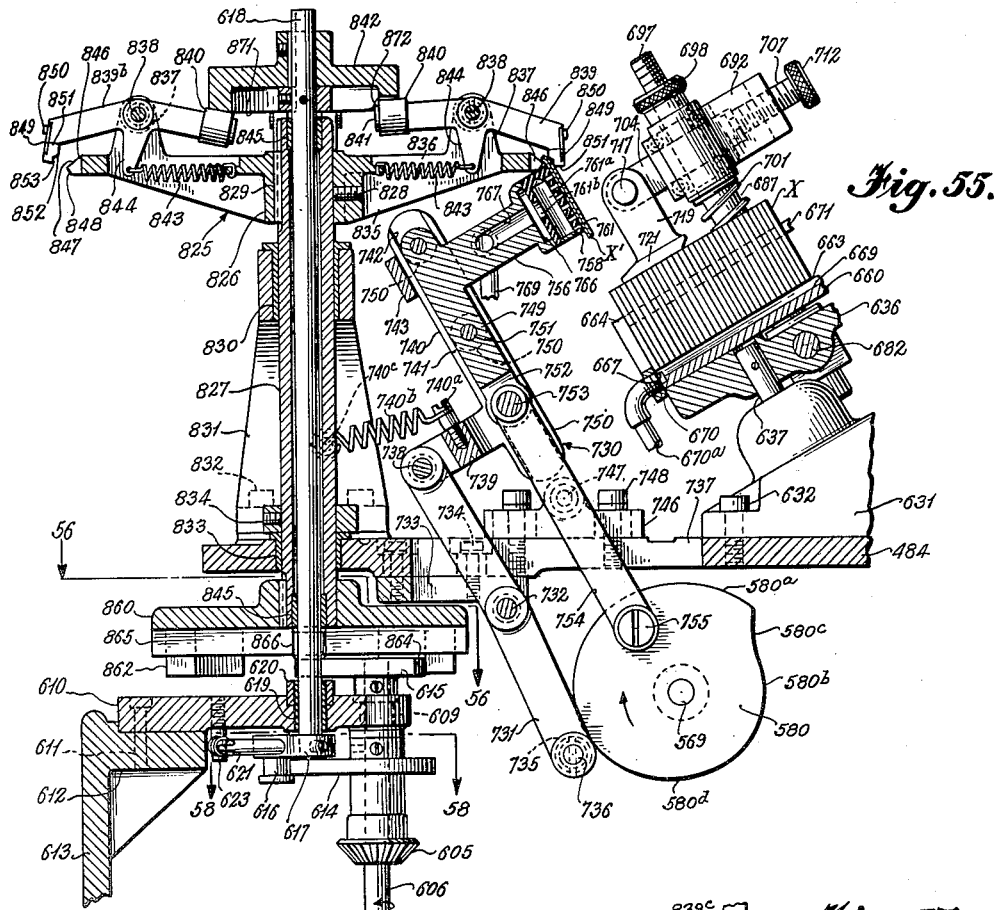
Fig. 55 is a sectional view illustrating the band pickup head after it has been raised to a position to deliver a band to the band transfer device to be gripped thereby.

Referring to Fig. 55, the transfer head 825 comprises a hub 826, which is adjustably mounted upon the upper end of a hollow Geneva shaft 827 by a set screw 828, a key 829 preventing rotation of said hub relative to said shaft. The Geneva shaft 827 is rotatable in a bushing 830 mounted in the bracket 831 which is fastened to the cover plate 484 by cap screws 832 and in a bushing 833 mounted in the gear housing cover plate 484. A collar 834 is fastened on the Geneva shaft 827 adjacent the bushing 833.

The hub 826 carries four arms 835 arranged at 90° to each other. Each of the arms 835 has a slot 836 and a boss 837 arranged at each side of said slot. Pins 838, mounted in the bosses on the arms 835 pivotally support a series of radially extending gripper levers 839, 839ᵃ, 839ᵇ and 839ᶜ. A roller 840 is mounted upon the inner end of each of the gripper levers 839 to 839ᶜ by a stud 841. The rollers 840 are held against a face cam 842 by springs 843 arranged in the slots 836, one end of each of said springs being connected with the hub portion 826 and the opposite end of said springs being connected to an arm 844 depending from the gripper levers 839 to 839ᶜ. The cam 842 is mounted upon the upper end of the shaft 618, previously described. The shaft 618 is rotatably supported in bushings 845 mounted in the hollow Geneva shaft 827.

The outer ends of each of the arms 835 (Figs. 33 and 55) carries a pair of spaced projections 846, each of which has an upper inclined surface 847 and a lower inclined surface 848. The outer end of each of the gripper levers 839 to 839ᶜ has an inverted T-shaped spring member 849 secured thereto by a cap screw 850. Each of the spring members 849 carries a pair of spaced blocks 851, each of which has a recess including an inclined surface 852 and an upright surface 853 arranged so that when the blocks 851 are adjacent the projection 846, the surfaces 847 and 852 diverge slightly and are non-parallel. The carriage 749 successively delivers bands to the transfer head 825 and is arranged so that it presents the upper end of the band X' in a manner to be received between the projections 846 and the blocks 851, as shown in Fig. 55. The blocks 851 are permitted to engage the band X' and clamp it against the projections 846 by the action of the spring 843 under the control of the cam 842. However, the aforementioned relative inclination of the surfaces 847 and 852 is such that the band X' is gripped with substantially a line contact between the projections 846 and the blocks 851. After the band X' is released by the interruption of vacuum to the suction pad 758, as described, the upper edge of said band follows the inclination of the surface 852, but the remainder of the band X' lies in a substantially vertical plane engaged by the upright surface 853 for delivery to a band-opening mechanism, which will be described in detail later.

The hollow Geneva shaft 827 has a Geneva wheel 860 secured to the lower end thereof. The Geneva wheel 860 is disposed within the gear housing 391 and a portion thereof projects through an opening 861 in the front wall 465 of said housing, as best shown in Fig. 35. The Geneva wheel 860 comprises four depending segments 862 having the inner surfaces 863 thereof formed on a radius concentric with the axis of the Geneva crank shaft 606 in one operative position of said Geneva wheel. In this connection, the Geneva crank 615 includes an arcuate portion 864 which cooperates with the segments 862 to maintain the Geneva wheel stationary during certain angular positions of the crank 615, as is well understood. The Geneva wheel 860 also has four radially extending grooves 865 formed therein, which are adapted to successively receive a roller 866 mounted upon one end of the Geneva crank 615. The provision of the four radially extending slots 865 provides for rotation of the Geneva wheel 860 through 90° for each complete revolution of the Geneva crank 615.

The cam 842 (Figs. 33 and 34), which controls the action of the gripper levers 839 to 839ᶜ, has a depending cam track including a horizontal dwell surface 870 extending through an angle of 70° and a dwell surface 871, which extends through an angle of 250°. The surface 870 is perpendicular to the axis of the cam 842, whereas the surface 871 is inclined on an angle of about 8° from the horizontal and lies in a plane below the surface 870. The surfaces 870 and 871 are connected by curved surfaces 872 and 873, each of which extends through an angle of 20°. When the cam surface 871 is engaged with the rollers 840 of the gripper lever 839 and 839ᵇ, the blocks 851 are held spaced from the projections 846, as shown in Fig. 33. However, when the surface 870 is above the roller 840 of the gripper lever 839, said surface is spaced from said roller and the blocks 851 are permitted to engage the band X' under the tension of the spring 843, as shown in Fig. 55, to clamp said band against the projections 846 so as to grip said band when the suction on the pad 758 is released and the carriage 749 is retracted by the crank pin 755. The roller 840 of the gripper lever 839ᵃ is shown opposite the cam surface 870 in Fig. 33, so that said gripper lever would be clamping a band (not shown) to the transfer head 825 in the "stand-by" position, previously mentioned.

Figures 56, 57:
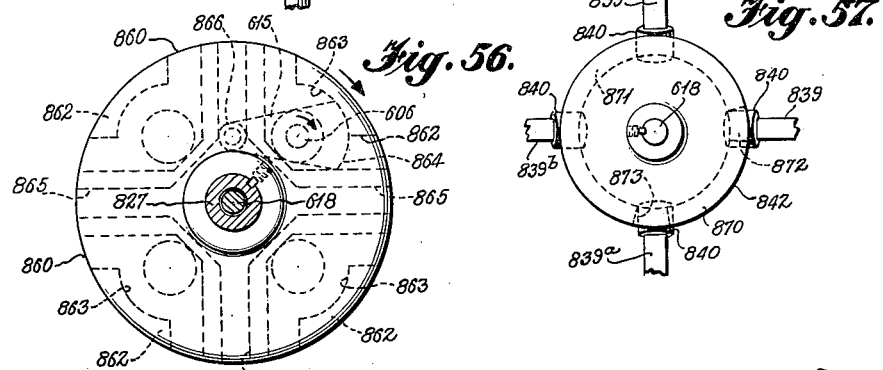
Fig. 56 is a sectional view taken on the line 56—56 of Fig. 55 showing the corresponding position of the Geneva drive mechanism.
Fig. 57 is a plan view showing the gripper lever control cam in a position corresponding to that of the gripper levers shown in Fig. 55.
Figure 58:
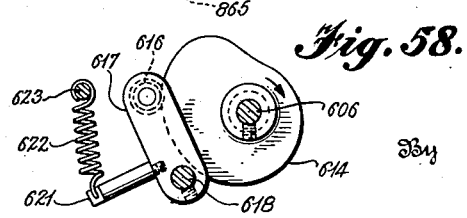
Fig. 58 is a sectional view taken on the line 58—58 of Fig. 55, showing the position of the cam which oscillates the gripper control cam corresponding to the position of the latter shown in Fig. 55.

The opening and closing action of the gripper levers 839 to 839ᶜ is controlled in timed relation to the movement of the carriage 749 by the oscillatory movement imparted to the shaft 618 by the cam 614 through the actuation of the arm 617. As will be apparent from Figs. 55 and 56, while the Geneva wheel 860 is being held stationary by the Geneva crank 615, the gripper lever 839 has been permitted to move to its clamping position by the cam 842, suction has just been cut off to the pick-up head pad 758 under the control of the cam 582, and the carriage 749 has reached the upper limit of its stroke determined by the crank pin 755. The foremost band X' will thus have been delivered to the transfer head 825 and be held by the gripper lever 839 for transfer by said head upon resumption of rotation of the Geneva wheel 860 through an angle of 90° to a position between a stationary band-opening head 879 (Fig. 59) and a movable band-opening head 899, but at a time when the latter is in a retracted position. The heads 879 and 899 carry suction pads 874 and 875, respectively. The pad 874 is preferably made of rubber and includes an oblong-shaped body portion 876, which is surrounded at one end by a continuous flange 877. The inner face of the pad 874 is cemented to a face 878 of the band-opening head 879. A clamping plate 880, which is recessed to receive the oblong portion 876 is secured to the band-opening head 879 by countersunk screws 881 and engages the flange 877 to clamp the pad 874 against the face 878 of said head. The pad 874 is provided with a single vertical row of passages 882, all of which are countersunk or enlarged at their outer ends. In addition, the lowermost passage 882 communicates with a groove 882ᵃ that extends downwardly therefrom to the lower edge of the oblong portion 876 of the pad 874, as best shown in Fig. 62. This groove plays a very important part in effecting opening of the bands, as will be explained later. The passages 882 communicate at their inner ends with an elongated recess 883 (Figs. 59 and 60) formed in the face 878. The recess 883 communicates with a passage 884, which has a conventional fitting 885 mounted therein for connecting a tube 886 to the head 879. The other end of the tube 886 is connected to one side 887 (see Fig. 71), of a pipe-T 888, and the stem of said pipe-T is connected by a tube 889 and a conventional fitting 890 with a passage 891 (Figs. 73 and 75) in the valve body 773.

Referring to Figs. 59, 60 and 64, the band-opening head 879 has a rearward extension 892 provided with a rib 893. The rib 893 rides in a groove 894 formed on a lateral extension 895 of the bracket 831, which contains the bushing 830 for the hollow Geneva shaft 827. The head 879 is provided with an elongated slot 896 and cap screws 897 extend through said slot for adjustably securing said head to the bracket extension 895. Thus, the head 879 may be adjusted so that the outer face of the rubber pad 874 is in close proximity to a band delivered thereto by the transfer head 825. The metal tubing 886 and 889 is sufficiently flexible to permit bending thereof for any necessary adjustment of the band-opening head 879.

The rubber pad 875 is generally similar in construction to the rubber pad 874, and is cemented to a face 898 of the movable band-opening head 899. The pad 875 is clamped against the face 898 by a clamping plate 900, similar to the clamping plate 880, mounted upon the movable band-opening head 899 by countersunk screws 901. An elongated recess 902 is cut into the face 898 and communicates with the inner end of a single vertical row of passages 903 formed in the pad 875, said passages being flared or enlarged at their outer ends. The recess 902 communicates with a passageway 904 having a conventional fitting 905 mounted therein. The fitting 905 secures one end of a metal tube 906 to the band-opening head 899 and its opposite end is connected to one end of a section of flexible rubber tubing 907, as best shown in Fig. 71. The opposite end of the rubber tubing 907 is connected to one end of a metal tube 908, which has its opposite end connected with the other side 909 of the T-fitting 888. Thus, it will be apparent that suction can be simultaneously applied to both rubber pads 874 and 875 through their common connection with the tube 889.

The movable band-opening head 899 is pivotally mounted upon a pin 910 carried by the slotted end of a plunger 911. A set screw 912 carried by the band-opening head 899 serves the dual purpose of retaining the pin 910 in place and holding said head in assembled relation with the plunger 911. The band-opening head 899 has a forked extension 913 for the reception of a bolt 914 mounted on the plunger 911. A compression spring 915 surrounds the bolt 914 and is interposed between the extension 913 and the head 916 of said bolt. The pivotal mounting of the band-opening head 899 is such that the face of the suction pad 875 is slightly inclined with respect to the vertical when said head is in its retracted position, as is best shown in Fig. 65. This particular mounting means enables the band-opening head 899 to perform a very important function in effecting opening of the bands, as will be pointed out in detail later.

The plunger 911 has two pairs of depending lugs 920 and 921 (Fig. 65). One end of a lever 922 is pivotally connected by a pin 923 with the lugs 921, and the opposite end of said lever has a roller 924 secured thereto by a stud 925, and engages with the cam 603, which, it will be recalled, is fastened to the shaft 598. A bracket 926 is secured to the front wall 465 of the gear housing 391 by cap screws 927. The lever 922 is fulcrumed intermediate its length upon a pin 928 mounted on the bracket 926. A link 929 is pivotally connected at the lower end thereof to a pin 930 carried by the bracket 926 and arranged parallel with the pin 928. The upper end of the link 929 is pivotally connected with the lugs 921 of the plunger 911 by a pin 931. The pins 923—928 and 931—930 are spaced the same distance apart so that the lever 922 and the link 929 provide a parallel linkage supporting the plunger 911 carrying the movable band-opening head 899.

An arm 932 is fastened at one end thereof to the pin 930 and its opposite end carries a stud 933. The stud 933 is connected to one end of a tension spring 934, and the opposite end of said spring is connected to a pin 935 (Fig. 48) mounted on the front conveyor plate 497. The action of the spring 934 is such that it continuously tends to urge the movable band-opening head 899 toward the stationary band-opening head 879, and to also urge the roller 924 into contact with the cam 603.

The cam 603 (Figs. 65 and 66) includes a low surface 603ᵃ constituting a dwell extending through an angle of 90° and a high surface 603ᵇ constituting another dwell extending through an angle of 150°. The dwells 603ᵃ and 603ᵇ are interconnected by rises 603ᶜ and 603ᵈ. When the dwell 603ᵃ is opposite the roller 924, as shown in Fig. 48, the roller 924 is not engaged by said dwell and hence the parallel linkage 922—929 is actuated for movement toward the stationary band-opening head 879 solely by the tension in the spring 934. However, as the cam rotates, the inclined portion 603ᶜ engages the roller 924 to positively retract the plunger 911 and as said roller rides onto the dwell 603ᵇ, the plunger 911 is positively held in its fully retracted position against the force of the spring 934, as shown in Fig. 65. The cam surface 603ᵈ, when it engages the roller 924, will permit the plunger 911 carrying the movable band-opening head 899 to again move toward a band held by the transfer head 825 and positioned in front of the stationary band-opening head 879, under the action of the spring 934. When the cam surface 603ᵃ is again opposite the roller 924, the plunger 911 will have completed its cycle of movement.

The application of suction to the band-opening hears 879 and 899 is controlled by the valve 874 (Fig. 73) through valve stems 789ᵃ and 803ᵃ similar to the valve stems 789 and 803, previously described in connection with the vacuum control of the band pickup head 756. The valve stem 789ᵃ has a frusto-conical head 790ᵃ which engages a conical seat 783ᵃ formed at one end of a port 782ᵃ which establishes communication between the chamber 780 and the passageway 891. The chamber 780 is closed by a valve cover 784ᵃ fastened to the valve body 773 by four cap screws 785ᵃ, a gasket 786ᵃ being interposed between the cover 784ᵃ and the adjacent surface of the valve body 773. The cover 784ᵃ has a boss 787ᵃ containing bushings 788ᵃ adapted to slidably receive the valve stem 789ᵃ. The valve stem 789ᵃ has a threaded portion 791ᵃ adjacent the head 790ᵃ and a circular plate 792ᵃ is threaded thereon. A Sylphon bellows 793ᵃ has one end thereof secured to the plate 792ᵃ and its opposite end is secured to a boss on the cover 784ᵃ to form a seal around the valve stem 789ᵃ. A compression spring 794ᵃ is arranged within the bellows 793ᵃ between the cover 784ᵃ and the plate 792ᵃ and constantly urges the valve head 790ᵃ into engagement with its seat 783ᵃ. A swivel 795ᵃ is fastened to the outer end of the valve stem 789ᵃ by set screws 796ᵃ. One end of a lever 797ᵃ is pivotally connected with the swivel 795ᵃ by a pin 798ᵃ. The pin 798ᵃ is received in elongated openings 799ᵃ in the swivel 795ᵃ to provide the necessary clearance for the oscillatory movement of the lever 797ᵃ.

The lever 797ᵃ is supported upon a pin 800ᵃ mounted in a clevis 801ᵃ threaded upon the reduced end 802ᵃ of the exhaust valve stem 803ᵃ. The exhaust valve stem 803ᵃ is slidable in bushings 804ᵃ mounted in the valve body 773. The inner end of the exhaust valve 803ᵃ is ground to form a frusto-conical head 805ᵃ that engages a tapered seat 806ᵃ formed at the outer end of a port 807ᵃ that communicates with the passageway 891. The lower end of the lever 797ᵃ carries a stud 808ᵃ upon which a roller 809ᵃ is mounted. The roller 809ᵃ extends into a groove 811ᵃ formed in the face cam 581, previously referred to, which is mounted upon the shaft 577.

Still referring to Fig. 73, and in particular to the cam 581, the cam groove 811ᵃ comprises a portion 581ᵃ that is concentric with the axis of the shaft 577 and extends through an angle of approximately 230°, and a concentric portion 581ᵇ that extends through an angle of about 90°, the portions 581ᵃ and 581ᵇ being connected by rises 581ᶜ and 581ᵈ, which respectively extend through an angle of about 20°.

Fig. 73 illustrates the cam 581 in a position corresponding to that part of the band-opening cycle at which a band has been opened by the band-opening heads 879 and 899 but is still being held by suction against the faces of the pads 874 and 875, as will be apparent from the cam diagram, Fig. 92. Assuming that the cam 581 rotates in a counterclockwise direction, as indicated by the arrow, the roller 809ᵃ is shown engaged by the intermediate portion of the rise 581ᵈ. As indicated, the head 790ᵃ of the valve stem 789ᵃ has just been seated to cut off the application of vacuum to both of the band-opening heads 879 and 899 at a time when said band-opening heads are holding a band X³ in an open position, as shown in Fig. 65. With the continued rotation of the cam 581, the concentric portion 581ᵇ will contact the roller 809ᵃ, and the exhaust valve stem 803ᵃ will then be shifted toward the right as viewed in Fig. 73, as the lever 797ᵃ fulcrums counterclockwise about the pin 799ᵃ. This, of course, will connect the passage 891 in the valve 774 with the atmosphere so that vacuum is no longer effective on the suction pads 874 and 875, and the band X³ previously held thereby is released. As will be made clear later, a mandrel will have been inserted into the band X³ while it was held open, so that said band can be moved forward by said mandrel when the suction in the pads 874 and 875 is released. The band thus opened and carried forward is replaced by another band delivered to the band-opening heads 879 and 899 by the transfer device 825. The movable band-opening head 899 is then moved toward the second band and as the cam groove portion 581ᶜ contacts the roller 809ᵃ, the valve stem 803ᵃ will be moved to closed position and, thereafter, as said roller is engaged by the groove portion 581ᵃ, the valve stem 789ᵃ will be moved to an open position to communicate vacuum to the passage 891 in the valve 774 to again make suction available at the pads 874 and 875 for gripping and effecting opening of the second band. The valve stem 789ᵃ will remain in its open position so long as the groove portion 581ᵃ is in contact with the roller 809ᵃ. The groove portion 581ᵈ will next contact the roller 809ᵃ to effect movement of the stem 789ᵃ to its closed position to cut off the supply of vacuum to the pads 874 and 875 to thus complete the cycle.

It will be apparent from the cam diagram, Fig. 92, that the timing of the movements of the transfer head 825 by the Geneva wheel 860 relative to the timing of the cam 603 is such that a band will be delivered in position between the band-opening heads 879 and 899 prior to the positioning of the cam portion 603ᵃ opposite the roller 924 to permit the head 899 to move toward the head 879. It will be further apparent that the timing of the cam 581 is such that vacuum is applied to the band-opening heads 879 and 899 at the opposite sides of the band prior to the release of the band through the movement of the gripper lever 839 to its released position at the band-opening station by the cam 842. It will be still further apparent that the rise 603ᶜ of the cam 603 does not start to move the band-opening head 899 away from the head 879 until after the band has been released by the gripper 839, at which time suction will be effective through the conduit 889 for causing the opposite sides of the band to be held against the adjacent faces of the suction pads 874 and 875. While suction is thus effective, the surface 603ᶜ will engage the roller 924 and actuate the parallel linkage 922—929 to move the plunger 911 carrying the movable band-opening head 899 in a direction away from the stationary band-opening head 879, to thereby open the band from a flat condition to a substantially circular condition.

Figure 68:
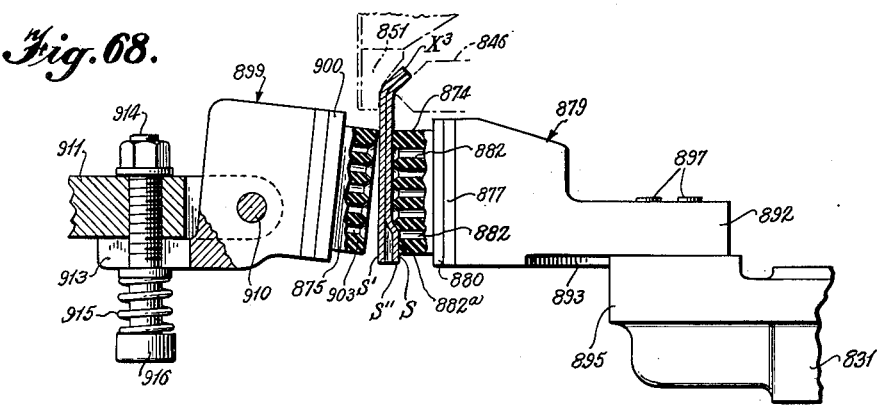
Figs. 68 to 70 are partial sectional views diagrammatically illustrating successive steps in the method of opening the band.
Figure 69:
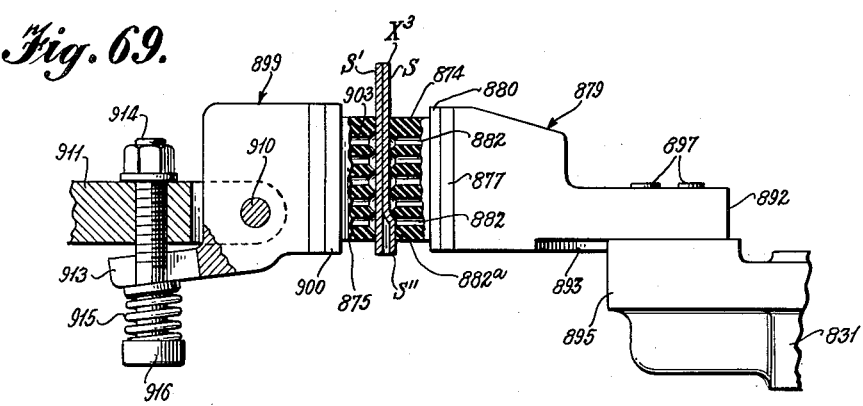
Figure 70:
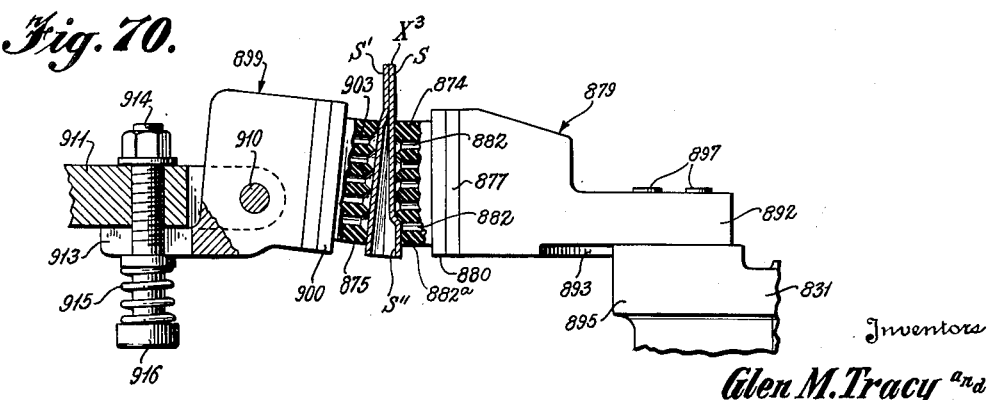

The successful opening of wet bands of regenerated cellulose material presented a difficult problem that has been solved by the present invention and, hence, the critical steps in the method of effecting opening of such bands will be described in detail. Figs. 68, 69, and 70 of the drawings diagrammatically illustrate the manner in which initial opening of the band is effected. In each of these views, the inclination of the movable band-opening head 899 with respect to the plunger 911 has been greatly exaggerated in order to clarify illustration.

Fig. 68 diagrammatically illustrates that portion of the cycle in which the band $X^3$ is positioned in front of the stationary band-opening head 879 by the transfer head 825 and wherein the suction pads 874 and 875 are in communication with the vacuum tank 110. It will be noted that the suction pad 874 has gripped one side S of the band $X^3$ and that a portion S'' of said side along the lower edge thereof has been drawn into the groove 882ᵃ. This effects a "cracking" of the band $X^3$ and conditions the same for ready opening. It will also be noted that although suction is effective in the pad 875, it has not yet contacted the other side S' of the band $X^3$.

Fig. 69 diagrammatically illustrates the pivotal movement of the band-opening head 899 upon engagement of the pad 875 with the side S' of the band $X^3$. It will be noted that the forked portion 913 of the band-opening head 899 has been moved away from the plunger 911, thereby effecting slight compression of the spring 915. It should also be noted at this point that the strength of the spring 934 (Fig. 65) urging the movable band-opening head 899 toward the stationary band-opening head 879 is much greater than that of the compression spring 915, so that the head 899 can pivot with limited freedom about the pin 910 while the spring 934 is urging the head 899 toward said band. As the pad 875 engages the side S' of the band $X^3$, the side S' may slide very slightly relative to the side S and thereby lessen the adhesion of the inner surfaces of said band, but this is not absolutely essential to the successful opening of the band and occurs more or less as an incident to the normal operation of the parallel linkage 922—929 employed for reciprocating the plunger 911. As is shown in Fig. 69, the band $X^3$ is free of the transfer head 825 and both sides S and S' of the band $X^3$ are now gripped by the suction pads 874 and 875, respectively. Retraction of the movable band-opening head 899 is now effected, as previously explained, upon the engagement of the inclined cam surface 603ᶜ of the cam 603 with the roller 924. Accordingly, as the cam surface 603ᶜ overcomes the tension of the spring 934 and starts to positively move the band-opening head 899 away from the head 879, the spring 915 will immediately cause the forked portion 913 of said movable head 899 to engage the under side of the plunger 911 and in this manner effect clockwise pivotal movement of said movable band-opening head about the pin 910 before actual retraction occurs. The result of such action of the spring 915 is diagrammatically illustrated in Fig. 70, wherefrom it will be apparent that the band $X^3$ starts to open from the lower edge thereof as the side S' is moved away from the side S, and that the separation of the inner surfaces of the band sides S and S' occurs progressively from the lower edge of the band toward the top edge. Continued retraction of the band-opening head 899 from the position shown in Fig. 70 will eventually result in said head taking the position indicated in Fig. 65, wherein the band $X^3$ is shown in its fully open, substantially circular condition. Thus, it will be clear that the gap initially formed by "cracking" the band at S'', as indicated in Fig. 68, is progressively expanded by a sort of "peeling" action separating the sides S and S' from each other beginning at the lower edge of the band $X^3$ and moving toward the upper edge of said band, and that this method readily overcomes the inherent adhesion of the sides of the wet band so that the band can be readily and quickly opened.

Figure 3:
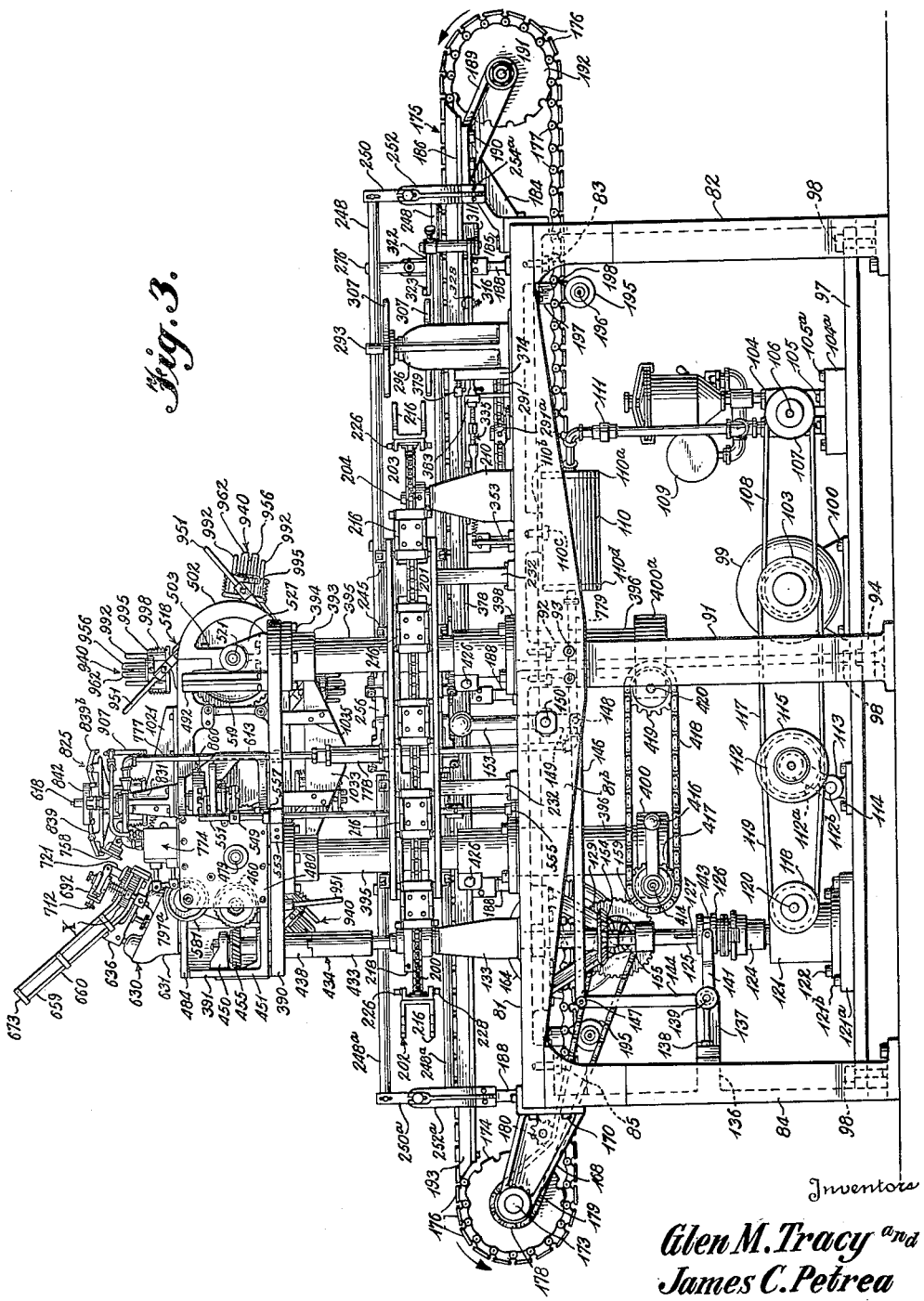
Fig. 3 is a rear elevational view of the machine shown in Fig. 1.
Figure 4:
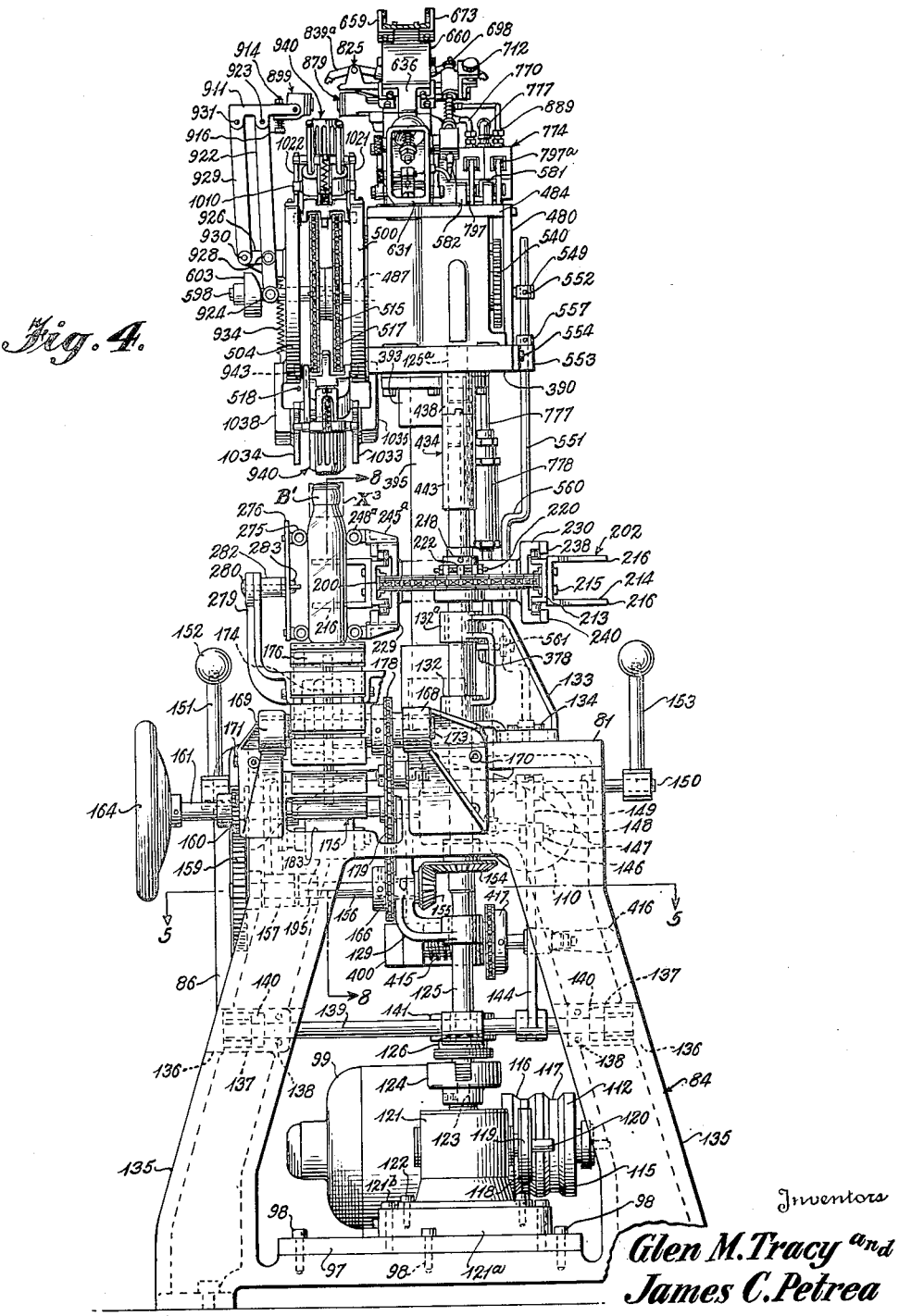
Fig. 4 is an enlarged right end elevational view of the machine shown in Fig. 1.

At about the time that the band $X^3$ is in its fully open position, a mandrel generally identified by the numeral 940 and carried by one of the indexing carriages 518, previously described, is projected into the open band. Figs. 1 and 3 show a total of seven carriages 518, each carrying a mandrel 940, but the number will vary with the design of the machine. All of the mandrels 940 and carriages 518 are identical and, hence, a description of one carriage and one mandrel will suffice for all.

The carriage 518 (Figs. 65, 78 and 85 to 88) has a pair of depending lugs 941 at its leading end. Each of the lugs 941 has a stud 942 (Fig. 65) mounted therein and carries a roller 943. One of the rollers 943 rides in the track 510 (Fig. 37) formed in the rear conveyor-guide plate 490, in the track 511 formed in the right end section 500, and in the track 512 (Fig. 39) formed in the other end conveyor section 502; and the other roller 943 rides in the cam tracks 510ᵃ, 511ᵃ, and 512ᵃ formed in the front conveyor plate 497 and its associated end sections 504 and 506. The trailing end of the carriage 518 has two depending lugs 944, best shown in Fig. 88, similar to the lugs 941, and a central depending lug 945. A pin 946 is fastened to each of the lugs 944 and includes a reduced end portion 947, which pivotally connects adjacent links of one of the chains 517 and extends into the lug 945. A roller 948 is mounted upon each of the pins 946 outwardly of the lugs 944, and these rollers are guided in the same tracks as the rollers 943. It will be apparent, therefore, that the carriages are constrained to move in a predetermined endless path, and that a driving connection between said carriages and the chains 517 is made at only one point by the pins 946.

Each of the carriages 518 (Fig. 78) has a pair of bosses 949, respectively, provided with a bore- 950 for the reception of one end of a guide rod 951. The guide rods 951 extend at an angle of about 40° to the horizontal and one is secured to one of the bosses 949 by pins 952 and the other rod is secured to the other boss by screws 952ª. A slide 953 (Fig. 79) has a pair of bosses 954, each provided with a bore 955 adapted to slidably receive one of the guide rods 951, whereby to support the slide 953 for reciprocating movement upon the guide rods 951. The slide 953 is also provided with a mandrel part or half thumb 956 formed integral therewith. The mandrel part 956 is closed at its upper end 957 and is cored out as indicated at 958. A stud 959 is arranged in the cored portion 958 and serves as a support for one end of a compression spring 960 (Fig. 89). The outer periphery of the mandrel part 956 is fluted to provide a plurality of upright, circumferentially spaced ribs 961. A movable mandrel part, or movable half thumb, 962 (Fig. 80) is also fluted on its exterior to provide longitudinal, circumferentially spaced ribs 963. The movable mandrel part 962 is closed at its upper end 964 and is cored out interiorly thereof and provided with a projection 965 (Fig. 89) adapted to support the other end of the compression spring 960. The upper peripheral edges of the mandrel parts 956 and 962 are rounded, as illustrated in Figs. 79 and 80, to facilitate their entry into an open band. A tongue 966 extends downwardly from the lower end of the mandrel part 962 and carries a pin 967, which is fastened thereto by a set screw 968. The pin 967 is journalled in bushings 969 adapted to be mounted in openings 969ª (Fig. 79) formed in spaced projections 970 on the slide 953 adjacent the lower end of the stationary mandrel part 956. The pin 967 thus mounts the mandrel part 962 for relative pivotal movement with respect to the fixed mandrel part 956.

An arm 971 (Fig. 81) is split at 972 and clamped to one end of the pin 967 by a cap screw 973 (Fig. 86. The arm 971 has slots 974 and 975 extending therethrough and a roller 976 is rotatably mounted in the slot 974 on a pin 977 and a roller 978 is rotatably mounted in the slot 975 on a pin 979. The rollers 976 and 978 are adapted to engage a cam plate 980 (Fig. 84), which is mounted upon one of the bosses 949 of the carriage 518 by the screws 952ª, previously mentioned. The cam plate 980 is designed to cooperate with the rollers 976 and 978, for effecting automatic pivotal movement of the mandrel part 962 toward the fixed mandrel part 956 as the carriage 953 is moved outwardly along the guide rods 951, to collapse the mandrel 940 prior to its introduction into an open band, as will be explained in further detail later.

The slide 953 (Fig. 79) has a pair of ears 989 which are provided with openings 990 and slots 991 that extend outwardly through said ears from said openings. A pair of studs 992, each having an eccentric lower end portion 993 received in one of the openings 990 is clamped to the ears 989 by cap screws 994 (Fig. 86). An annular stripper block 995 has depending columns 996 provided with bushed passages 996ª through which the studs 992 extend for slidably mounting the stripper block 995 on the slide 953. The eccentric portions 993 of the studs 992 provide for variations in accuracy in machining the various parts, it being apparent that the studs 992 can be rotated to compensate for any variations in the spacing of the openings 990 and passages 996ª. Each of the columns 996 carries a lug 997 at the upper end thereof and one end of a tension spring 998 is connected to said lug and the opposite end of said spring extends into one of the slots 991 and is hooked around the portion of the cap screw 994 bridging said slots. The springs 998 constantly pull the stripper block 995 downwardly to hold the lower ends of the columns 996 seated upon the ears 989 of the slide 953. The stripper block 995 also has a pair of studs 995ª mounted thereon, each carrying a roller 995ᵇ for a purpose described later.

A stripper plate 999 (Fig. 83) is secured to the upper surface of the stripper block 995 by countersunk screws 1000 (Fig. 87), which extend through holes 1001 in said stripper plate and are threaded into openings 1002 in the stripper block 995. The stripper plate 999 is annular and is provided with circumferentially spaced projections 1003 that are adapted to extend into the spaces between the longitudinal ribs 961 and 963 of the mandrel or thumb parts 956 and 962, respectively, whereby to strip a band off the mandrel, as will be explained later.

Referring to Figs. 78 and 89, each of the carriages 518 has a forwardly extending tongue 1004 carrying a depending pin 1005. One end of a tension spring 1006 is fastened to the pin 1005 and the opposite end of said spring is connected to the eye of a cotter pin 1007. The legs of the cotter pin 1007 extend through an opening 1008 in the slide 953, and are spread apart exteriorly of said slide to fasten said opposite end of said spring to said slide. The tension in the spring 1006 constantly tends to pull the slide 953 down the guide rods 951 to hold the lower end of the slide bosses 954 in contact with the upper surface of the carriage bosses 949. Each of the slide bosses 954 carries an integral stud 1009 upon which a block 1010 is non-rotatably pinned. Each of the blocks 1010 includes vertical side surfaces 1011 and 1012, a horizontal surface 1013 and a second horizontal surface 1014, which merges into a surface 1015 inclined at an angle of 15° to the horizontal.

While it is preferred to employ a split mandrel or thumb 940, such as described above, it is quite possible to perform certain banding operations with a solid mandrel or thumb. Such a solid mandrel is illustrated in Fig. 85 and identified generally by the numeral 940ª. The solid mandrel includes a band supporting "thumb" 956ª carried by a slide 953ª similar to the slide 953, but it will be understood that the lugs 970 have been eliminated, together with the pin 967, and that there is no necessity for providing an arm such as 971 and the cam plate 980. The "thumb" 956ª is grooved to provide a plurality of longitudinal ribs 961ª, the grooves between said ribs being adapted to receive the projections 1003 on the stripper plate 999, as in the preferred form of mandrel illustrated in Figs. 78 to 84. The remaining parts of the mandrel 940ª corresponding to the mandrel 940, and the carriage 518 and its associated parts, have been identified, for convenience, by the same reference numerals.

The vertical faces 1011 of the blocks 1010 are adapted to engage an upright surface 1020 formed upon mandrel or thumb elevating cams 1021 and 1022 (Figs. 65, 86, 87 and 89). The cam 1021 has a flange 1023 along its lower edge which rests upon the conveyor rear plate 490 and is secured thereto by scap screws 1024. The cam 1022 has a flange 1025 at its lower edge which rests upon the front conveyor plate 497 and is secured thereto by cap screws 1026. The cams 1021 and 1022 are arranged in alignment and so positioned that the surfaces 1020 thereof are simultaneously engaged by the surfaces 1011 of the blocks 1010 located at the opposite sides of the slide 953, at a time when the mandrel 940 is in vertical alignment with the heads 879 and 899 at the band-operating station. The cams 1020 and 1021 also include a horizontal surface 1027 at the upper end of the surfaces 1020 and a surface 1028 inclined downwardly from the horizontal surface 1027 on an angle of about 15°.

It will be recalled that the conveyor chains 517 carrying the carriages 518 and mandrels 940 move continuously. Hence, when one of the carriages 581 passes between the cams 1021 and 1022, the surfaces 1011 of the blocks 1010 will engage the cam surfaces 1020 and forward movement of the slide 953 with said one carriage 518 will be prevented. However, the particular carriage 518 is not constrained against forward movement and as it moves forward with the chains 517, as it must, the constrained slide 953 is caused to ride outwardly on the inclined guide rods 951, with the result that the mandrel parts 956 and 962 carried thereby are raised vertically. The surfaces 1020 of the cams 1021 and 1022 are so located with respect to the stationary band-opening head 879 and the movable band-opening head 899, that the axis of the mandrel lies in a common plane with the suction openings in the pads 874 and 875, as will be apparent from Fig. 86. In other words, the mandrel is arrested against forward movement when the axis thereof is substantially aligned with the center of the band $X^3$, which has been opened by the band-opening heads 879 and 899. However, in order to facilitate entry of the mandrel or thumb parts into the opened band $X^3$, the mandrel part 962 is caused to pivot at its lower end about the pin 967 so that its upper end moves toward the stationary mandrel part 956, and this movement is effected by engagement of the rollers 976 and 978 with the cam plate 980 as the slide 953 rides up the guide rods 951.

As will be apparent from Fig. 86, the roller 976 will engage the cam plate 980 to collapse the mandrel 940 almost as soon as the slide 953 starts to move away from the carriage 518, so that said mandrel is fully collapsed before it is inserted into the band $X^3$. As the slide 953 continues to travel outwardly on the guide rods 951, the second roller 978 will engage the cam plate 980 to maintain the mandrel collapsed after the first roller 976 has ridden off said cam plate, as is best shown in Fig. 87. Thus, the two rollers 976 and 978 make it possible to maintain the mandrel 940 collapsed and still use a short cam 980.

The collapsed mandrel 940 reaches its fully elevated position when the horizontal faces 914 of the blocks 1010 are raised to the plane of the surfaces 1027 of the mandrel elevating cams 1021 and 1022. At about this time, the vacuum on the band-opening heads 879 and 899 is released so that the opened band $X^3$ is free to be carried by the mandrel 940. Accordingly, when the blocks 1010 are raised high enough to clear the upper edge of the cam surfaces 1020, the slide 953 begins to move forwardly with the carriage 581, the surface 1014 of the blocks 1010 then sliding along the horizontal cam surface 1027, the mandel 940 then carrying the band $X^3$ as shown in Figs. 32 and 89. The slide 953 is permitted to gradually return to its initial position by the force exerted through the spring 1006, but is constrained in its return movement by the inclined cam surface 1028, which is then engaged by the inclined surface 1015 on the blocks 1010. The cam surface 1028 is designed so that the slide 953 is fully returned before the blocks 1010 ride off the lower end thereof. Thus, a gradual return of the slide 953 is assured throughout its return movement and all unnecessary noise and possible damage to the parts is avoided. As the slide 953 returns to its initial position, the rollers 978 and 976 will ride off the cam plate 890, thereby permitting the spring 960 to move the mandrel part 962 away from the stationary mandrel part 956 to thus expand the band carried thereby into a substantially circular condition.

The mandrel 940 carrying the band $X^3$ applied as aforedescribed is moved through the path prescribed by the tracks 510, 510a, etc., and is inverted as the carriage 518 carrying the same travels along the tracks in the arcuate end sections 502 and 506 at the left end of the mandrel conveyor. As has been previously pointed out, the bottle indexing conveyor 202 travels at the same lineal speed as the mandrel conveyor chains 517, so that when the carriage 518 and mandrel 940 reach the position shown in Fig. 90, the axis of said mandrel will coincide with the center of the neck of a bottle B' disposed therebelow, said bottle being engaged at this time by one set of indexing fingers 216 (Fig. 91) and being frictionally engaged by the movable guide bars 256. The band-carrying mandrel 940 is moved by the carriage 518 between a pair of band stripper cams 1033 and 1034 (Figs. 48 and 91) which are aligned transversely and are of identical configuration. The cam 1033 is fastened to the lower end of arms 1035 by cap screws 1036, and the upper end of said arms is fastened to the rear mandrel conveyor guide plate 490 by cap screws 1037. Similarly, the stripper cam 1034 is fastened to the lower end of arms 1038 by cap screws 1039 and the upper end of said arms is fastened by cap screws 1040 to the front mandrel conveyor-guide plate 497. Each of the stripper cams 1033 and 1034 includes converging surfaces 1041 and 1042 inclined at an angle of about 22½° to the horizontal and interconnected at their adjacent ends by a horizontal surface 1043. Each of the cams 1033 and 1034 also has a horizontal upper surface 1044 which extends for the full length of the cams.

As a carriage 518 carrying a slide 953 with a band $X^3$ thereon approaches the left end of the stripper cams 1033 and 1034, as viewed in Fig. 90, the surfaces 1013 of the blocks 1010 ride along the upper surfaces 1044 of said cams and thus restrain said slide from longitudinal movement with respect to the guide rods 951 during the band-stripping operation. Shortly after the blocks 1010 engage the surfaces 1014, the rollers 995b on the stripper block 995 will engage the inclined cam surfaces 1041 and cause said stripper block to slide downwardly along the studs 992 against the resistance offered by the tension springs 998. As the stripper block 995 moves downwardly, the stripper plate 999 will cause the band $X^3$ carried by the mandrel 940 to slide downwardly off said mandrel and onto the neck of the underlying bottle B', the projections 1003 of said stripper plate engaging the upper edge of the band $X^3$ and assuring positive stripping of said band. The stripping action of the plate 999 occurs gradually as the rollers 995b ride along the inclined surfaces 1041, and complete stripping of the band is effected when said rollers reach the horizontal cam surface 1043, as indicated in Fig.

91. The bottle B' is maintained in alignment with the mandrel 940 during the entire stripping operation through the conjoint action of the friction guide bars 256 and the indexing fingers 216 engaged with said bottle. The downward movement of the stripper block 995 is yieldably opposed by the tension springs 998, as stated, so that after the rollers 995ᵇ ride off the cam surfaces 1043 and onto the cam surfaces 1042, the springs 998 will gradually return the stripper block 995 and the stripper plate 999 carried thereby to their initial position. The carriage 518 and the mandrel 940 are then conveyed, in proper timed relation, back to the band-opening station to receive another band and repeat the cycle described.

The bottle B', after it has had the band X³ applied thereto, is positively moved forward between the spring-pressed guide bars 256 and the stationary guide bars 275, whereupon when said bottle has passed the right ends of said first-mentioned guide bars, it is conveyed forward more rapidly by the bottle-supporting conveyor 175, which, as has been previously pointed out, travels at a faster lineal speed than the indexing conveyor 202. Hence, the banded bottle B' will gradually move away from the indexing fingers 216 that moved it past the guide bars 256 and will reach the end of the indexing conveyor 202 well ahead of said indexing fingers, as will be apparent from Fig. 24. The banded bottle B' is, therefore, clear of the indexing fingers 216 at the time that said fingers start to travel around the sprocket 200. In this manner, all jamming or possible breaking of the bottles is eliminated.

The general operation of the machine is as follows:

Assuming that a stack of bands X has been placed in the supply magazine 659, and that the motor 99 is running, the container-supporting conveyor 175 will be continuously driven by the chain 179, and will cause any bottle B deposited thereon to engage the roller 323 carried by the trip arm 322 to effect actuation of the pawl throwout rod 335 to effect disengagement of the pawl 364 from the ratchet wheel 370, as previously described. The release of the pawl 364 permits the sprocket 292 to frictionally drive the star wheel shaft 293 through the disc 303 and the intervening friction elements 305. The star wheels 307 are then rotated and permit the bottle which actuated the trip arm 322 to proceed upon the conveyor 175. Successive bottles B will each trip the arm 322 and these bottles will be distributed in predetermined spaced relation on the conveyor 175 by the star wheels 307. The bottles B are released by the star wheels 307 in timed relation with the indexing conveyor 202 so that each bottle will enter a space between two adjacent sets of indexing fingers 216 on said indexing conveyor, and will continue to move with the conveyor 175 until its forward movement is arrested by the yieldably supported pair of guide bars 256.

In the meantime, a band X will have been removed from the magazine 659 by the band pickup head 758, delivered to the band transfer device 825, then delivered by said band transfer device to the band-opening heads 879 and 899 to be opened thereby and then deposited upon one of the travelling mandrels 940, all as has been previously described in detail. The timing of the machine is such that the bottle B that trips the arm 322 receives the band about to be deposited upon the mandrel 940 upon elevating of said mandrel at the band-opening station by the cams 1021 and 1022. As has been previously explained, the mandrel conveyor 202 rotates continuously, but the band pickup head 756, the transfer device 825, and the movable band-opening head 899 are operated only in the event that a bottle B has tripped the lever 322. It will be recalled that, if no bottle B is present on the conveyor 175, the pawl 364 will lock the star wheel shaft 293 against rotation, and the bottle-spotting cam 349 will longitudinally shift the pawl throwout rod 335 and actuate the trip rod 378 through the abutment 383 to effect disengagement of the clutch 536 in the gear housing 391 to interrupt the driving of the gear 549 from which the drive of the band pickup head 756, the band transfer device 825 and the movable band-opening head 899 is derived, the band transfer device 825 coming to rest with one of its gripper levers 839—839ᶜ clamping a band to one of the arms 835 in a stand-by position between the station at which said arm normally receives a band from the band pickup head 756 and the station at which it delivers the band to the band-opening heads 879 and 899. Moreover, the vacuum control cams 581 and 582 are designed so that when the drive thereto is interrupted, they come to rest in a position wherein suction to the band pickup pad 758 and the band-opening pads 874 and 875 is cut off. The foregoing arrangement assures that a band X will have been placed upon one of the mandrels 940 for delivery to each bottle B conveyed into the machine by the conveyor 175, and that a band X will not be picked up if there would be no bottle on the conveyor 175 to receive it.

The band-carrying mandrels 940 are, of course, inverted as they travel along the lower run of the mandrel conveyor 517. Also, as has been previously explained, a band-carrying mandrel 940 has the neck of a bottle B' maintained in perfect alignment therewith, while a pair of indexing fingers 216 are engaged with said bottle and are moving it along against the friction applied to the bottle by the movable guide bars 256. While a given mandrel 940 and a bottle B' are thus held in vertical alignment, the stripper block 955 is actuated by the stripper cams 1033 and 1034 to strip a band X³ from the mandrel and deposit the same onto the neck and closure member of said bottle, as shown in Fig. 91. After a bottle B' has been forced past the guide bars 256, it is freely conveyed by the conveyor 175. Inasmuch as the conveyor 175 travels at a faster speed than the indexing conveyor 202, the bottle B' will be carried away from the indexing fingers 216 which forced it past the obstructing bars 256, so that said bottle is well in advance of said fingers by the time that they reach the sprocket 200 for movement therearound. Thus, the present machine eliminates all danger of breakage of the bottles by the conveyors handling the same.

While the band X³ is illustrated in Fig. 91 as being loose upon the cap and neck of the bottle B', it will be understood that said band is still wet when applied, and that upon drying it will shrink into tight engagement with said cap and neck. If a revenue stamp (not shown) has been applied to the neck over the cap prior to the application of a band, then the band will also shrink tightly upon the stamp.

The cycle above described is repeated for every bottle conveyed into the machine by the conveyor 175, and one of the outstanding features of the present invention is that bands can be applied to containers at the rate of about 130 per minute. Another feature of the machine is that the bottles with the bands thereon are discharged from the machine in an upright condition so that they can be readily transferred from the conveyor 115 to the conveyor of another machine or work table (not shown).

While various mechanisms have been disclosed herein arranged in a particular way for performing specific functions, it will be understood that the details of construction and the relative arrangement thereof can be varied without departing from the principles of the invention or the scope of the annexed claims.

We claim:

1. A band applying machine, comprising: an endless container-supporting conveyor; means for guiding a container while supported by said container-supporting conveyor, said guide means comprising longitudinally extending guide bars arranged above said container-supporting conveyor, one of said guide bars including a movable section; a parallel linkage supporting said movable guide bar section for maintaining the same in parallelism with its associated guide bar; means yieldably opposing movement of said movable guide bar section, said means being adjustable to normally maintain said movable guide bar section in a position in which it can obstruct movement of a container supported by said container-supporting conveyor; means for driving said container-supporting conveyor at a given speed; indexing means for engaging a container while its movement is obstructed by said movable guide bar section; means for moving said indexing means at a speed slower than that of said container-supporting conveyor, whereby said container will be advanced against the opposition offered by said movable guide bar section in accordance with the speed of said indexing means notwithstanding the fact that said container-supporting conveyor is travelling at a greater speed; a mandrel conveyor arranged above said container-supporting conveyor; at least one mandrel mounted upon said last-mentioned conveyor and adapted to carry a band thereon; means for driving said mandrel conveyor at the same speed as said indexing means, the relative position of said mandrel and said indexing means being such that said indexing means advances a container past movable guide bar section in vertical alignment with said mandrel; and means for sliding a band off said mandrel and onto the neck of a container aligned therewith while said container is being moved past said movable guide bar section by said indexing means.

2. In a band applying machine, the combination comprising: an endless conveyor having a plurality of band-receiving mandrels mounted thereon in predetermined spaced relation; an endless container-supporting conveyor arranged in vertical alignment with said mandrel conveyor; an indexing conveyor including a frame and an endless chain having a plurality of indexing fingers mounted thereon and spaced apart the same distance as said mandrels; means for guiding a container while supported by said container-supporting conveyor, said guide means comprising a pair of continuous guide bars at one side of said container-supporting conveyor, and three pairs of guide bars at the opposite side of said container-supporting conveyor arranged end-to-end; means on said indexing conveyor frame including yieldable elements normally supporting said intermediate pair of guide bars in a position above said container-supporting conveyor to yieldably obstruct the movement of a container supported by said container-supporting conveyor, one of said indexing fingers being arranged to engage a container whose movement is thus obstructed to positively move said container past said intermediate pair of guide bars, said yieldable elements allowing said container to push said intermediate pair of guide bars out of its obstructing position while maintaining said intermediate pair of guide bars in contact with said container to frictionally retard movement thereof, the movement of said one indexing finger being correlated with the movement of one of the mandrels on said mandrel conveyor for maintaining a container in alignment with said one mandrel while said container is being moved past said intermediate pair of guide bars; and means for removing a band from said one mandrel and applying said band to the container aligned therewith while said container is being moved past said intermediate pair of guide bars.

3. A band applying machine, comprising: a main bed; a container-supporting conveyor mounted upon said main bed; means for driving said container-supporting conveyor including a vertical shaft; a platform arranged above said bed; a conveyor supported by said platform; a plurality of mandrels carried by said conveyor; means supported by said platform arranged to open and apply a band to each of said mandrels; drive means for said last-mentioned means and for said mandrel conveyor comprising a vertical shaft axially aligned with said first-mentioned vertical shaft; means for raising and lowering said platform relative to said bed to adjust the position of said mandrels relative to said container-supporting conveyor to accommodate containers of different heights; and means for maintaining a driving connection between said vertical shafts regardless of the extent of adjustment of said platform relative to said bed.

4. In an automatic band applying machine, the combination comprising: a band-opening device for opening a band from a flat condition into a substantially circular condition; a mandrel; means for moving said mandrel into registration with said band-opening device; means for elevating said mandrel into an open band held by said band-opening device; means for inverting said mandrel with the band thereon; means for aligning the neck of an upright container with said inverted mandrel; and means for sliding the band downwardly off said mandrel and onto the neck of the container aligned therewith.

5. In combination: a supply magazine adapted to contain a stack of bands in a flat condition; a normally continuously operating band pickup head arranged to remove bands one at a time from said supply magazine; a transfer head arranged to receive bands from said band pickup head and to deliver the same to a band-opening mechanism; a band-opening mechanism for opening a band delivered thereto by said transfer head; a continuously driven conveyor; a mandrel carried by said conveyor, said conveyor being arranged to move said mandrel past said band-opening mechanism; means for inserting said mandrel into an open band held by said band-opening mechanism while said conveyor is in motion; a continuously driven container-supporting conveyor; means for indexing a container on said container-supporting conveyor in vertical alignment with said mandrel; and means for removing a band from said mandrel and applying it to a container while said container is being advanced by said indexing means in alignment with said mandrel.

6. In a band applying machine: an endless conveyor; a plurality of carriers mounted upon said conveyor in equally spaced relation; a mandrel mounted upon each of said carriers, each of said mandrels having longitudinal grooves in the periphery thereof and being adapted to receive a band; means slidably supporting each mandrel with respect to its associated carrier; means on each of said mandrels including a plate having projections extending into said grooves for stripping the band from said mandrels.

7. In a band applying machine, a conveyor comprising: chain means; a plurality of carriers secured to said chain means at equally spaced intervals, each of said carriers having a pair of rods secured thereto at an angle to the horizontal; a slide mounted upon said rods; a mandrel carried by said slide; an abutment on said slide; a stationary cam including an upright surface arranged in the path of movement of said abutment, whereby when said carrier is moved past said cam said abutment will engage said cam surface and restrain forward movement of the slide with the carrier while permitting said slide to move in a vertical direction by moving outwardly upon said rods; means for effecting the return of said slide to its initial position upon said carrier after said slide has moved vertically through a predetermined distance; a pair of upright studs mounted upon said slide; a stripper block arranged for sliding movement upon said studs and having an opening formed therein to receive said mandrel; a stripper plate carried by said stripper block for effecting the removal of a band from said mandrel; means normally urging said stripper block toward said slide; an abutment carried by said stripper block; and means in the path of said last-mentioned abutment arranged to effect movement of said stripper block and plate in a direction away from said slide to strip a band off said mandrel while said chain means is in motion.

8. In a band applying machine, a conveyor comprising: chain means; a plurality of carriers secured to said chain means at equally spaced intervals; rollers secured to said carriers; a pair of plates arranged in confronting relation and having grooves formed in the confronting faces thereof providing an endless track for the rollers of said carriers, each of said carriers having a pair of rods secured thereto at an angle to the horizontal; a slide mounted upon said rods; a mandrel carried by said slide, said mandrel comprising a stationary part and a movable part pivotally mounted at the lower end thereof upon said slide; an abutment carried by said slide; a stationary cam including an upright surface arranged in the path of movement of said abutment, whereby when said carrier is moved past said cam said abutment will engage said cam surface and restrain forward movement of the slide with the carrier while permitting said slide to move in a vertical direction by moving outwardly upon said rods; means for effecting movement of said pivoted mandrel part toward the stationary mandrel part on said slide during vertical movement of said slide; means for effecting the return of said slide to its initial position upon said carrier after said slide has moved vertically through a predetermined distance; a pair of upright studs mounted upon said slide; a stripper block arranged for sliding movement upon said studs and having an opening formed therein to receive said stationary and movable mandrel parts; a stripper plate carried by said stripper block for effecting the removal of a band from said mandrel parts; means normally urging said stripper block toward said slide; an abutment carried by said stripper block; and means in the path of said last-mentioned abutment arranged to effect movement of said stripper block and plate in a direction away from said slide to strip a band off said mandrel parts while said chain means is in motion.

9. In a band applying machine, the combination comprising: a band supply magazine; a vacuum operated band pickup head for removing bands one at a time from said supply magazine; a band-opening mechanism comprising a pair of vacuum-operated suction pads adapted to effect opening of a band removed from said supply magazine; a shaft; a cam on said shaft for controlling the application of vacuum to said band pickup head; a second cam on said shaft for controlling the application of vacuum to said band-opening heads; a valve body connected with a source of vacuum; means connecting said band pickup head and said band-opening heads with said valve body; two pairs of independently operable valve stems in said valve body controlled by each of said cams, one of the valve stems of each pair controlling the application of vacuum and the other controlling exhaust; a lever connecting each pair of valve stems; a roller carried by each lever, the roller of one of said levers being engaged by said first cam, and the roller of the other of said levers being engaged by said second cam.

10. In combination: a container-supporting conveyor; means effecting a continuous drive of said container-supporting conveyor; a mandrel conveyor carrying a plurality of mandrels arranged above said container-supporting conveyor; means including a shaft effecting a continuous drive of said mandrel conveyor; means arranged between said container-supporting conveyor and said mandrel conveyor for indexing a container supported by said container-supporting conveyor in alignment with a mandrel on said mandrel conveyor; means effecting continuous operation of said indexing means; a band magazine; band pickup means driven from the same shaft that drives said mandrel conveyor for removing bands one at a time from said band magazine and presenting the same to a transfer head; a transfer head for receiving bands delivered thereto by said band pickup means and for transferring the same to a band-opening mechanism; a band-opening mechanism arranged to open the bands delivered thereto by said transfer head; means for maintaining a band in its open position for the reception of one of the mandrels on said mandrel conveyor; means including a gear for driving said band pickup means, transfer head, and band-opening mechanism; a clutch drivingly interconnecting said gear with the shaft that drives said mandrel conveyor; and means effective in the absence of a container at a predetermined point on said container-supporting conveyor for effecting disengagement of said clutch.

11. An automatic band applying machine, comprising: a continuously driven endless container-supporting conveyor; means including a star wheel arranged to position containers in predetermined spaced relation upon a given portion of said container-supporting conveyor; means for guiding a container while supported by said container-supporting conveyor, said guide means including means yieldably opposing forward movement of a container at a given point along said container-supporting conveyor; an endless continuously driven indexing conveyor; a plurality of sets of indexing fingers mounted upon said indexing conveyor in predetermined equally spaced relation, said fingers being arranged to engage successive containers while their forward movement is constrained by said yieldable means and to move said containers past said yieldable means; a continuously driven endless mandrel conveyor travelling at the same speed as said indexing conveyor; a plurality of mandrels carried by said mandrel conveyor for movement in the same direction but at a lower speed than said container-supporting conveyor, said mandrels being spaced apart a predetermined distance equal to the spacing of the indexing fingers on said indexing conveyor, each of said mandrels being adapted to carry a band thereon; a band supply magazine; a band pickup head for removing bands one at a time from said supply magazine; a transfer head arranged to receive successive bands from said band pickup head; means including a Geneva drive for effecting intermittent unidirectional rotary movement of said transfer head; a band-opening mechanism arranged to receive successive bands from said transfer head and to effect opening of said bands; means effecting insertion of successive mandrels on said mandrel conveyor into the bands opened by said band-opening mechanism; drive means controlled by a clutch for effecting the actuation of said band pickup head, transfer head, and band-opening mechanism; means including a trip arm positioned at a predetermined point in advance of said star wheel and normally actuated by a container on said container-supporting conveyor for effecting engagement of said clutch upon actuation by a container and for effecting disengagement of said clutch in the absence of a container at said predetermined point, said indexing fingers and mandrels being positioned on their respective conveyors so that a bottle being advanced by one set of indexing fingers is always advanced in true vertical alignment with one of said mandrels; and means for stripping a band off a mandrel having a container aligned therewith, while said container is supported by said container-supporting conveyor but is being advanced past said yieldable means by said one set of indexing fingers.

GLEN M. TRACY.
JAMES C. PETREA.

REFERENCES CITED

The following references are of record in the file of this patent:

UNITED STATES PATENTS

| Number | Name | Date |
|---|---|---|
| Re. 22,434 | Allen | Feb. 15, 1944 |
| 928,365 | Cowley | July 20, 1909 |
| 1,171,996 | Wilkinson | Feb. 15, 1916 |
| 1,306,502 | Risser | June 10, 1919 |
| 1,571,486 | Long et al. | Feb. 2, 1926 |
| 1,589,800 | Frank | June 22, 1926 |
| 1,653,645 | Malocsay | Dec. 27, 1927 |
| 1,770,530 | Oslund | July 15, 1930 |
| 1,835,336 | Risser | Dec. 8, 1931 |
| 1,855,767 | Neuman | Apr. 26, 1932 |
| 1,979,153 | Guenther | Oct. 30, 1934 |
| 2,013,144 | Gladfelter | Sept. 3, 1935 |
| 2,026,856 | Youngdahl | Jan. 7, 1936 |
| 2,036,105 | Strout | Mar. 31, 1936 |
| 2,047,846 | Wright et al. | July 14, 1936 |
| 2,068,107 | Nygard | Jan. 19, 1937 |
| 2,089,769 | Strout | Aug. 10, 1937 |
| 2,103,302 | Strout | Dec. 28, 1937 |
| 2,149,377 | Winslow | Mar. 7, 1939 |
| 2,166,598 | Kronquest | July 18, 1939 |
| 2,281,516 | Royal | Apr. 28, 1942 |
| 2,304,905 | Gantzer | Dec. 15, 1942 |
| 2,307,517 | Langer et al. | Jan. 5, 1943 |
| 2,332,187 | Allen | Oct. 19, 1943 |
| 2,333,571 | Hohl et al. | Nov. 2, 1943 |
| 2,350,666 | Allen | June 6, 1944 |
| 2,371,748 | Fedorchak | Mar. 20, 1945 |
| 2,396,988 | Cutler | Mar. 19, 1946 |
| 2,405,232 | Nordquist | Aug. 6, 1946 |
| 2,422,726 | Goldacker | June 24, 1947 |
| 2,467,679 | Lyon | Apr. 19, 1949 |
| 2,579,458 | Allen et al. | Dec. 25, 1951 |